US008600896B2

(12) United States Patent
Maeda et al.

(10) Patent No.: US 8,600,896 B2
(45) Date of Patent: Dec. 3, 2013

(54) SOFTWARE UPDATING APPARATUS, SOFTWARE UPDATING SYSTEM, INVALIDATION METHOD, AND INVALIDATION PROGRAM

(75) Inventors: Manabu Maeda, Osaka (JP); Yuichi Futa, Osaka (JP); Natsume Matsuzaki, Osaka (JP); Kaoru Yokota, Hyogo (JP); Masao Nonaka, Osaka (JP); Yuji Unagami, Osaka (JP); Hiroki Shizuya, Miyagi (JP); Masao Sakai, Miyagi (JP); Shuji Isobe, Miyagi (JP); Eisuke Koizumi, Miyagi (JP); Shingo Hasegawa, Miyagi (JP); Marika Minagawa, Tokyo (JP)

(73) Assignee: Panasonic Corporation, Osaka (JP)

( * ) Notice: Subject to any disclaimer, the term of this patent is extended or adjusted under 35 U.S.C. 154(b) by 632 days.

(21) Appl. No.: 12/601,368

(22) PCT Filed: Nov. 6, 2008

(86) PCT No.: PCT/JP2008/003208
§ 371 (c)(1),
(2), (4) Date: Jan. 4, 2010

(87) PCT Pub. No.: WO2009/118801
PCT Pub. Date: Oct. 1, 2009

(65) Prior Publication Data
US 2010/0175061 A1 Jul. 8, 2010

(30) Foreign Application Priority Data

Mar. 28, 2008 (JP) ................. 2008-087301

(51) Int. Cl.
*G06F 21/00* (2006.01)
(52) U.S. Cl.
USPC .............. 705/51; 726/22; 726/23; 726/25; 717/174

(58) Field of Classification Search
USPC ............... 380/4, 5, 9, 21, 23, 25, 30, 49, 50
See application file for complete search history.

(56) References Cited

U.S. PATENT DOCUMENTS 5,991,399 A * 11/1999 Graunke et al. ............ 380/279
6,539,266 B1    3/2003 Ishikawa
(Continued)

FOREIGN PATENT DOCUMENTS

JP    11-252067    9/1999
JP     3056732    4/2000
(Continued)

OTHER PUBLICATIONS

International Search Report issued Feb. 17, 2009 in International (PCT) Application No. PCT/JP2008/003208.
(Continued)

*Primary Examiner* — Tsan-Yu J Huang
(74) *Attorney, Agent, or Firm* — Wenderoth, Lind & Ponack, L.L.P.

(57) ABSTRACT

To aim provide a software update apparatus including an install module group (130) composed of a plurality of install modules. Each of the install modules has a function of receiving, from an external server (200), a replacement protection control module (121) to be used for updating a protection control module (120) having a function of verifying whether a predetermined application has been tampered with. Each of the install modules simultaneously running is verified by at least another one of the install modules simultaneously running, as to whether the install module has a possibility of performing malicious operations. If any of the install modules is verified as having the possibility of performing the malicious operations, any another one of the install modules that is verified as not having the possibility revokes the any install module verified as having the possibility.

22 Claims, 48 Drawing Sheets

(56) References Cited

U.S. PATENT DOCUMENTS

| | | |
|---|---|---|
| 6,874,087 B1 | 3/2005 | Fetkovich et al. |
| 7,216,369 B2 * | 5/2007 | Wiseman et al. ............... 726/34 |
| 8,082,449 B2 | 12/2011 | Shimizu et al. |
| 2002/0004773 A1 * | 1/2002 | Xu et al. ..................... 705/36 |
| 2002/0112171 A1 * | 8/2002 | Ginter et al. ................. 713/185 |
| 2002/0152352 A1 | 10/2002 | Ikegai et al. |
| 2003/0023966 A1 | 1/2003 | Shimizu et al. |
| 2004/0202324 A1 | 10/2004 | Yamaguchi et al. |
| 2004/0205140 A1 | 10/2004 | Ikeno |
| 2004/0210894 A1 | 10/2004 | Zarco |
| 2004/0260933 A1 | 12/2004 | Lee |
| 2005/0071648 A1 | 3/2005 | Shimizu et al. |
| 2005/0138401 A1 | 6/2005 | Terao et al. |
| 2005/0168323 A1 * | 8/2005 | Lenoir et al. ................ 340/5.74 |
| 2005/0198521 A1 | 9/2005 | Nakazawa |
| 2006/0168580 A1 | 7/2006 | Harada et al. |
| 2006/0248107 A1 | 11/2006 | Coronado et al. |
| 2007/0198859 A1 | 8/2007 | Harada et al. |
| 2007/0214385 A1 | 9/2007 | White et al. |
| 2007/0271191 A1 | 11/2007 | Torrubia-Saez |
| 2007/0294534 A1 | 12/2007 | Asai et al. |
| 2007/0300207 A1 | 12/2007 | Booth et al. |
| 2008/0005800 A1 | 1/2008 | Yokota et al. |
| 2008/0010686 A1 | 1/2008 | Nemoto et al. |
| 2008/0047000 A1 | 2/2008 | Kanamaru et al. |
| 2008/0060072 A1 | 3/2008 | Saito et al. |
| 2008/0162949 A1 | 7/2008 | Sato et al. |
| 2008/0168562 A1 | 7/2008 | Haga et al. |
| 2008/0235791 A1 | 9/2008 | Ivanov et al. |
| 2008/0244557 A1 | 10/2008 | Yeung et al. |
| 2008/0256363 A1 | 10/2008 | Balacheff et al. |
| 2008/0276301 A1 | 11/2008 | Nataraj et al. |
| 2008/0301667 A1 | 12/2008 | Rao et al. |
| 2008/0313460 A1 | 12/2008 | Lotspiech |
| 2009/0049309 A1 | 2/2009 | Brinker et al. |
| 2009/0055817 A1 | 2/2009 | Maj |

FOREIGN PATENT DOCUMENTS

| | | |
|---|---|---|
| JP | 2001-51742 | 2/2001 |
| JP | 2006-18123 | 1/2006 |
| JP | 2008-16014 | 1/2008 |
| WO | 2006/085595 | 8/2006 |

OTHER PUBLICATIONS

ITU-T Telecommunication Sector of ITU, *Information Technology—Open Systems Interconnection—The Directory: Authentication framework*, International Telecommunication Union, X.509 (Aug. 1997), pp. 9-16.

Okamoto, T. et al., "Chapter 11—Digital Signatures." *Gendai Ango (Modern Cryptography)* (1997), pp. 171-187 (with partial English Translation).

Ishima, H. et al., Tamper Resistant Technology for Software, *Fuji Xerox Technical Report*, No. 13 (2000) (with partial English translation).

Office Action issued Jun. 6, 2012 in related U.S. Appl. No. 12/601,894.

Notice of Allowance issued Apr. 12, 2013 in U.S. Appl. No. 12/601,894.

Extended European Search Report issued Nov. 28, 2012 in corresponding European Application No. 08873668.1.

David Aucsmith, "Tamper Resistant Software: An Implementation," Information Hiding International Workshop Proceedings, Jan. 1996, pp. 317-333, XP000955677.

B. Randell et al., "Reliability Issues in Computing System Design," ACM Computing Surveys, vol. 10, No. 2, Jun. 1978, pp. 123-165, XP002291908.

\* cited by examiner

First update processing during withdrawal processing

First division processing during addition processing

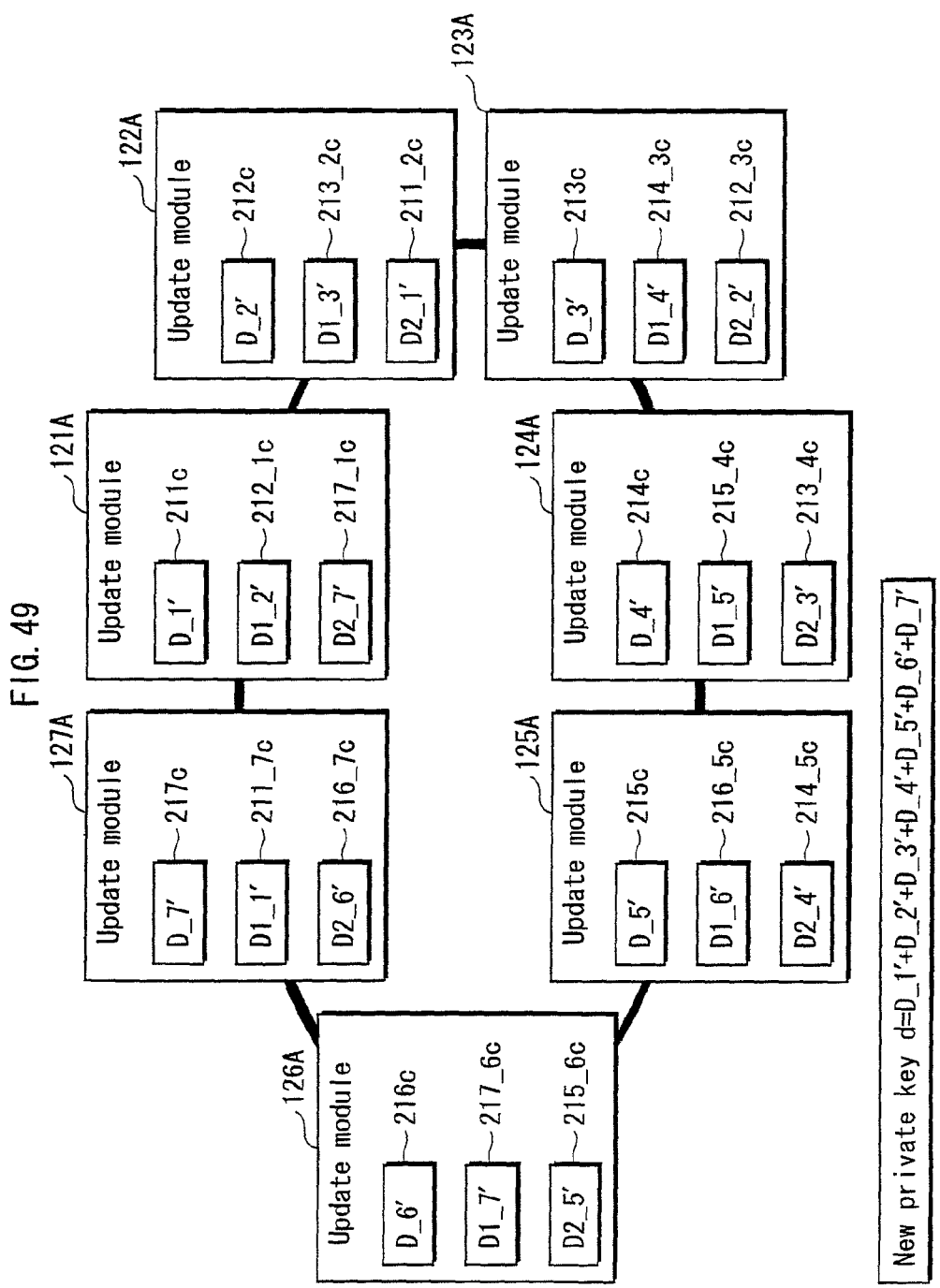

SOFTWARE UPDATING APPARATUS, SOFTWARE UPDATING SYSTEM, INVALIDATION METHOD, AND INVALIDATION PROGRAM

TECHNICAL FIELD

The present invention relates to an art of revoking a module and the like operating within an apparatus.

BACKGROUND ART

There has been conventionally known an apparatus that includes a tamper-resistant module for preventing an application that stores therein secret data such as an authentication key from being analyzed by a malicious third party (hereinafter, "attacker"). The tamper-resistant module is implemented in the apparatus as hardware. Taking into consideration that new attack methods have been recently developed more and more, it is desirable that the application is protected by easily-updatable software in order to flexibly address such new attack methods. As a method of protecting an application by software, tampering verification using a hash value is performed, for example. Also, as another method of protecting an application by software, a decryption and loading function is used, for example. Specifically, the application is encrypted and stored when not used, and the application is decrypted and loaded onto a memory only when necessary. However, in a case where an application is protected by software using such methods, the software that protects the application (hereinafter, "protection control module") itself might be attacked by an attacker. If the protection control module has been tampered with, the application might be attacked by the attacker.

In view of this problem, it is detected whether the protection control module has been tampered with. If it is detected that the protection control module has been tampered with, a method is used for downloading a normal protection control module from an external server via a network to the apparatus to update the tampered protection control module with the normal protection control module. A prior art relating to tampering detection of a protection control module is disclosed in the Patent Literature 1, for example.

[Patent Literature 1] JP3056732 (pp. 4 to 6 and FIG. 2)
[Non-Patent Literature 1] Tatsuaki OKAMOTO, Hirosuke YAMAMOTO "Gendai Ango" (Modern Cryptography), Sangyotosho (1997)
[Non-Patent Literature 2] ITU-T Recommendation X.509 (1997 E): Information Technology-Open Systems Interconnection-The Directory: Authentication Framework, 1997

SUMMARY OF THE INVENTION

Problems the Invention is Going to Solve

However, there is a risk that a module (hereinafter, "install module") for updating the protection control module can be attacked by an attacker. If the install module has been tampered with due to the attack performed by the attacker and the tampered install module updates the protection control module, the protection control module might not be normally updated. As a result, secret data included in the application might be leaked. By further including a module for detecting whether the install module has been tampered with in the apparatus, it is possible to detect whether the install module has been tampered with. However, the module for performing the detection might be also tampered with. Therefore, the problem cannot be fundamentally solved.

Although there has been described using the example of updating the protection control module, there are cases where an application updates the application itself, and an install module updates the install module itself. In these cases, the same problem also occurs because the application or the install module has not been correctly updated.

The present invention aims to provide a software update apparatus capable of preventing an install module that has been tampered with from performing malicious operations.

Means to Solve the Problems

In order to achieve the above aim, a software update apparatus as one aspect of the present invention is a software update apparatus, comprising: a predetermined application; a protection control module operable to verify whether the predetermined application has been tampered with; and an install module group that includes a plurality of install modules each operable to receive a replacement protection control module from an external server, and update the protection control module with the received replacement protection control module, wherein each of the install modules simultaneously running is verified by at least another one of the install modules simultaneously running, as to whether the install module has a possibility of performing malicious operations, and if any of the install modules is verified as having the possibility of performing the malicious operations, any another one of the install modules that is verified as not having the possibility revokes the any install module verified as having the possibility.

Effect of the Invention

With the structure described in the above "MEANS TO SOLVE THE PROBLEMS", each of the install modules simultaneously running is verified by at least another one of the install modules simultaneously running, as to whether the install module has a possibility of performing malicious operations. Accordingly, verification is performed on whether each of all of the install modules running simultaneously has a possibility of performing malicious operations. Since verification can be performed with respect to each of all of the install modules running simultaneously, it is possible to detect an install module that has been tampered with. Also, if there is at least one normal install module among the install modules, it is possible to revoke the install module that has been tampered with by the at least one normal install module. Accordingly, it is possible to exclude the tampered install module, and ensure the security of whole of the install modules. This makes it possible to prevent the tampered install module from performing unauhotirized operations (for example, updating the protection control module with an unauthentic protection control module). This makes it possible to prevent an install module having a possibility of performing malicious operations from updating the protection control module with an unauthentic protection control module, thereby to prevent the unauthentic protection control module from attacking the predetermined application. As a result, it is possible to reduce the risk that secret data included in the application will be leaked outside.

Furthermore, since each of the install modules has a revocation function, the software update apparatus does not need to include an additional unit operable to perform revocation, and can exclude a module that has been tampered with, using a simple structure.

Here, the software update apparatus may further comprise an access control module that has been encrypted using a predetermined encryption key and stores therein pieces of predetermined information for revoking the install modules, wherein the any another install module may access the external server to acquire a decryption key corresponding to the predetermined encryption key, and decrypt the access control module using the acquired decryption key, and the any another install module may acquire a piece of predetermined information corresponding to the any install module verified as having the possibility from the access control module, and performs the revocation based on the acquired piece of predetermined information.

With the above structure, the access control module stores therein the pieces of predetermined information for revoking the install modules. Accordingly, when any of the install modules is verified as having the possibility of performing the malicious operations, a piece of predetermined information for revoking the install module verified as having the possibility is easily identified, thereby easily performing processing of revoking the install module verified as having the possibility.

Also, since the access control module has been encrypted using the predetermined encryption key, the pieces of predetermined information can be prevented from being leaked outside. Accordingly, it is possible to prevent a case from occurring where a piece of predetermined information for revoking an install module verified as having a possibility of performing malicious operations has been altered beforehand and the install module is not revoked and still remains.

Furthermore, the any another install module verified as not having the possibility of performing the malicious operations acquires a decryption key from the external server. This avoids leakage of the decryption key due to attack against the software update apparatus, and can maintain the decryption key secret. In addition, the any another install module verified as not having the possibility decrypts the access control module using the acquired decryption key, and acquires a piece of predetermined information for revoking the install module verified as having the possibility from the access control module, and revokes the install module verified as having the possibility based on the acquired piece of predetermined information. Accordingly, it is possible to use the piece of predetermined information for revocation while maintain the piece of predetermined information secret. It is possible to ensure revocation of an install module verified as having a possibility of performing malicious operations.

Here, the software update apparatus may further comprise an access control module that stores therein pieces of predetermined information for revoking the install modules, wherein each of the pieces of predetermined information may have been encrypted using a key different for each of the install modules, and the any another install module may access the external server to acquire, from the external server, a decryption key corresponding to an encryption key used for encrypting a piece of predetermined information relating to the any install module verified as having the possibility, and decrypt the piece of predetermined information using the acquired decryption key, and the any another install module may perform the revocation based on the decrypted piece of predetermined information.

With the above structure, each of the pieces of predetermined information stored in the access control module has been encrypted using an encryption key different for each of the install modules. Accordingly, assume a case where when a common decryption key is used for decrypting the pieces of predetermined information among all of the install modules, leakage of the common decryption might lead to leakage of the pieces of predetermined information corresponding to all of the install modules. Compared with this case, the above structure enables the damage of leakage of the decryption key to be the minimum. Accordingly, it is possible to reduce the risk that a piece of predetermined information corresponding to an install module verified as having a possibility of performing unauhotirized operations will be altered in advance and the install module verified as having the possibility will not be revoked and still remain.

Here, each of the pieces of predetermined information may be a piece of storage position information relating to a storage position of a corresponding one of the install modules.

Here, the any another install module may perform the revocation by deleting all parts of the any install module verified as having the possibility, based on a piece of storage position information corresponding to the any install module verified as having the possibility.

With the above structure, the any another install module revokes the any install module verified as having the possibility, by deleting all parts of the any install module verified as having the possibility based on a piece of storage position information corresponding to the any install module verified as having the possibility. Accordingly, the any install module is completely revoked, and this can surely prevent the any install module from rebooting.

Here, each of the pieces of storage position information may indicate a deletion part of a corresponding one of the install modules to be deleted, the any another install module may perform the revocation by deleting a deletion part of the any install module verified as having the possibility, based on a piece of the storage position information corresponding to the install module verified as having the possibility.

With the above structure, each of the pieces of storage position information indicates a deletion part to be deleted at a time when a corresponding one of the install modules is deleted. Accordingly, compared with a case where an install module verified as having a possibility of performing malicious operations is revoked by revoking all parts of the install module, the above structure can prevent the install module from booting up, and reduce processing load of performing revocation processing.

Here, each of the pieces of storage position information may indicate a code part of a corresponding one of the install modules to be deleted, and the any another install module may perform the revocation by deleting a code part of the any install module verified as having the possibility, based on a piece of the storage position information corresponding to the any install module verified as having the possibility.

With the above structure, each of the pieces of storage position information indicates a code part to be deleted at a time when a corresponding one of the install modules is deleted. Accordingly, assume a case where when an install module verified as having a possibility of performing malicious operations is revoked, all of the parts of the install module verified as having the possibility are revoked. Compared with this case, the above structure can prevent the install module verified as having the possibility from booting up, and reduce processing load of performing revocation processing.

Here, when revoking the any install module verified as having the possibility, the any another install module may delete a piece of predetermined information corresponding to the any install module stored in the access control module.

With the above structure, a piece of predetermined information corresponding to a revoked install module cannot be

BRIEF DESCRIPTION OF THE DRAWINGS

FIG. 49 shows three pieces of shared information stored in each of the install modules 121A to 127A after the addition processing.

DESCRIPTION OF CHARACTERS

Figure 1:
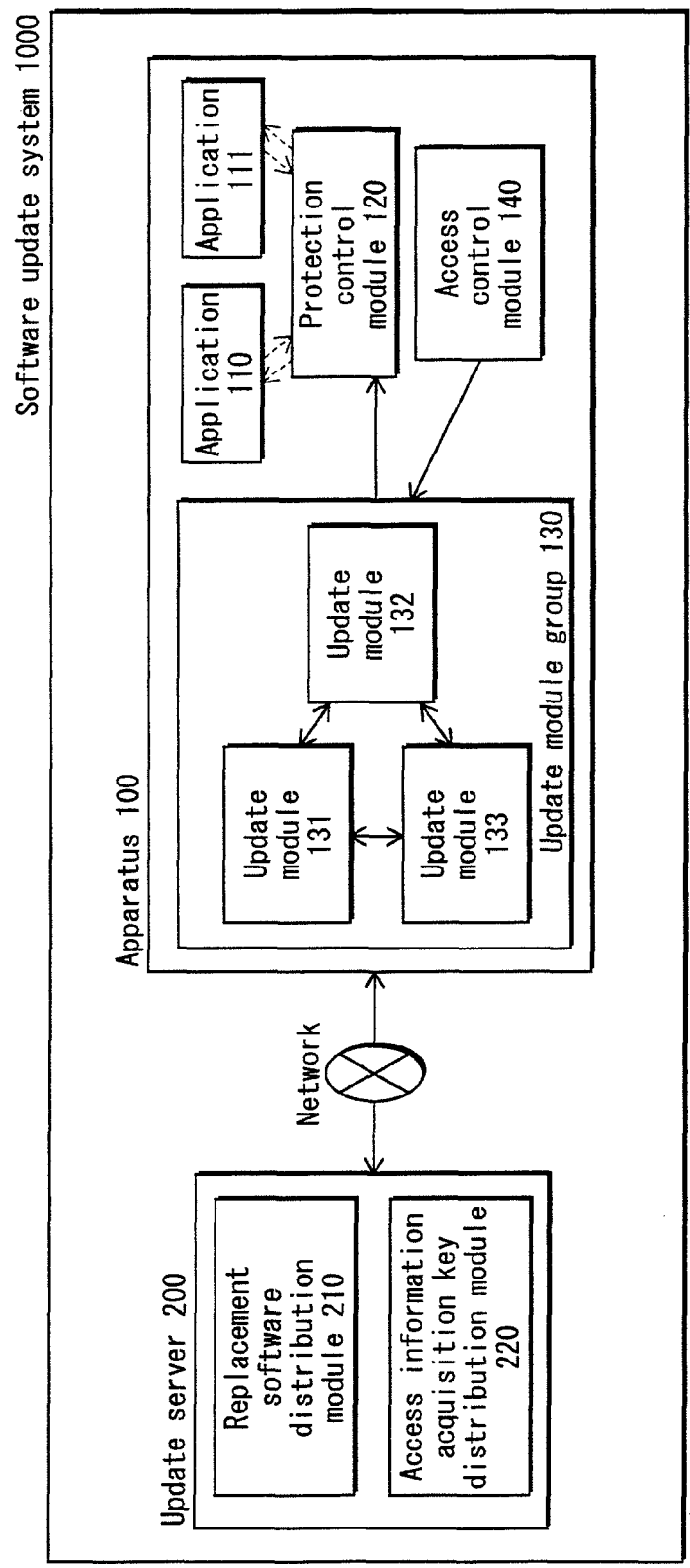
FIG. 1 shows the whole structure of a software update system 1000.

1000: software update system
100: apparatus
110: application
111: application
120: protection control module
130: install module group
131: install module
132: install module
133: install module
140: access control module
200: update server 210: replacement software distribution module
220: access information acquisition key distribution module
301: monitor control unit
302: tampering check execution unit
303: update control unit
304: decryption unit
305: authentication unit
306: signature public key storage unit
307: verification key storage unit
308: authentication key pair storage unit
309: MAC value storage unit
310: shared information storage unit
311: access information acquisition unit
312: revocation processing unit
401: encryption key generation unit
402: encryption processing unit
403: encryption key storage unit
404: authentication unit
405: update judgment unit
406: unauthentic module judgment unit
407: install module selection unit
408: certificate generation unit
409: signature private key storage unit
410: replacement software storage unit
501: control unit
502: decryption loading unit
503: tampering detection unit
504: analysis tool detection unit
505: encryption/decryption key storage unit
506: encryption/decryption key generation unit
507: encryption/decryption key division unit
508: certificate generation unit
509: encryption/decryption key recovery unit
601: communication unit
602: access information storage unit
701: communication unit
702: access information acquisition key storage unit

DETAILED DESCRIPTION OF THE INVENTION

The following describes embodiments of the present invention with reference to the drawings.

First Embodiment

1. Structure of Software Update System 1000

FIG. 1 shows, in a first embodiment of the present invention, the whole structure of a software update system 1000 to which a software update apparatus relating to the present invention is applied. The software update system 1000 includes, as shown in FIG. 1, an apparatus 100 and an update server 200 that are connected with each other via a network.

1.1. Structure of Apparatus 100

The apparatus 100 is a data processing apparatus that provides users with various functions using a network. The functions allow the users to purchase contents such as music and video from a content provider server and play back the purchased contents, and access a system of a financial institution and perform internet banking (balance inquiry and account transfer), for example.

The apparatus 100 includes application software (hereinafter, "applications") 110 and 111, a protection control module 120, an install module group 130, and an access control module 140.

The applications 110 and 111 are each software that provides a user of the apparatus 100 with functions using the network, and is software for purchasing contents such as music and video from a contents provider server (not shown) on the network and playing back the purchased contents, and software for accessing a system (not shown) of a financial institution via the network and performing internet banking such as balance inquiry and account transfer, for example.

The applications 110 and 111 each have secret data such as an authentication key for performing authentication with the contents provider server and the system of the financial institution. The secret data needs to be protected in order to prevent the secret data from being extracted from the application and being used in an unauthorized manner by a malicious third party (hereinafter, "attacker").

The protection control module 120 has functions of protecting the applications 110 and 111 in order to prevent the applications 110 and 111 from being analyzed and secret data such as an authentication key from being extracted by an attacker. The functions of protecting applications include: a decryption loading function of, when not used, encrypting an application and storing the encrypted application, and only when used, decrypting the application and loading the decrypted application onto a memory; a tampering detection function of checking whether an application has been tampered with; and an analysis tool detection function of checking whether an analysis tool such as a debugger operates. The protection control module 120 controls the operations of these functions thereby to protect the applications 110 and 111.

When detecting an attacker's attack using the tampering detection function and the analysis tool detection function, the protection control module 120 stops the operations of the applications 110 and 111, and performs clear processing on a memory region where the applications 110 and 111 have used, especially a memory region where secret data is stored thereby to prevent leakage of secret data.

The install module group 130 includes a plurality of install modules (three install modules, here). Install modules 131, 132, and 133 each detect whether software (the protection control module 120, here) of the apparatus 100 has been tampered with. If the software has been tampered with, the install modules 131, 132, and 133 each have a function of downloading replacement software (a protection control module 121) from the update server 200 outside the apparatus 100, thereby to update the protection control module.

Also, the install modules 131, 132, and 133 perform tampering detection on one another, in order to prevent the install module from being tampered with and prevent the tampered updated module from being used in an unauthorized manner. If it is detected that any of the install modules has been tampered with, other normal install module acquires encrypted access information from the later-described access control module 140, and acquires an access information acquisition key from the later-described access information acquisition key distribution module, and revokes the tampered install module based on the acquired encrypted access information and access information acquisition key. As a result, even if part of install modules included in the install module group is attacked and tampered with, it is possible to detect the tampered install module and respond to the attack.

The access control module 140 stores therein information (access information) necessary for the install modules 131, 132, and 133 to delete other install module. The access information is information necessary for deleting an install module that is a deletion target. The access information is, for example, an address of a driver exclusively for deleting the install module or an address of the install module, and a procedure manual in which procedure necessary for deleting the install module is written. The access information is encrypted using an access information acquisition key for each install module.

1.2. Structure of Update Server 200

The update server 200 is a software distribution apparatus that distributes, to the apparatus 100, replacement software (the protection control module 121) necessary for updating software (the protection control module 120, here) of the apparatus 100.

The update server 200 includes a replacement software distribution module 210 and an access information acquisition key distribution module 220.

When software (the protection control module 120) of the apparatus 100 is updated, the replacement software distribution module 210 operates in cooperation with the install modules 131, 132, and 133, and safely transmits replacement software (the protection control module 121) to the apparatus 100.

Upon receiving an access information acquisition key acquisition instruction from the install modules 131, 132, and 133 of the apparatus 100, the access information acquisition key distribution module 220 distributes an access information acquisition key to each of the install modules 131, 132, and 133.

If any of the software (the protection control module 120 and the install modules 131, 132, and 133) of the apparatus 100 is attacked and tampered with, any of the install modules that has not been tampered with, the access control module 140, and the access information acquisition key distribution module 220 operate in correlation with one another, thereby to delete or update the tampered software.

Note that a secure communication path may be used for communication between the apparatus 100 and the update server 200 via the network. The secure communication path is realized by encrypting communication data, for example.

Next, the details of the modules are described in order.

2. Detail Structure of Install Module

Figure 2:
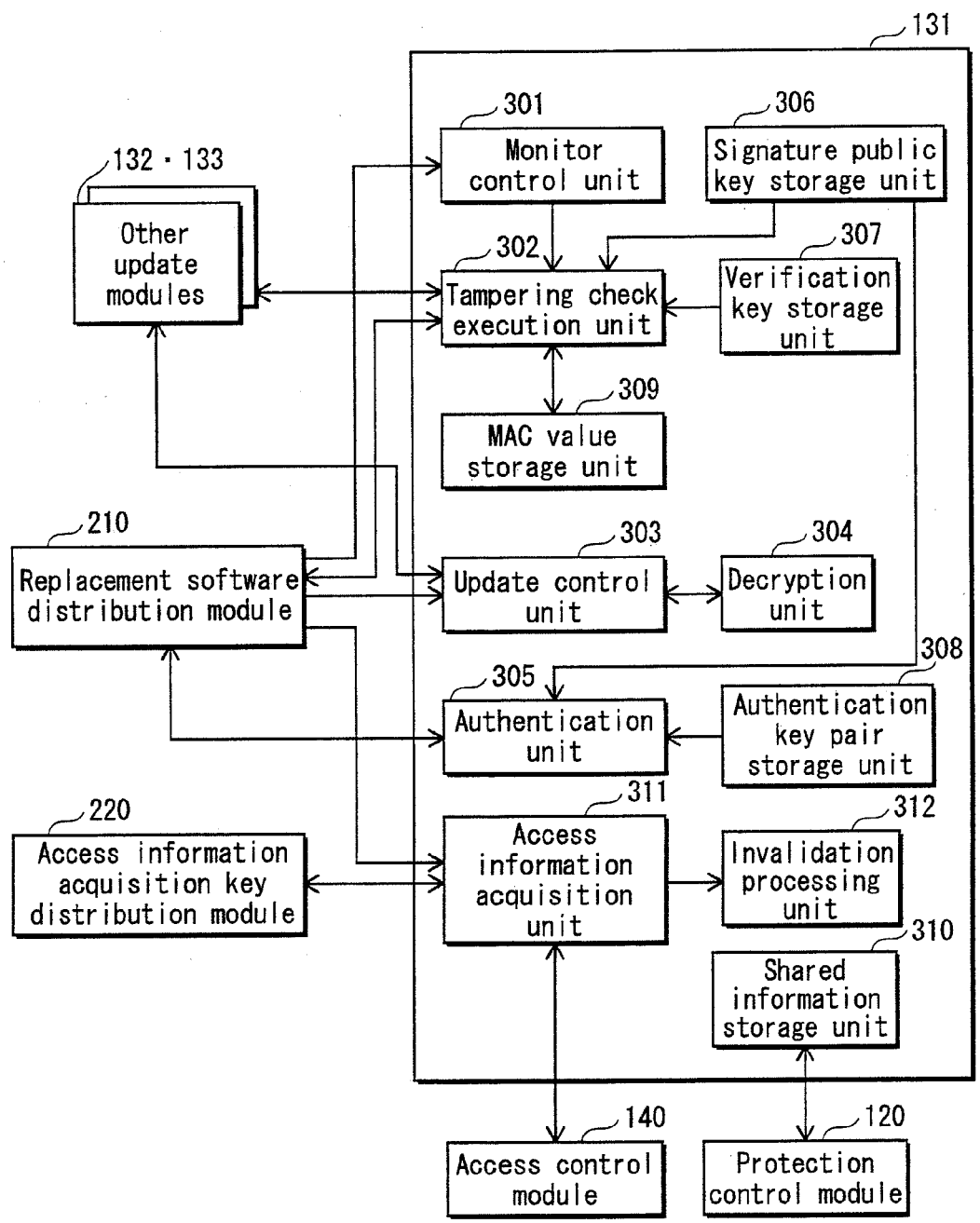
FIG. 2 is a functional block diagram of an install module 131.

FIG. 2 is a functional block diagram of an install module. Although there are actually the number of structures of the install modules equal to the number of the install modules, only the structure of the install module 131 is typically shown in FIG. 2. Other install modules each have the same structure as the install module 131. As shown in FIG. 2, the install module 131 includes a monitor control unit 301, a tampering check execution unit 302, an update control unit 303, a decryption unit 304, an authentication unit 305, a signature public key storage unit 306, a verification key storage unit 307, an authentication key pair storage unit 308, an MAC value storage unit 309, a shared information storage unit 310, an access information acquisition unit 311, and a revocation processing unit 312.

The monitor control unit 301 stores therein an identifier of an install module (the install module 132, here) that is a tampering detection target determined in advance. Upon receiving an update processing start instruction from the replacement software distribution module 210, the monitor control unit 301 instructs the tampering check execution unit 302 to perform tampering check of an install module corresponding to the identifier in accordance with a predetermined timing. The details of the timing of tamper detection are described later.

Upon receiving the tampering check instruction from the monitor control unit 301, the tampering check execution unit 302 performs tampering check of the install module corresponding to the identifier, and transmits a result of the tampering check to the replacement software distribution module 210.

Also, the tampering check execution unit 302 regularly or irregularly performs tampering check of the protection control module 120. If detecting tampering, the tampering check execution unit 302 transmits a tampering detection notification to the replacement software distribution module 210 and other install module. On the other hand, if receiving a tampering detection notification of the protection control module 120 from other install module, the tampering check execution unit 302 performs tampering check of the protection control module 120, and transmits a result of the check to the replacement software distribution module 210.

Furthermore, upon receiving an initialization instruction from a control unit (not shown) that controls the whole apparatus 100, the tampering check execution unit 302 acquires a signature public key from the signature public key storage unit 306, and performs tampering check of an install module that is a tampering detection target and the protection control module 120 using the acquired signature public key. Based on a result of the tampering check, the tampering check execution unit 302 acquires a verification key from the verification key storage unit 307, and generates MAC values respectively for the install module that is the tampering detection target and the protection control module 120 using the acquired verification key, and transmits the generated MAC values respectively in correspondence with the identifiers of the modules to the MAC value storage unit 309.

Furthermore, upon receiving an update processing completion notification from the replacement software distribution module 210, the tampering check execution unit 302 acquires a verification key from the verification key storage unit 307, and generates an MAC value of the protection control module 121 using the acquired verification key, and transmits the generated MAC value to the MAC value storage unit 309.

The update control unit 303 controls updating of the software (the protection control module 120) of the apparatus 100. Specifically, the update control unit 303 receives the replacement protection control module 121 that has been encrypted from other install module or the replacement software distribution module 210, and receives a certificate of the replacement protection control module 121 (for example, a hash value of the replacement protection control module 121 is written) and a decryption key for decrypting the replacement protection control module 121 from the replacement software distribution module 210. Then, the update control unit 303 causes the decryption unit 304 to decrypt the replacement protection control module 121, transmits the decrypted replacement protection control module 121 to other install module, or updates the protection control module 120 of the apparatus 100 with the decrypted replacement protection control module 121.

Also, after updating to the replacement protection control module 121, or upon receiving an update completion notification from the other install module, the update control unit 303 verifies whether the protection control module has been correctly updated, using the certificate received from the replacement software distribution module 210, and transmits a result of the verification to the replacement software distribution module 210.

Upon receiving a decryption request of the encrypted replacement protection control module 121 from the update control unit 303, the decryption unit 304 decrypts the encrypted replacement protection control module 121 using the decryption key input from the update control unit 303. The decryption key input from the replacement software distribution module 210 is encrypted using a key unique to the install module 131 that is stored in the decryption unit 304. Accordingly, the decryption unit 304 decrypts the decryption key using the key unique to the install module 131 before the decryption key is used.

Upon receiving an authentication processing start instruction from the replacement software distribution module 210, the authentication unit 305 performs mutual authentication processing with the replacement software distribution module 210, thereby to confirm that the authentication unit 305 and the replacement software distribution module 210 are each software having an authentic right. Specifically, the authentication unit 305 acquires an authentication key from the authentication key pair storage unit 308, and performs authentication processing of the update server 200 using the acquired authentication key.

The signature public key storage unit 306 stores therein a signature public key. The signature public key is used by the install module 131 for performing tampering check of software (the protection control module 120) of the apparatus 100 using a tampering detection certificate. The signature public key and the signature private key stored in the replacement software distribution module 210 form a key pair according to the public key encryption scheme.

The verification key storage unit 307 stores therein a verification key. The verification key is used by the install module 131 for performing tampering check of software (the protection control module 120) of the apparatus 100 using a message authentication code (MAC) value.

The authentication key pair storage unit 308 stores therein an authentication key pair. The authentication key pair is used by the install module 131 and the replacement software distribution module 210 for performing mutual authentication processing. The authentication key pair is composed of a public key (authentication public key) and a private key (authentication private key) according to the public key encryption scheme. The authentication public key has attached thereto a certificate (authentication key certificate) generated using a signature private key stored in the replacement software distribution module 210.

The MAC value storage unit 309 stores therein a pair of an MAC value of the tampering detection target install module and a corresponding identifier and a pair of an MAC value of the protection control module 120 and a corresponding identifier. The MAC values are input from the tampering check execution unit 302.

The shared information storage unit 310 stores therein shared information and an encryption/decryption key certificate that are input from the protection control module 120.

Upon receiving a revocation instruction of a tampered install module from the replacement software distribution module 210, the access information acquisition unit 311 requests the access information acquisition key distribution module 220 to transmit an access information acquisition key to the access information acquisition unit 311, thereby to acquire the access information acquisition key. Furthermore, the access information acquisition unit 311 acquires encrypted access information from the access control module 140, and decrypts the encrypted access information using the acquired access information acquisition key, thereby to acquire decrypted access information, and then transmits the acquired decrypted access information to the revocation processing unit 312.

The revocation processing unit 312 revokes the tampered install module, based on the access information input from the access information acquisition unit 311. Methods used for revocation include, for example, a method of deleting all of the install modules that are revocation targets, a method of deleting part of an install module that is a revocation target such as a tampered part and data to be secret, and a method of deleting a function of loading a program and data stored in the apparatus 100. Note that the revocation processing unit 312 cannot revoke software until the revocation processing unit 312 acquires access information.

The signature scheme and the certificate are respectively described in detail in the Non-Patent Literature 1 and the Non-Patent Literature 2, and accordingly the descriptions thereof are omitted here.

3. Detail Structure of Replacement Software Distribution Module 210

Figure 3:
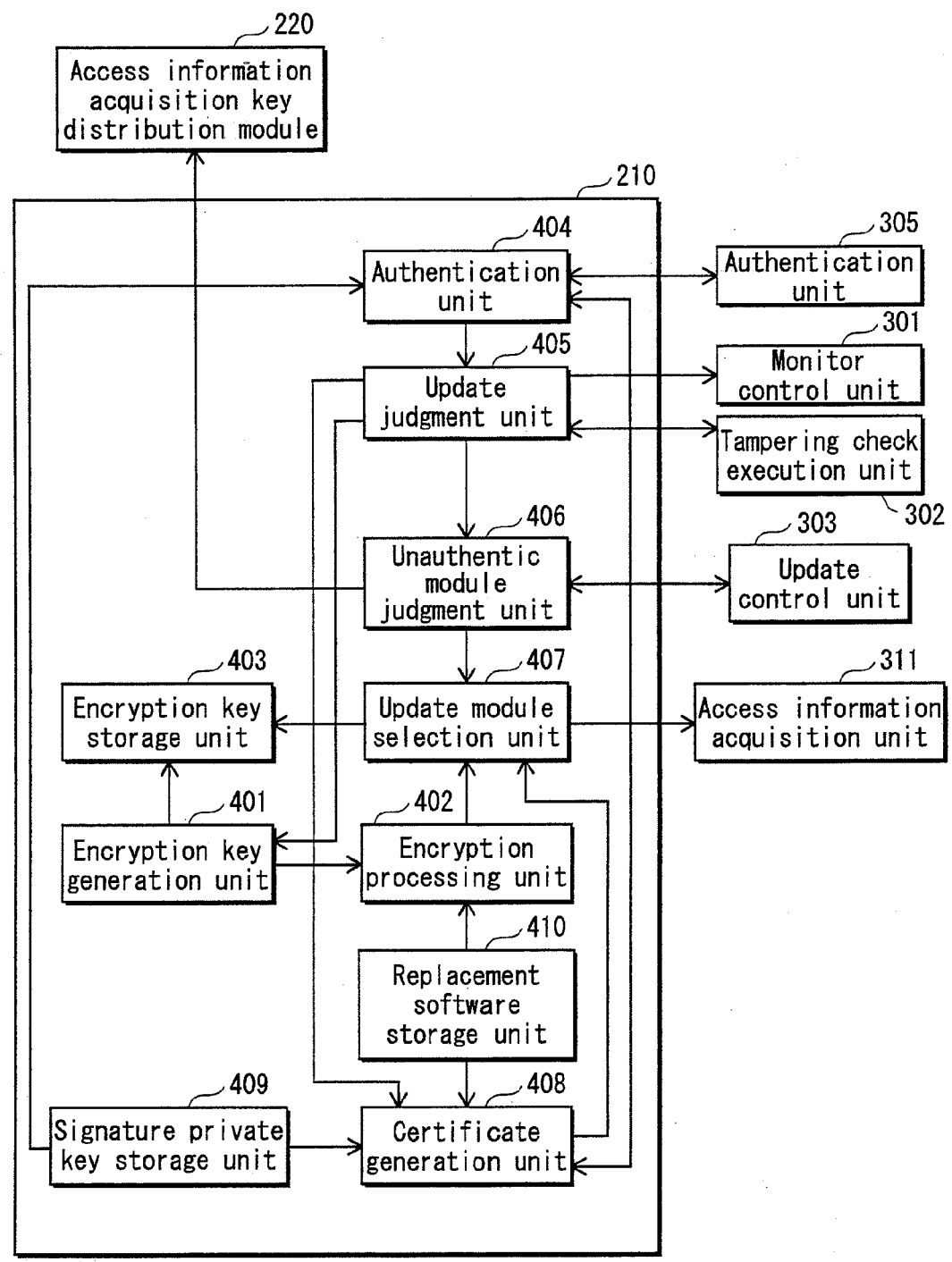
FIG. 3 is a functional block diagram of a replacement software distribution module 210.

FIG. 3 is a functional block diagram showing the replacement software distribution module 210 according to the first embodiment. As shown in FIG. 3, the replacement software distribution module 210 includes an encryption key generation unit 401, an encryption processing unit 402, an encryption key storage unit 403, an authentication unit 404, an update judgment unit 405, an unauthentic module judgment unit 406, an install module selection unit 407, a certificate generation unit 408, a signature private key storage unit 409, and a replacement software storage unit 410.

Upon receiving a notification of updating the protection control module 120 from the update judgment unit 405, the encryption key generation unit 401 generates a plurality of encryption keys for encrypting the replacement protection control module 121, and transmits the generated plurality of encryption keys to the encryption key storage unit 403 and the encryption processing unit 402.

The encryption processing unit 402 acquires the replacement protection control module 121 from the replacement software storage unit 410, and super-encrypts the acquired replacement protection control module 121 using the plurality of encryption keys input from the encryption key generation unit 401. Then, the encryption processing unit 402 transmits the encrypted replacement protection control module 121 and the plurality of encryption keys to the install module selection unit 407.

The encryption key storage unit 403 stores therein the plurality of encryption keys generated by the encryption key generation unit 401 and the plurality of encryption keys encrypted by the install module selection unit 407.

The authentication unit 404 performs mutual authentication processing with the install modules 131, 132, and 133. Specifically, the authentication unit 404 performs authentication processing of the install modules 131, 132, and 133 using authentication keys (public keys) transmitted from the install modules 131, 132, and 133 respectively, and transmits results of the verifications to the update judgment unit 405.

Upon receiving tampering detection notifications of the protection control module 120 from the install modules 131, 132, and 133, the update judgment unit 405 makes a final judgment on whether the protection control module has been tampered with, based on the tampering detection notifications. If judging that the protection control module has been tampered with, the update judgment unit 405 requests the install modules 131, 132, and 133 to transmit tampering information to the update judgment unit 405. Then, the update judgment unit 405 judges whether to update the protection control module based on the tampering information input from the install modules 131, 132, and 133. If judging to update the protection control module, the update judgment unit 405 instructs the install modules 131, 132, and 133 to start performing authentication processing.

Also, after instructing to start performing authentication processing, the update judgment unit 405 issues an update processing start instruction to the install modules 131, 132, and 133 based on the result of the authentication input from the authentication unit 404, and notifies the unauthentic module judgment unit 406, the encryption key generation unit 401, and the certificate generation unit 408 of that the protection control module 120 is to be updated.

Furthermore, the update judgment unit 405 judges whether the protection control module has been correctly updated based on results of the verifications input from the install modules 131, 132, and 133, and transmits an update completion notification of the protection control module 120 based on a result of the judgment to the install modules 131, 132, and 133.

Upon receiving the notification of that the protection control module 120 is to be updated from the update judgment unit 405, the unauthentic module judgment unit 406 judges whether each of the install modules 131, 132, and 133 has been tampered with based on the corresponding result of the tampering check input from the install module. If judging that any of the install modules has been tampered with, the unauthentic module judgment unit 406 further judges which install module has been tampered with. Then, the unauthentic module judgment unit 406 transmits a result of the judgment to the install module selection unit 407.

The install module selection unit 407 selects a plurality of install modules to be used for updating the protection control module 120, based on the result of the judgment input from the unauthentic module judgment unit 406. Then, the install module selection unit 407 encrypts, using keys respectively unique to the install modules selected by the install module selection unit 407, the plurality of encryption keys that have been input from the encryption processing unit 402, which have been used for encrypting the replacement protection control module 121. The install module selection unit 407 transmits the encrypted encryption keys to the selected install modules together with the encrypted protection control module input from the encryption processing unit 402. A certificate of the encrypted protection control module is transmitted to the install modules.

Note that the encrypted protection control module 121 and the encrypted encryption keys are not transmitted together to the selected install modules all at once. In accordance with a timing when each of the encrypted protection control module 121 and the encrypted encryption keys is necessary during update processing, each of the encrypted protection control module 121 and the encrypted encryption keys is transmitted to the selected updated modules. The timing during the update processing is described later.

Also, the install module selection unit 407 instructs a normal install module to revoke a tampered install module, and notifies the access information acquisition key distribution module 220 of information relating to revocation.

Upon receiving the notification of that the protection control module 120 is to be updated from the update judgment unit 405, the certificate generation unit 408 acquires a signature private key from the signature private key storage unit 409 and acquires the replacement protection control module 121 from the replacement software storage unit 410. The certificate generation unit 408 generates an update verification certificate with respect to the acquired replacement protection control module 121 for verifying whether the update has been correctly performed, using the acquired signature private key, and transmits the generated update verification certificate to the install module selection unit 407.

Also, the certificate generation unit 408 respectively generates authentication certificates for authentication public keys of the install modules 131, 132, and 133 using the signature private key.

The signature private key storage unit 409 stores therein a signature private key to be used by the certificate generation unit 408 for generating a certificate.

The replacement software storage unit 410 stores therein the replacement protection control module 121 to be used for updating the protection control module 120 that has been tampered with. Here, the replacement protection control module 121 is assured to be normal, and does not necessarily to be a protection control module of the latest version.

4. Detail Structure of Protection Control Module

Figure 4:
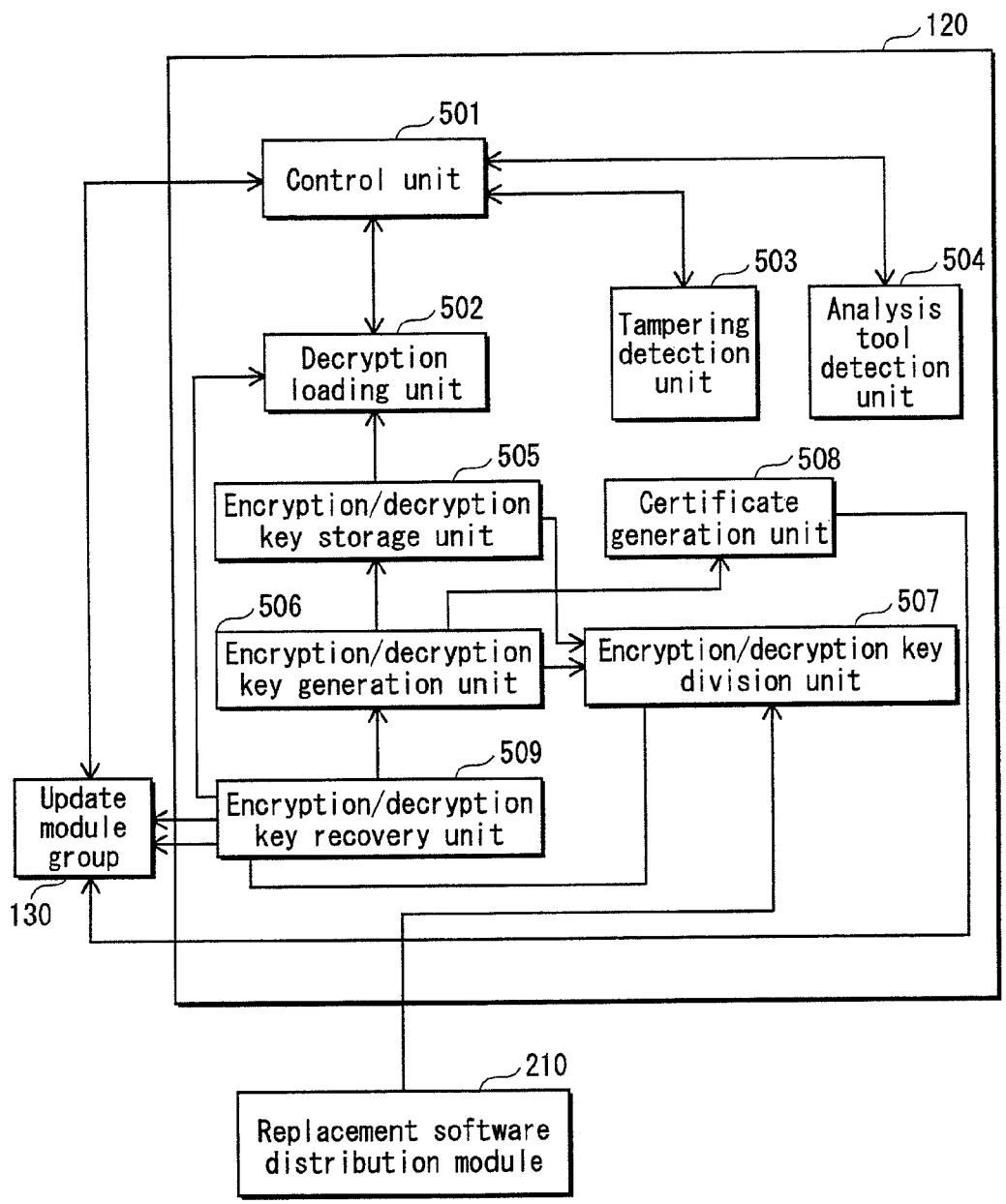
FIG. 4 is a functional block diagram of a protection control module 120.

FIG. 4 is a functional block diagram showing the protection control module 120 according to the first embodiment of the present invention. As shown in FIG. 4, the protection control module 120 includes a control unit 501, a decryption loading unit 502, a tampering detection unit 503, an analysis tool detection unit 504, an encryption/decryption key storage unit 505, an encryption/decryption key generation unit 506, an encryption/decryption key division unit 507, a certificate generation unit 508, and an encryption/decryption key recovery unit 509.

The control unit 501 controls the decryption loading unit 502, the tampering detection unit 503, and the analysis tool detection unit 504. When the applications 110 and 111 are attacked by an attacker, the control unit 501 detects that the applications 110 and 111 are attacked by the attacker.

When the applications 110 and 111 that are encrypted and stored in the apparatus 100 are executed, the decryption loading unit 502 performs processing of decrypting the applications 110 and 111 using the encryption/decryption key stored in the encryption/decryption key storage unit 505, and loading the decrypted applications 110 and 111 onto the memory.

Also, when a context switch to another application occurs during execution of the applications 110 and 111, the decryption loading unit 502 encrypts data stored on the memory using the encryption/decryption key. When a context switch to the applications 110 and 111 occurs, the decryption loading unit 502 decrypts the encrypted data.

Furthermore, during re-encryption processing which is described later, the decryption loading unit 502 decrypts the applications 110 and 111 using the old encryption/decryption key that has been recovered input from the encryption/decryption key recovery unit 509, and encrypts the applications 110 and 111 using a new encryption/decryption key stored in the encryption/decryption key storage unit 505.

The tampering detection unit 503 performs tampering detection processing of detecting whether the applications 110 and 111 have been tampered with. The tampering detection processing is performed in accordance with a method using the certificates for tampering detection respectively attached to the applications 110 and 111, or in accordance with a method using an MAC value.

When an attacker installs an analysis tool such as debugger on the apparatus 100 in order to try to attack the applications 110 and 111, the analysis tool detection unit 504 detects operations of the analysis tool. Detection is performed using a detection method such as a method of searching for a file name, a method of checking whether a special register to be used by the debugger is used, and a method of detecting an interruption set by the debugger.

The encryption/decryption key storage unit 505 stores therein an encryption/decryption key that is embedded during the later-described initialization processing and to be used for encrypting/decrypting the applications 110 and 111. Also, when the encryption/decryption key generation unit 506 generates a new encryption/decryption key, the encryption/decryption key storage unit 505 stores therein the encryption/decryption key input from the encryption/decryption key generation unit 506.

Upon receiving a notification of that the encryption/decryption key has been recovered from the encryption/decryption key recovery unit 509, the encryption/decryption key generation unit 506 generates anew encryption/decryption key for encrypting/decrypting the applications 110 and 111. The encryption/decryption key generation unit 506 transmits the generated new encryption/decryption key to the encryption/decryption key storage unit 505, the certificate generation unit 508, and the encryption/decryption key division unit 507.

During initial design processing and next-round preparation processing which are described later, the encryption/decryption key division unit 507 generates pieces of shared information based on the encryption/decryption key input from the encryption/decryption key generation unit 506 using the secret sharing scheme, and transmits the generated pieces of shared information respectively to the install modules 131, 132, and 133.

The certificate generation unit 508 generates a certificate based on the encryption/decryption key input from the encryption/decryption key generation unit 506, and transmits the generated certificate to the install modules 131, 132, and 133. The certificate is used for verifying whether each of the pieces of shared information generated based on the encryption/decryption key has been correctly recovered.

The encryption/decryption key recovery unit 509 acquires the pieces of shared information and the encryption/decryption key certificate from the install modules 131, 132, and 133, and recovers the old encryption/decryption key based on the acquired pieces of shared information and encryption/decryption key certificate. Then, the encryption/decryption key recovery unit 509 transmits the recovered old encryption/decryption key to the decryption loading unit 502. Also, the encryption/decryption key recovery unit 509 notifies the encryption/decryption key generation unit 506 of that the encryption/decryption key has been recovered.

5. Access Control Module

Figure 5:
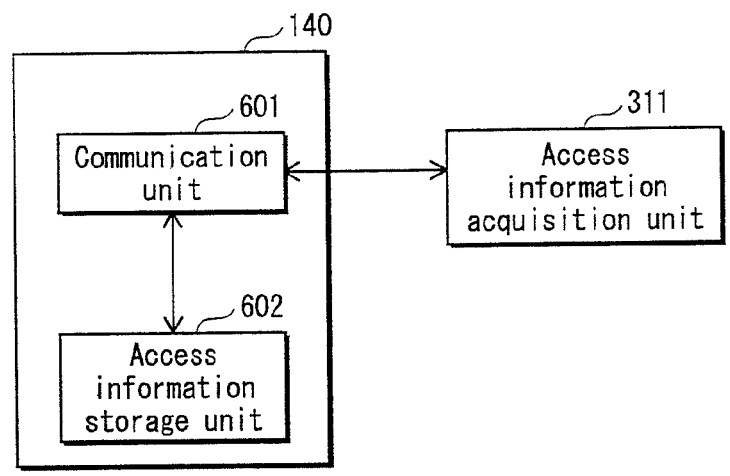
FIG. 5 is a functional block diagram of an access control module 140.

FIG. 5 is a functional block diagram showing the access control module 140 according to the first embodiment of the present invention. As shown in FIG. 5, the access control module 140 includes a communication unit 601 and an access information storage unit 602.

The communication unit 601 receives an access information acquisition request from each of the install modules 131, 132, and 133. Based on the access information acquisition request, the communication unit 601 acquires access information corresponding to an install module that has been tampered with in an unauthorized manner from the access information storage unit 602, and transmits the acquired access information to the install module that has issued the access information acquisition request.

The access information storage unit 602 stores therein, for each install module, access information for deleting the install module. The access information is encrypted using an access information acquisition key for each install module, and is associated with the install module using an identifier (install module identifier) or the like.

6. Access Information Acquisition Key Distribution Module

Figure 6:
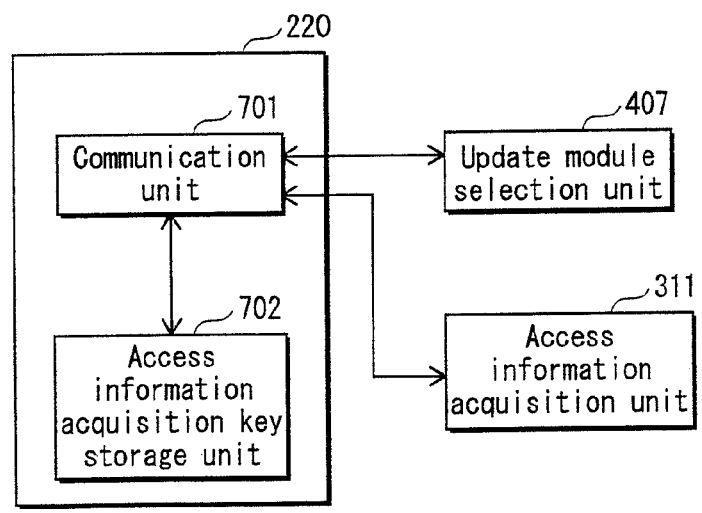
FIG. 6 is a functional block diagram of an access information acquisition key distribution module 220.

FIG. 6 is a functional block diagram showing the access information acquisition key distribution module 220 according to the first embodiment of the present invention. As shown in FIG. 6, the access information acquisition key distribution module 220 includes a communication unit 701 and an access information acquisition key storage unit 702.

The communication unit 701 receives an acquisition request of an access information acquisition key from each of the install modules 131, 132, and 133, and also receives information relating to revocation from the install module selection unit 407. The communication unit 701 judges whether the acquisition request of the access information acquisition key is authentic based on the acquisition request and the information relating to revocation, and acquires an access information acquisition key corresponding to an install module that is a deletion target from the access information acquisition key storage unit 702 based on a result of the judgment, and then transmits the acquired access information acquisition key to the install modules that have issued the acquisition request.

The access information acquisition key storage unit 702 stores therein, for each install module, an access information acquisition key for decrypting a piece of encrypted access information stored in the access control module 140. The access information acquisition keys are respectively associated with the install modules using identifiers (install module identifiers) or the like.

7. Hardware Structure of Apparatus 100

Figure 7:
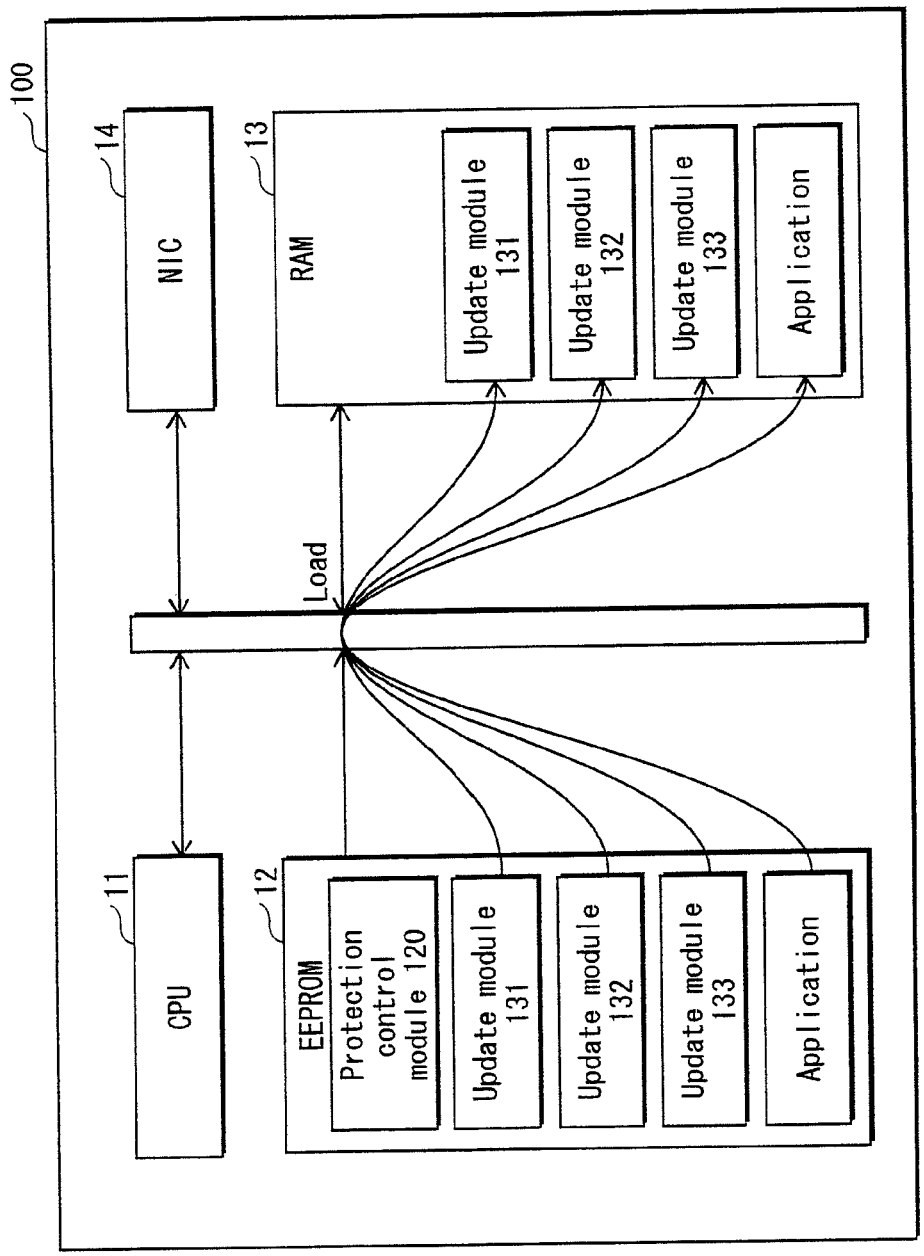
FIG. 7 shows the hardware structure of an apparatus 100.

Next, the hardware structure of the apparatus 100 is described. FIG. 7 shows the hardware structure of the apparatus 100. As shown in FIG. 7, the apparatus 100 includes a CPU (Central Processing Unit) 11, a nonvolatile memory (for example, an EEPROM (Electrically Erasable and Programmable Read Only Memory)) 12, an RAM (Random Access Memory) 13, an NIC (Network Interface Card) 14, and so on, which are connected with one another for communication via a bus.

The EEPROM 12 stores therein the protection control module 120, the install modules 131, 132, and 133, the applications 110 and 111, and so on.

Functions of each control module stored in the EEPROM 12 are realized by the CPU 11 executing the control module. Specifically, the functions of the module are written and realized by a computer program.

The RAM 13 is used as a work area of the CPU 11. The install modules 131, 132, and 133 and the applications 110 and 111 are loaded onto the RAM 13. An install module that is a target of tampering detection and revocation is an install module operating on the RAM 13.

The NIC is an expansion card for connecting to the network.

8. Software Hierarchy

Figure 8:
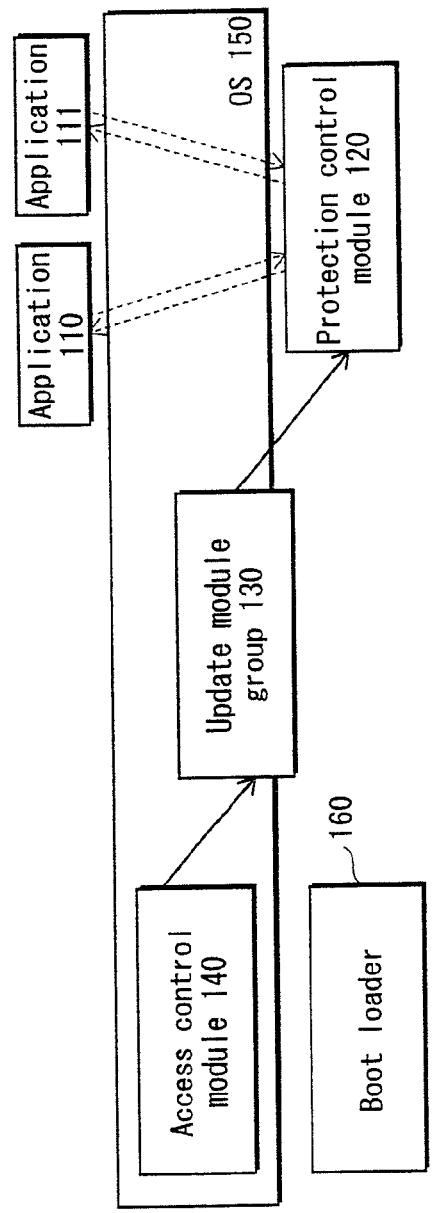
FIG. 8 shows a software hierarchy of the apparatus 100.

Next, the software hierarchy of the apparatus 100 is described. FIG. 8 shows the software hierarchy of the apparatus 100. As shown in FIG. 8, the access control module 140 and the install module group 130 are mounted in an OS 150. The applications 110 and 111 operate on the OS 150, and the protection control module 120, the boot loader 160, and the like are out of control of the OS. In order to boot up the apparatus 100, the protection control module 120 and the install module group 130 are firstly booted up, and then the applications are executed.

9. Operations of Software Update System 1000

9.1. Outline of Operations of Software Update System 1000

Next, the operations of the software update system 1000 are described. Firstly, the outline of the processing of the software update system 1000 is described. The processing falls into the following seven processing.

In the first processing, various types of key data necessary for updating software (the protection control module 120)

and data necessary after updating the software (shared information shared based on the secret sharing scheme, for example) are embedded in each of the install modules 131, 132, and 133 (initial design processing).

In the second processing, it is detected whether software (the protection control module 120) of the apparatus 100 has been tampered with (detection processing).

In the third processing, when it is detected that the software has been tampered, the tapered software is analyzed to judge whether to update the software including a tampered module. If it is judged to update the software, a notification that update processing is to be performed is transmitted to the install modules 131, 132, and 133 (analysis/judgment processing).

In the fourth processing, the replacement software distribution module 210 and each of the install modules 131, 132, and 133 perform authentication processing on one another (mutual authentication processing) for checking whether a party is authentic software.

In the fifth processing, the install modules 131, 132, and 133 perform tampering check among one another. The update software is installed on the apparatus 100 to recover data from pieces of shared information respectively embedded in the install modules 131, 132, and 133 (recovery processing).

In the sixth processing, key data and shared information for performing next update of software are generated, and the generated key data and shared information are embedded in each of the install modules 131, 132, and 133 (next-round preparation processing).

In the seventh processing, if it is judged, in the mutual authentication processing or the recovery processing, that any of the install modules 131, 132, and 133 has been tampered with in an unauthorized manner, the install module that has been tampered with in the unauthorized manner is deleted (revocation processing).

Figure 9:
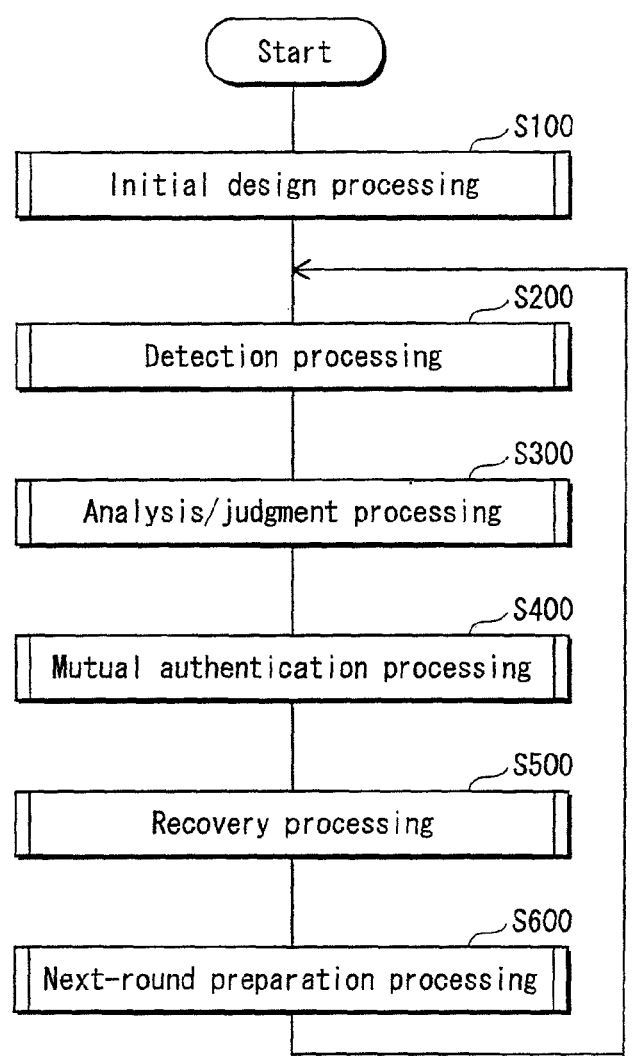
FIG. 9 is a flow chart showing the whole operations of the software update system 1000.

The relationship among the above six processing other than the revocation processing is shown in FIG. 9. The revocation processing is invoked during each of the six processing as necessary. FIG. 9 is a flow chart showing the whole operations of the software update system 1000.

When the apparatus 100 included in the software update system 1000 is manufactured in the factory, the initial design processing is performed to embed shared information in each of the install modules 131, 132, and 133 (Step S100). Then, the apparatus 100 is shipped from the factory to be supplied to users.

When a user uses the apparatus 100, the protection control module 120 protects the applications 110 and 111 against an attacker's attack. At the same time, the install modules 131, 132, and 133 each perform detection processing of performing tampering detection of the protection control module 120 to check whether the protection control module 120 is attacked (Step S200).

As a result of the detection processing, if the protection control module 120 has been tampered with, the analysis/judgment processing (Step S300), the mutual authentication processing (Step S400), the recovery processing (Step S500), and the next-round preparation processing (Step S600) are performed. Then, the flow returns again to the detection processing (Step S200).

Note that all the processing described above does not necessarily need to be performed. Alternatively, it is only necessary to perform processing of performing update at least in accordance with an update trigger given from outside (recovery processing).

Next, the details of the above seven processing are described in order.

9.2. Operations During Initial Design Processing

Figure 11:
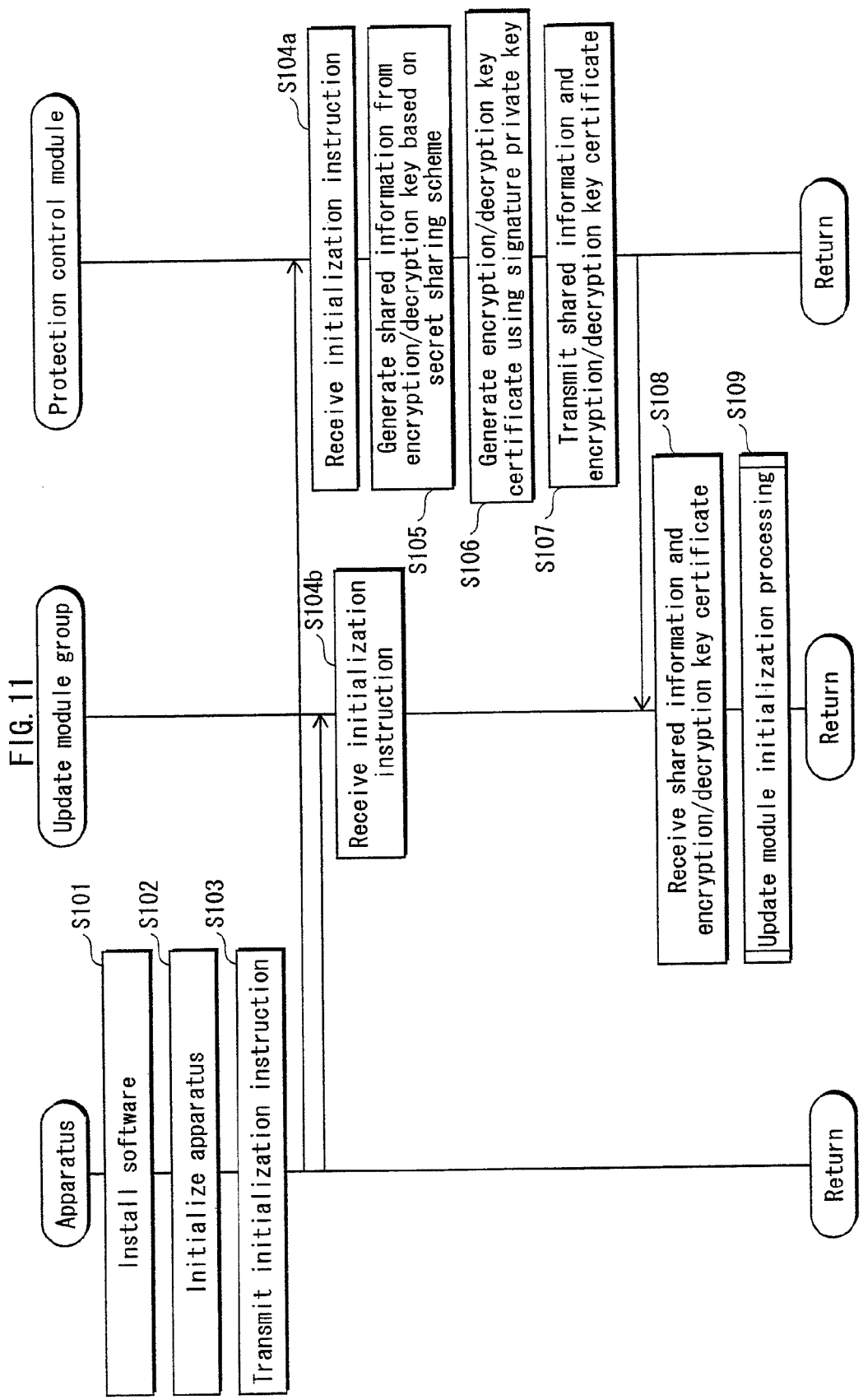
FIG. 11 is a flow chart showing the operations of the software update system 1000 during initial design processing.

Firstly, the initialization processing is described. FIG. 11 is a flowchart showing the operations of the software update system 1000 during the initial design processing. In the flow chart, the processing performed separately by the install modules 131, 132, and 133 are collectively described as processing performed by the install module group.

Figure 10:
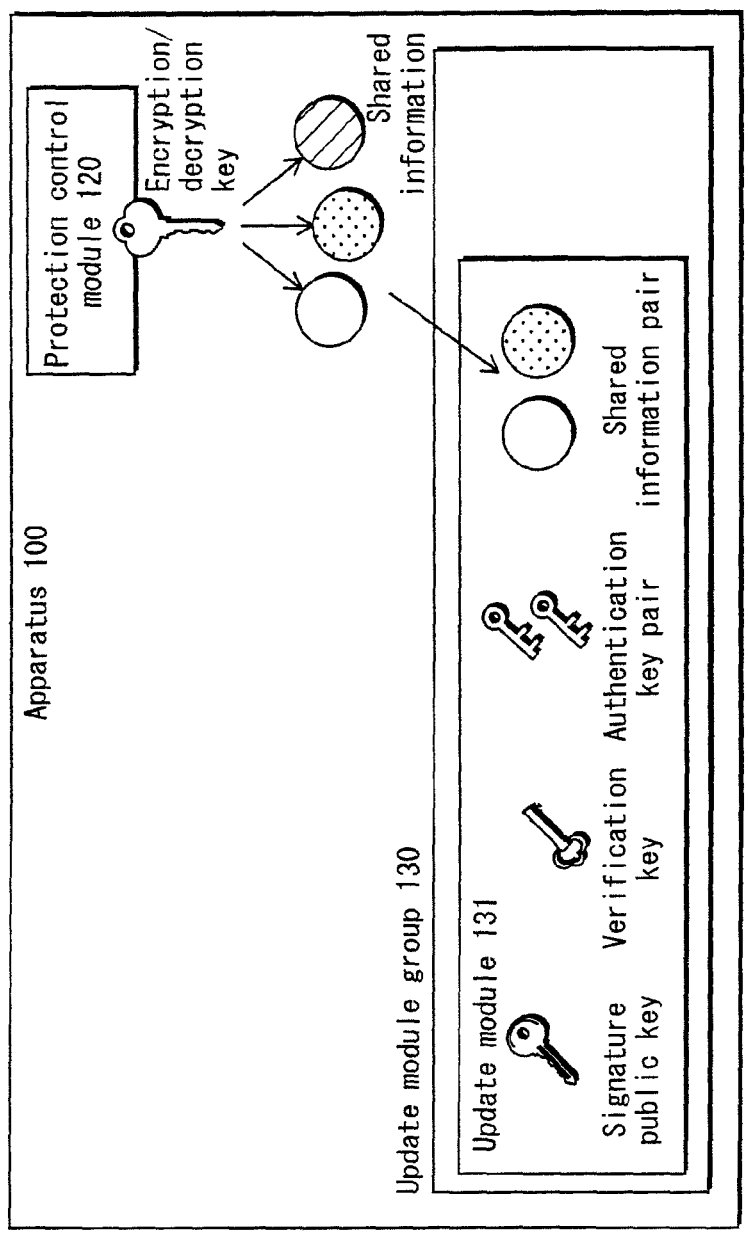
FIG. 10 is a pattern diagram showing a key embedded in the apparatus 100.

When the apparatus 100 is manufactured in the factory, the applications 110 and 111, the protection control module 120, the install modules 131, 132, and 133, and the access control module 140 are installed (written) on the nonvolatile memory of the apparatus 100 (Step S101). Each of these pieces of software has a certificate (tampering detection certificate) attached thereto for verifying whether the software has been tampered with. This tampering detection certificate has a signature using the signature private key stored in the replacement software distribution module 210. In addition to the above software, software necessary for performing the operations of the apparatus 100 is installed. Here, the following describes the keys to be embedded in the apparatus 100 during the initialization processing. FIG. 10 is a pattern diagram of keys embedded in the apparatus 100. Regarding the install modules, only the install module 131 is typically shown in FIG. 10. As shown in FIG. 10, the protection control module 120 has embedded therein an encryption/decryption key. The install modules 131, 132, and 133 each have embedded therein a signature public key, a verification key, and an authentication key pair. Also, the install modules 131, 132, and 133 each have embedded therein an install module identifier for identifying itself.

The encryption/decryption key is a key for encrypting/decrypting the applications 110 and 111. The applications 110 and 111 are encrypted using the encryption/decryption key, and stored in the nonvolatile memory. The applications 110 and 111 are decrypted by the protection control module 120 using the encryption/decryption key, and then executed. In order to execute a plurality of applications while performing context switching, the applications 110 and 111 are encrypted/decrypted using the encryption/decryption key in accordance with a timing of the context switching, thereby to prevent data from being extracted by an analysis tool such as a debugger in execution of the applications 110 and 111.

Among the keys embedded in the install modules 131, 132, and 133, the signature public key is common among all the install modules. Each of the verification key and the authentication key pair are different for each install module. Also, a shared information pair is different for each install module.

Returning to FIG. 11, after each software is installed, initialization processing is performed in which software for initializing the apparatus 100, software for testing whether the apparatus 100 normally operates, and so on are executed (Step S102). An initialization instruction is issued to the protection control module 120 and the install modules 131, 132, and 133 (Step S103). The protection control module 120 and the install modules 131, 132, and 133 each receive the initialization instruction, and perform initialization processing.

Upon receiving the initialization instruction (Step S104*a*), the protection control module 120 generates a piece of shared information from the encryption/decryption key based on the secret sharing scheme (Step S105). Furthermore, the protection control module 120 generates a certificate (encryption/decryption key certificate) using the signature private key for checking whether the encryption/decryption key is surely recovered (Step S106). The certificate is used for recovering the encryption/decryption key. The protection control module 120 transmits the generated piece of shared information and encryption/decryption key certificate to each of the install modules 131, 132, and 133 (Step S107). Here, pieces of shared information whose number is the same with the number of install modules are generated. A different shared information pair is transmitted to each of the install modules 131, 132, and 133. Also, each piece of the shared information has attached thereto an identifier for identifying the piece of shared information. The same encryption/decryption key certificate is transmitted to the install modules 131, 132, and 133.

Upon receiving the initialization instruction (Step S104*b*) and receiving the shared information and the encryption/ decryption key certificate (Step S108), the install module group performs install module initialization processing (Step S109).

Figure 12:
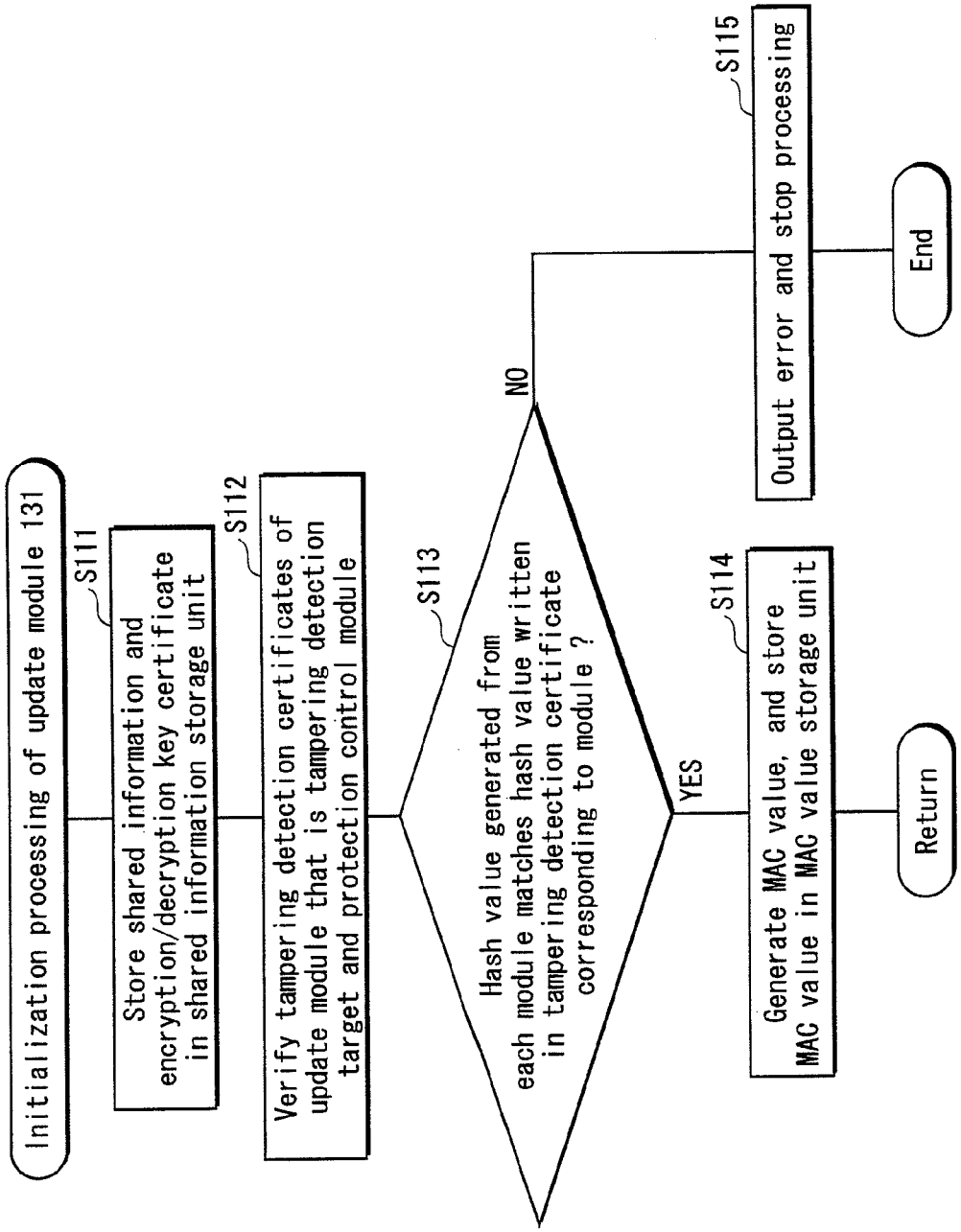
FIG. 12 is a flow chart showing install module initialization processing.

FIG. 12 is a flow chart showing the install module initialization processing. In FIG. 12, only the operations of the install module 131 are shown as a representative of the install modules. The operations of other install modules are basically the same as the operations of the install module 131.

Firstly, the install module 131 stores, in the shared information storage unit 310, the shared information pair and the encryption/decryption key certificate that have been received from the protection control module 120 (Step S111).

The install module 131 verifies tampering detection certificates of other install module that is a tampering detection target and the protection control module 120 (Step S112). This verification is performed by generating a hash value from each of the modules and comparing the generated hash value with a hash value written in the corresponding tampering detection certificate.

The install module 131 judges whether the generated hash value matches the hash value written in the corresponding tampering detection certificate (Step S113). If the hash value matches the hash value written in the corresponding tampering detection certificate (Step S113: YES), the install module 131 generates MAC values respectively for the other install module that is the tampering detection target and the protection control module 120, and stores the generated MAC values in the MAC value storage unit 309, as an MAC value table (Step S114).

If at least any one of the hash values does not match the hash value written in the corresponding tampering detection certificate (Step S113: No), the install module 131 outputs an error and stop the processing (Step S115).

9.3. Operations During Detection Processing

Next, the detection processing is described. After the initialization processing, the apparatus 100 is shipped from the factory to be supplied to users. When a user uses the apparatus 100 to use the applications 110 and 111, the protection control module 120 of the apparatus 100 controls the functions such as the decryption loading function, the tampering detection function, and the analysis tool detection function, thereby to protect the applications 110 and 111 against an attacker's attack.

Figure 13:
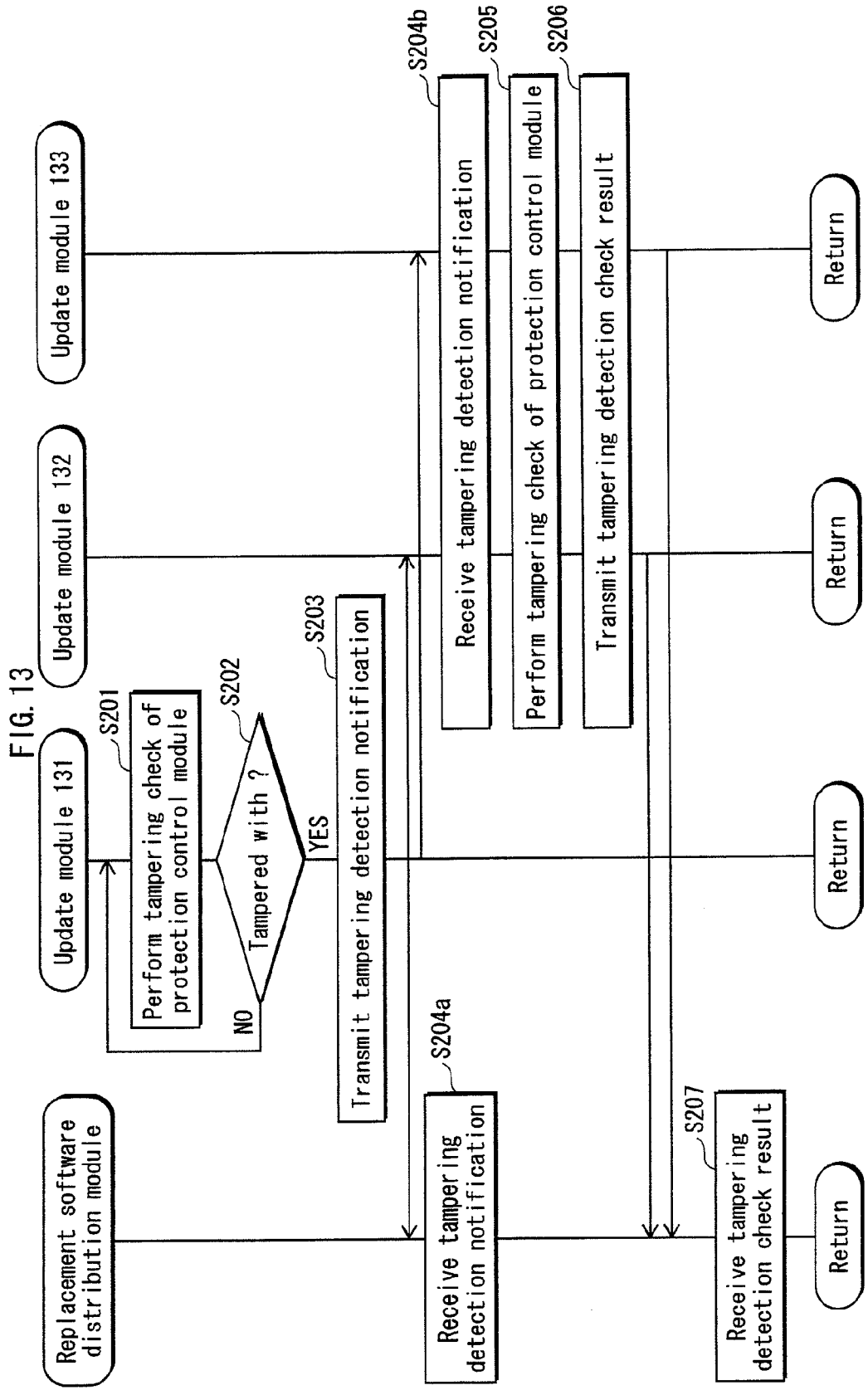
FIG. 13 is a flow chart showing the operations of the software update system 1000 during detection processing.

FIG. 13 is a flow chart showing the operations of the software update system 1000 during the detection processing. In the detection processing, firstly, the install modules 131, 132, and 133 each perform tampering detection of the protection control module 120 (Step S201). The tampering detection is performed by calculating an MAC value of the protection control module 120 using a verification key and comparing the calculated MAC value with the MAC value calculated in the initial design processing which is stored in the MAC value table. Note that the description in FIG. 13 is simplified in which only the install module 131 checks whether the protection control module has been tampered with. The install modules 132 and 133 of course each perform the same processing. With respect to the subsequent processing, FIG. 13 mainly shows the case where the install module 131 detects that the protection control module has been tampered with. In the case where the install modules 132 and 133 each detect tampering of the protection control module, the same processing is basically performed.

The install module 131 judges whether the protection control module 120 has been tampered with, that is, whether the MAC values match each other (Step S202). If judging that the protection control module 120 has been tampered with (Step S202: YES), the install module 131 transmits a tampering detection notification to the replacement software distribution module 210 and the other install module (Step S203).

If judging that the protection control module 120 has not been tampered with (Step S202: No), the install module 131 transmits no notification to the replacement software distribution module 210 and the other install module, and the flow returns to the tampering detection processing (S201).

Upon receiving the tampering detection notification from the install module 131 (Step S204*b*), the install modules 132 and 133 each perform tampering check of the protection control module 120 using a verification key and an MAC value (Step S205), and transmits a result of the tampering check to the replacement software distribution module 210 (Step S206).

The replacement software distribution module 210 receives the tampering detection notification from the install module 131 (Step S204*a*), and receives the results of the tampering check from the install modules 132 and 133 (Step S207).

9.4. Operations During Analysis/Judgment Processing

Figure 14:
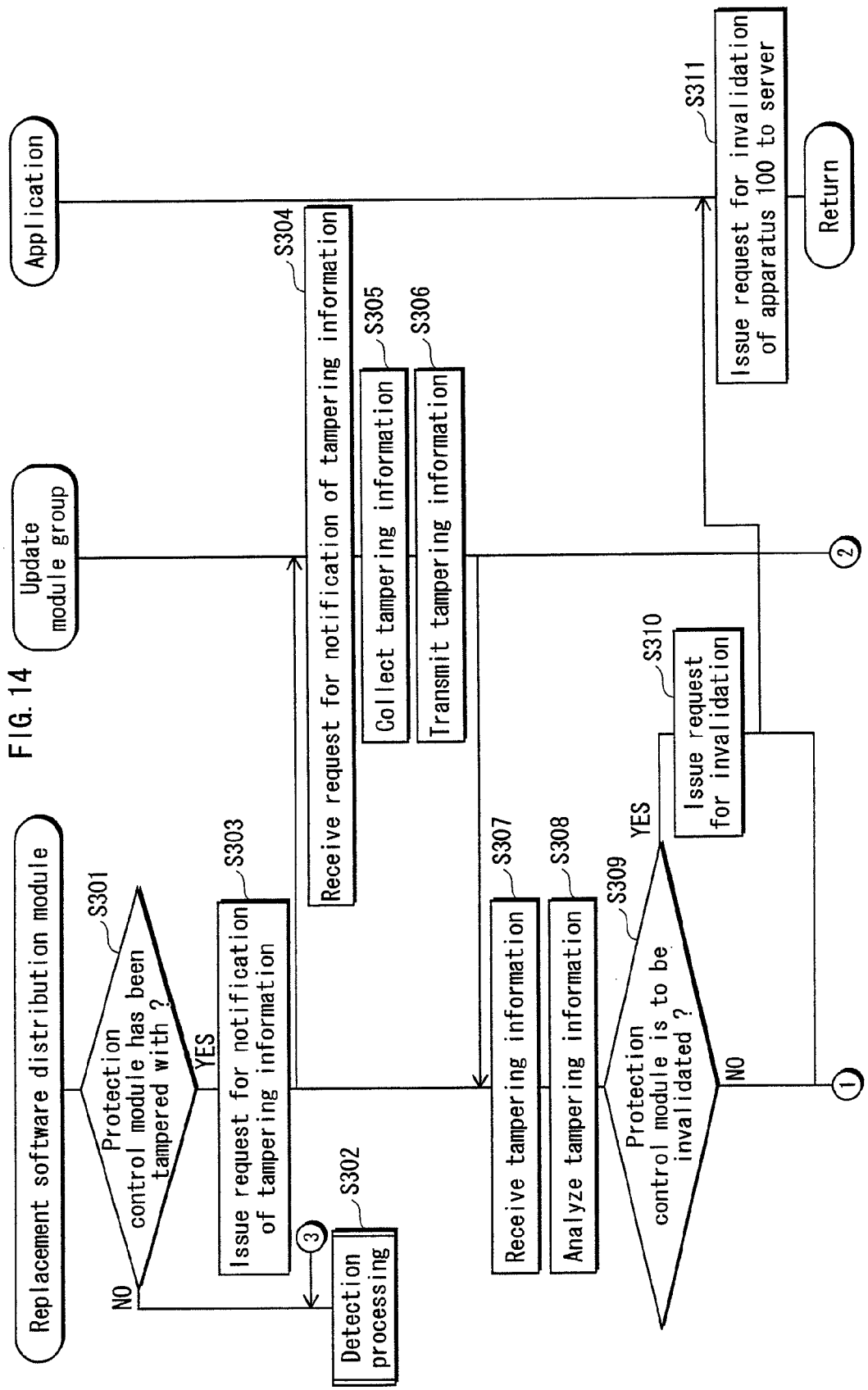
FIG. 14 is a flow chart showing the operations of the software update system 1000 during analysis/judgment processing.
Figure 15:
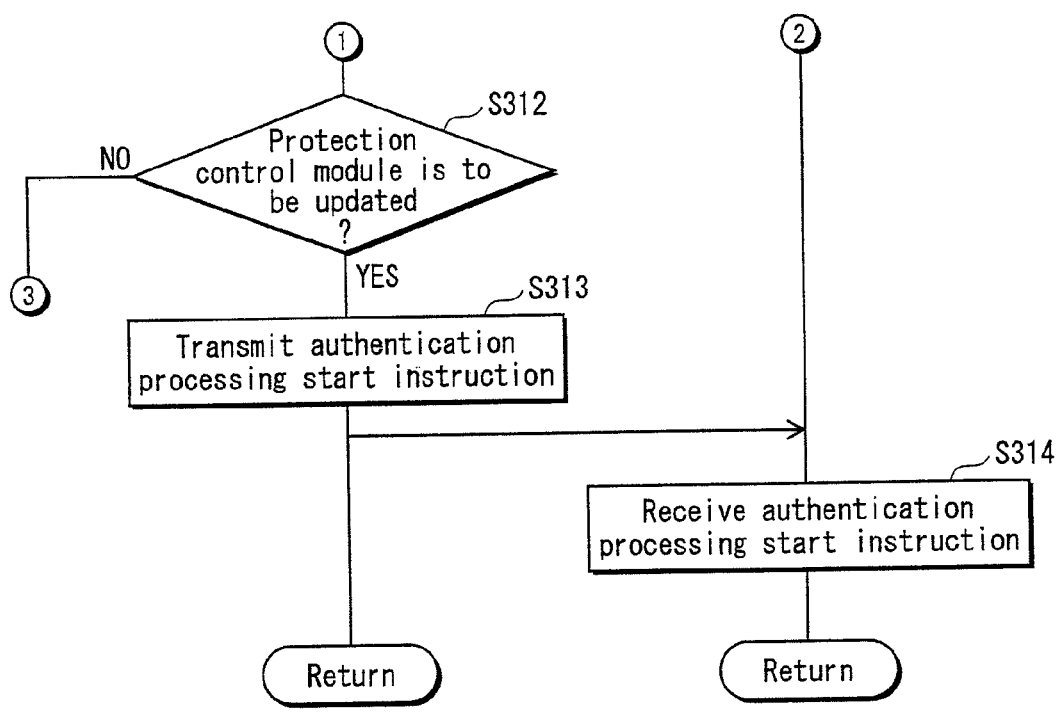
FIG. 15 is a flow chart showing the operations of the software update system 1000 during the analysis/judgment processing.

Next, the analysis/judgment processing is described. FIGS. 14 and 15 are each a flow chart showing the operations of the software update system 1000 during the analysis/judgment processing. In the flow charts, the processing performed separately by the install modules 131, 132, and 133 are collectively described as processing performed by the install module group.

In the detection processing, if receiving the tampering detection notification from the install modules 131 and receiving the results of the tampering check from the install modules 132 and 133 (Steps S204*a* and S207), the replacement software distribution module 210 judges whether the protection control module 120 has been tampered with, based on the received tampering detection notification and results of the tampering check (Step S301). The judgment is performed in the following manner. For example, if it is judged that a predetermined number of install modules (majority of the install modules, for example) have been tampered with, this means that the protection control module 120 has been tampered with. Conversely, if it is judged that the majority of the install modules have not been tampered with, this means that the protection control module 120 has not been tampered with.

If judging that the protection control module 120 has not been tampered with (Step S301: NO), the flow returns to the detection processing (Step S302).

If judging that the protection control module 120 has been tampered with (Step S301: YES), the replacement software distribution module 210 requests the install modules 131, 132, and 133 to transmit tampering information indicating which part of the protection control module 120 has been tampered with, to the replacement software distribution module 210 (Step S303).

Upon receiving the request for transmission of the tampering information notification (Step S304), the install module group collects tampering information (Step S305). Tampering information is collected in the following manner. For example, on the assumption that the protection control module 120 is divided into a plurality of pieces and a certificate (in which a hash value is written) is issued in advance for each of the plurality of pieces, tampering information can be collected by calculating a hash value for each of the pieces and judging whether the calculated hash value matches a hash value written in the corresponding certificate.

After collecting the tampering information, the install module group transmits the collected tampering information to the replacement software distribution module 210 (Step S306).

Upon receiving the tampering information from the install module group (Step S307), the replacement software distribution module 210 analyzes the received tampering information (Step S308), and judges whether to revoke the protection control module 120, based on a result of the analysis (Step S309).

If judging to revoke the protection control module 120 (Step S309: YES), the replacement software distribution module 210 requests, via the applications 110 and 111, a server (not shown) which supplies services to the applications 110 and 111 to revoke the apparatus 100 (Steps S310 and 311).

If judging not to revoke the protection control module 120 (Step S309: NO), the replacement software distribution module 210 judges whether to update the protection control module 120 (Step S312).

If judging to update the protection control module 120 (Step S312: YES), the replacement software distribution module 210 transmits an authentication processing start instruction to the install module group (Step S313). The install module group receives the authentication processing start instruction (Step S314).

If judging not to update the protection control module 120 (Step S312: NO), the flow returns to the detection processing (Step S302).

Revocation and update of the protection control module 120 are performed by judging whether an important part of the protection control module 120 has been tampered with, or at least a certain part of the protection control module 120 has been tampered with, for example.

9.5. Operations During Mutual Authentication Processing

Next, the mutual authentication processing is described. In the analysis/judgment processing, it is judged that the protection control module 120 needs to be updated. After an authentication processing start instruction is issued to the install modules 131, 132, and 133, mutual authentication processing is performed between the replacement software distribution module 210 and each of the install modules 131, 132, and 133. This can prevent the apparatus 100 from being connected to an unauthentic update server, and prevent the update server 200 from being connected to an unauthentic apparatus. In order to perform mutual authentication, the update server 200 uses a signature private key and a signature public key, the install modules 131, 132, and 133 each use an authentication key pair (authentication private key and authentication public key).

Figure 16:
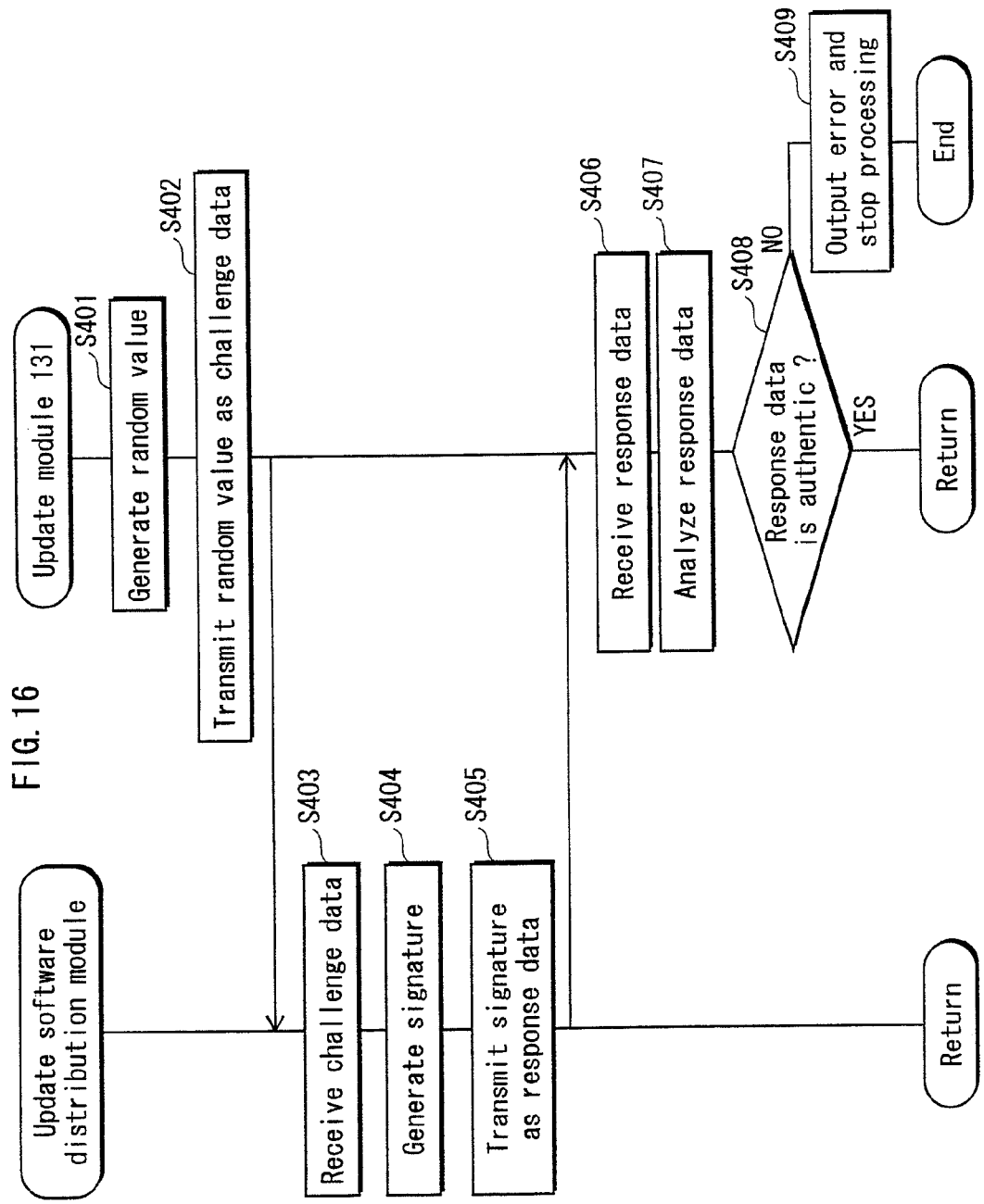
FIG. 16 is a flow chart showing the operations of the software update system 1000 while an install module 131 performs authentication processing of the replacement software distribution module 210.

As the operations of mutual authentication, the install modules 131, 132, and 133 each perform authentication processing of the replacement software distribution module 210. FIG. 16 is a flow chart showing the operations of the software update system 1000 while the install module 131 performs authentication processing of the replacement software distribution module 210. FIG. 16 shows only the operations of the install module 131 as a representative of the install modules. Other install modules each basically operate in the same way as the install module 131.

The install module 131 generates a random number using a random number generator (Step S401), and transmits the generated random number to the replacement software distribution module 210, as challenge data (Step S402). Here, an install module identifier for identifying the install module 131 is transmitted together with the challenge data.

Upon receiving the challenge data from each of the install modules (Step S403), the replacement software distribution module 210 generates a signature for the received challenge data using a signature private key (Step S404), and transmits the generated signature to the install module that has transmitted the challenge data, as response data (Step S405).

Upon receiving the response data from the replacement software distribution module 210 (Step S406), the install module 131 verifies the signature using the signature public key to check whether the received response data is a signature for the transmitted challenge data (Step S407).

As a result of the verification, if the response data is a signature for the transmitted challenge data, that is, if the replacement software distribution module 210 is an authentic module (Step S408: YES), the install module 131 continues to perform the processing.

If the response data is not a signature for the transmitted challenge data, that is, if the replacement software distribution module 210 is not an authentic module (Step S408: NO), the install module 131 outputs an error, and stops the processing (Step S409).

Figure 17:
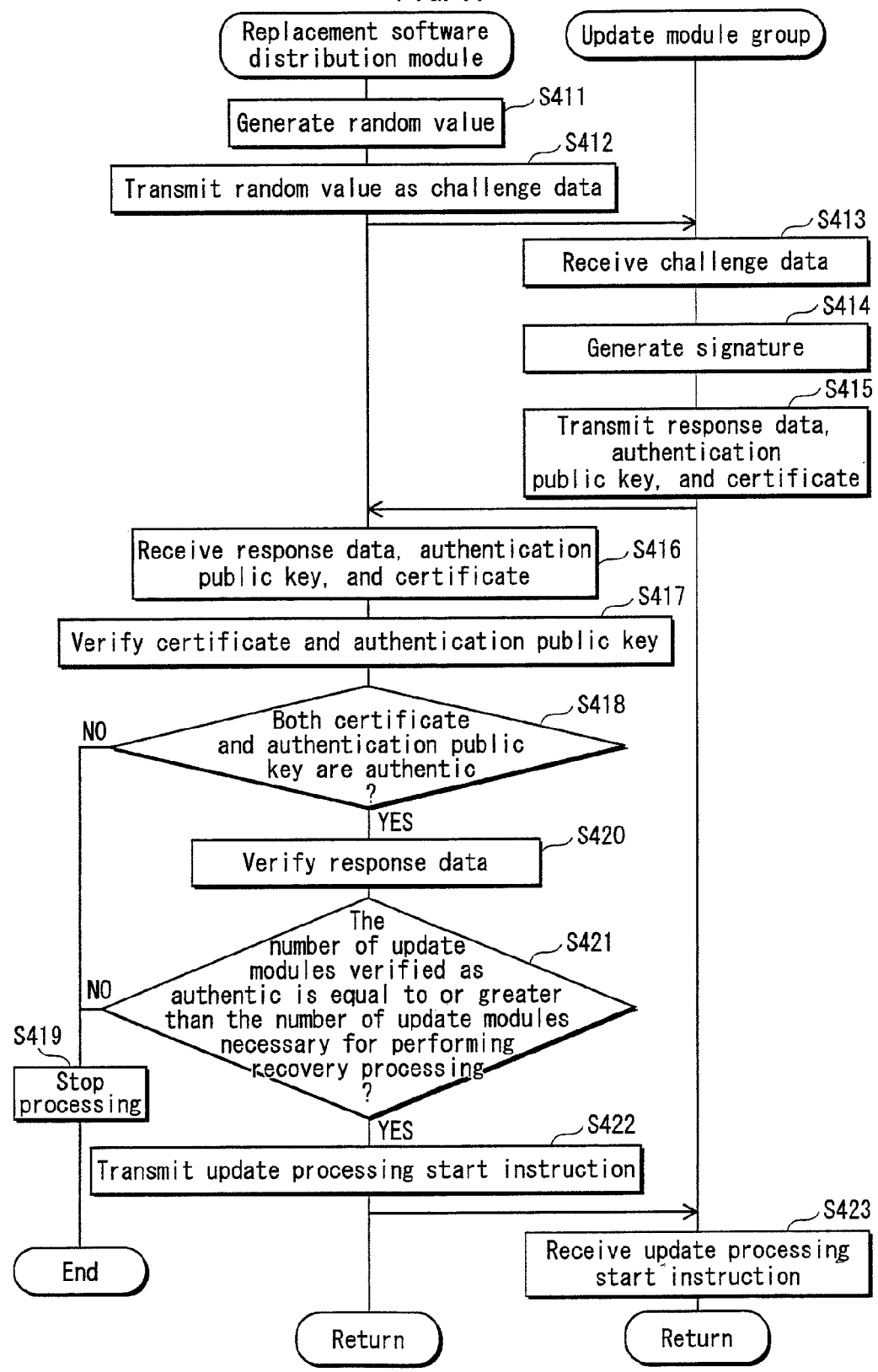
FIG. 17 is a flow chart showing the operations of the software update system 1000 while the replacement software distribution module 210 performs authentication processing of the install modules 131, 132, and 133.

Then, the replacement software distribution module 210 performs authentication processing of the install modules 131, 132, and 133. FIG. 17 is a flowchart showing the operations of the software update system 1000 while the replacement software distribution module 210 performs authentication processing of the install modules 131, 132, and 133. In the flow chart, the processing performed separately by the install modules 131, 132, and 133 are collectively described as processing performed by the install module group.

The replacement software distribution module 210 generates, using a random number generator, the number of random numbers equivalent to the number of install modules that has transmitted challenge data in the above processing (Step S411), and transmits the generated random numbers as challenge data in a manner that the random numbers one-to-one correspond to the install modules (Step S412).

Upon receiving the challenge data from the replacement software distribution module 210 (Step S413), the install module group generates a signature for the received challenged data using an authentication private key (Step S414), and transmits the generated signature to the replacement software distribution module 210, as response data (Step S415). Here, the authentication public key and the authentication key certificate are transmitted together to the replacement software distribution module 210 (Step S415).

Upon receiving the response data, the authentication public key, and the authentication key certificate from the install module group (Step S416), the replacement software distribution module 210 verifies whether the authentication key certificate is a certificate issued by the replacement software distribution module 210, and then verifies the authentication public key using the authentication key certificate (Step S417).

As a result of the verifications, if there is a problem with one of the authentication key certificate and the authentication public key (Step S418: NO), the replacement software distribution module 210 stops the processing (Step S419).

As a result of the verifications, if there is no problem with both of the authentication key certificate and the authentication public key (Step S418: YES), the replacement software distribution module 210 verifies the signature using the authentication public key to judge whether the received response data is a signature for the challenge data transmitted from the replacement software distribution module 210 (Step S420). Then, the replacement software distribution module 210 judges whether to perform recovery processing, based on a result of the verification. This judgment is performed by, for example, judging whether the number of install modules that are judged to be authentic modules as a result of verification is equal to or greater than the predetermined number of install modules necessary for performing the recovery processing (Step S421).

If judging that the number of install modules verified as authentic modules is less than the number of install modules necessary for performing the recovery processing (Step S421: NO), the replacement software distribution module 210 stops the processing (Step S419).

If judging that the number of install modules verified as authentic modules is equal to or greater than the number of install modules necessary for performing the recovery processing (Step S421: YES), the replacement software distribution module 210 issues an update processing start instruction to the install module verified as an authentic module (Step S422). The install module verified as an authentic module receives the update processing start instruction (Step S423). This completes the mutual authentication processing.

Note that, in the mutual authentication processing, the replacement software distribution module 210 creates an authentication list composed of install module identifiers of all of the authenticated install modules. The subsequent recovery processing is performed using only install modules included in the authentication list.

9.6. Operations During Recovery Processing

Figure 18:
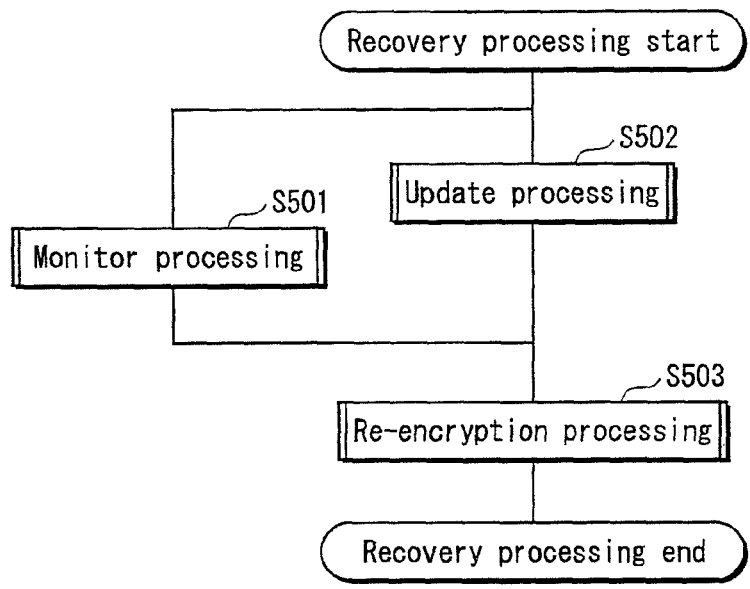
FIG. 18 is a flow chart showing the operations of the software update system 1000 during recovery processing.

Next, the recovery processing is described with reference to FIGS. 18 to 24. In the mutual authentication processing, if mutual authentication succeeds, recovery processing is performed in which the protection control module 120 that has been tampered with is updated to the replacement protection control module 121. FIG. 18 is a flowchart showing operations of the software update system 1000 during the recovery processing. The recovery processing falls into the following three processing.

In the first processing that is monitor processing, the install modules 131, 132, and 133 perform tampering detection processing on one another (Step S501).

In the second processing that is update processing, the install modules 131, 132, and 133 each update the replacement protection control module 120 using the replacement protection control module 121 (Step S502).

In the third processing that is re-encryption processing, the applications 110 and 111 that have been encrypted are re-encrypted (Step S503).

Note that all of the above three processing does not necessarily need to be peformed. Alternatively, it is only necessary to perform monitor processing of performing tampering detection of other install module (Step S501) and update processing of receiving a trigger for update from outside and updating the protection control module 120 with use of the replacement protection control module 121 (Step S502).

The details of the above three processing are described in order.

9.6.1. Monitor Processing

In the monitor processing, the install modules 131, 132, and 133 included in the install module group 130 each perform tampering detection processing on other install module included in the install module group 130. As a result, even when part of the install modules is tampered with by an attacker during recovery processing, it is possible to detect tampering of it. Furthermore, by regularly performing monitor processing, it is possible to detect tampering before the replacement protection control module 121 has completely leaked, thereby to prevent its leakage.

Figure 19:
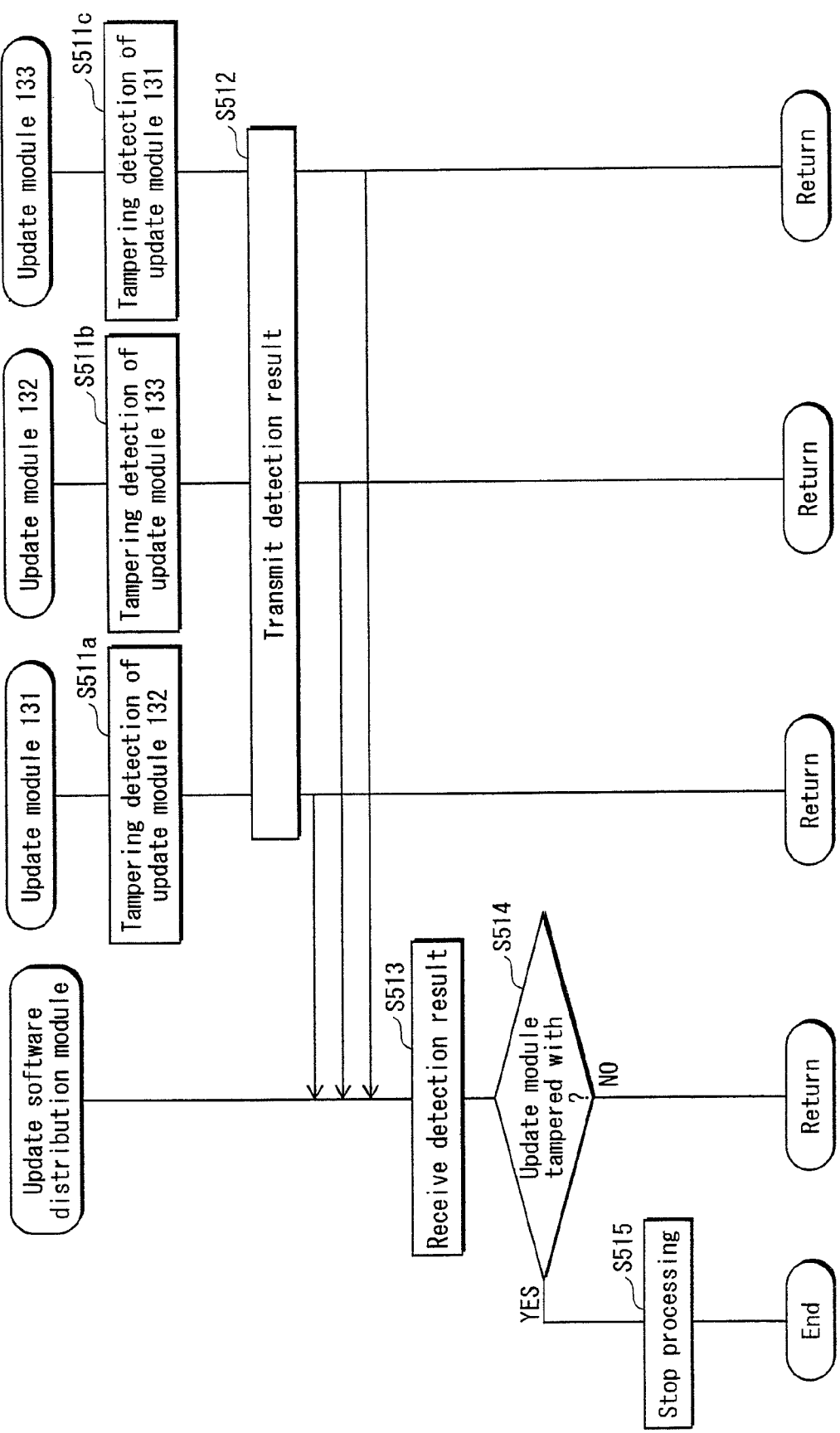
FIG. 19 is a flow chart showing monitor processing.

The following describes an example of the monitor processing in detail with reference to a flow chart. FIG. 19 is a flow chart showing the monitor processing.

Firstly, the install module 131 performs tampering detection processing on the install module 132 (Step S511a), and the install module 132 performs tampering detection processing on the install module 133 (Step S511b), and the install module 133 performs tampering detection processing on the install module 131 (Step S511c). Tampering detection is performed by calculating an MAC value of each of the install modules 131, 132, and 133 using a verification key, comparing the calculated MAC value with an MAC value calculated during the initial design processing, which is stored in the MAC value table. Alternatively, tampering detection may be performed by calculating a hash value of each of the install modules 131, 132, and 133, and comparing the calculated hash value with a hash value written in a certificate attached beforehand to each of the install modules 131, 132, and 133.

The install modules 131, 132, and 133 each output a result of the tampering detection processing to the replacement software distribution module 210 (Step S512).

The replacement software distribution module 210 receives a result of the tampering detection processing from each of the install modules 131, 132, and 133 (Step S513), and judges whether any of the install modules has been tampered with (Step S514).

If judging that any of the install modules has been tampered with (Step S514: YES), the replacement software distribution module 210 immediately stops the recovery processing (Step S515).

If judging that none of the install modules has been tampered with (Step S514: NO), the replacement software distribution module 210 continues the recovery processing.

9.6.2. Update Processing

Next, the update processing is described. In the update processing, the replacement software distribution module 210 super-encrypts the replacement protection control module 121 using a plurality of keys, and transmits the encrypted replacement protection control module 121 to one or more install modules included in the install module group 130. The plurality of install modules included in the install module group 130 each update the protection control module 120 to the replacement protection control module 121. Here, the replacement software distribution module 210 controls a transmission timing of a plurality of keys for decrypting the super-encrypted replacement protection control module 121 to the install modules included in the install module group 130. This makes it possible for an attacker to obtain the replacement protection control module 121 that has not been encrypted.

Figure 20:
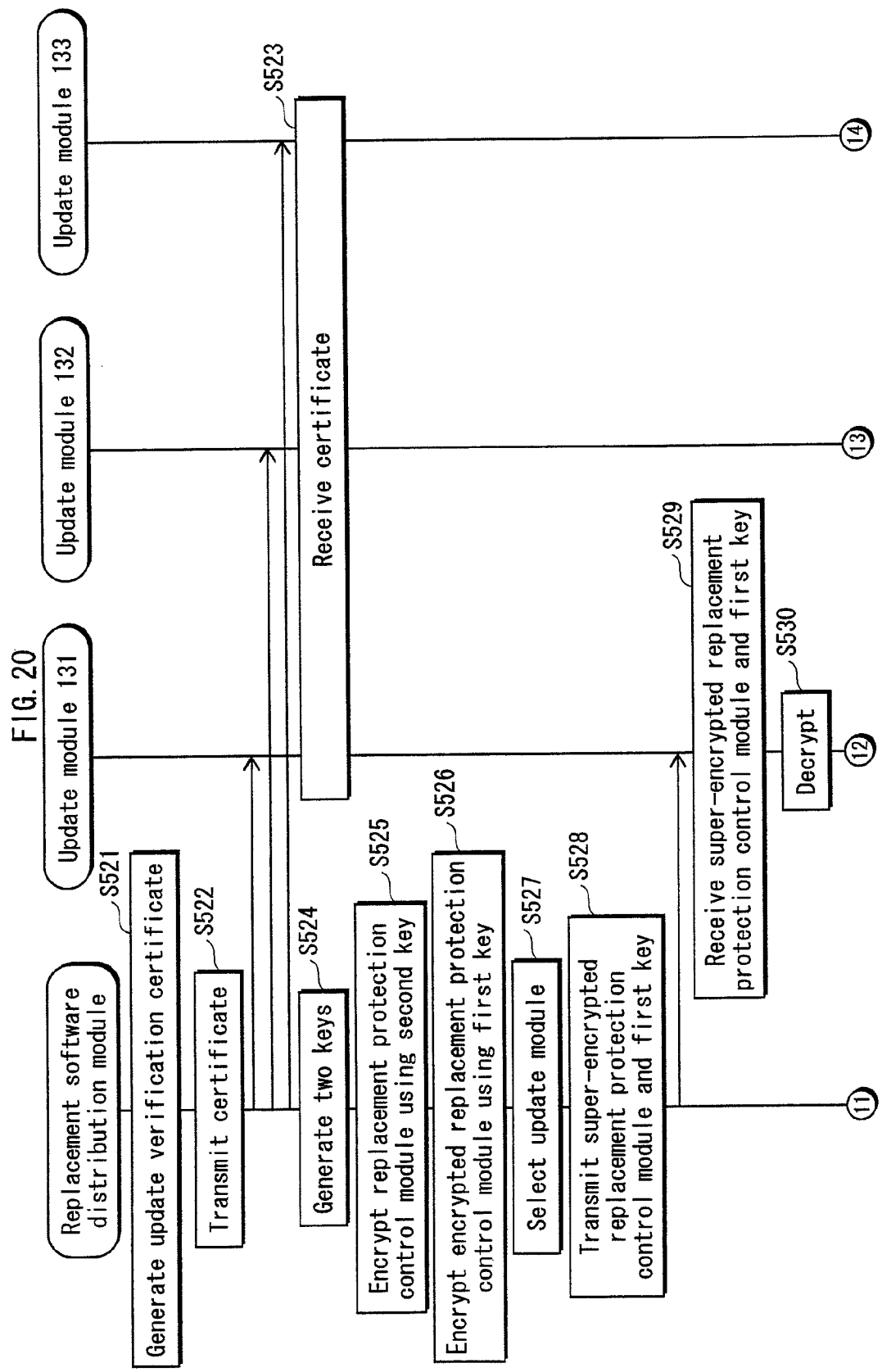
FIG. 20 is a flow chart showing update processing of a protection control module.
Figure 21:
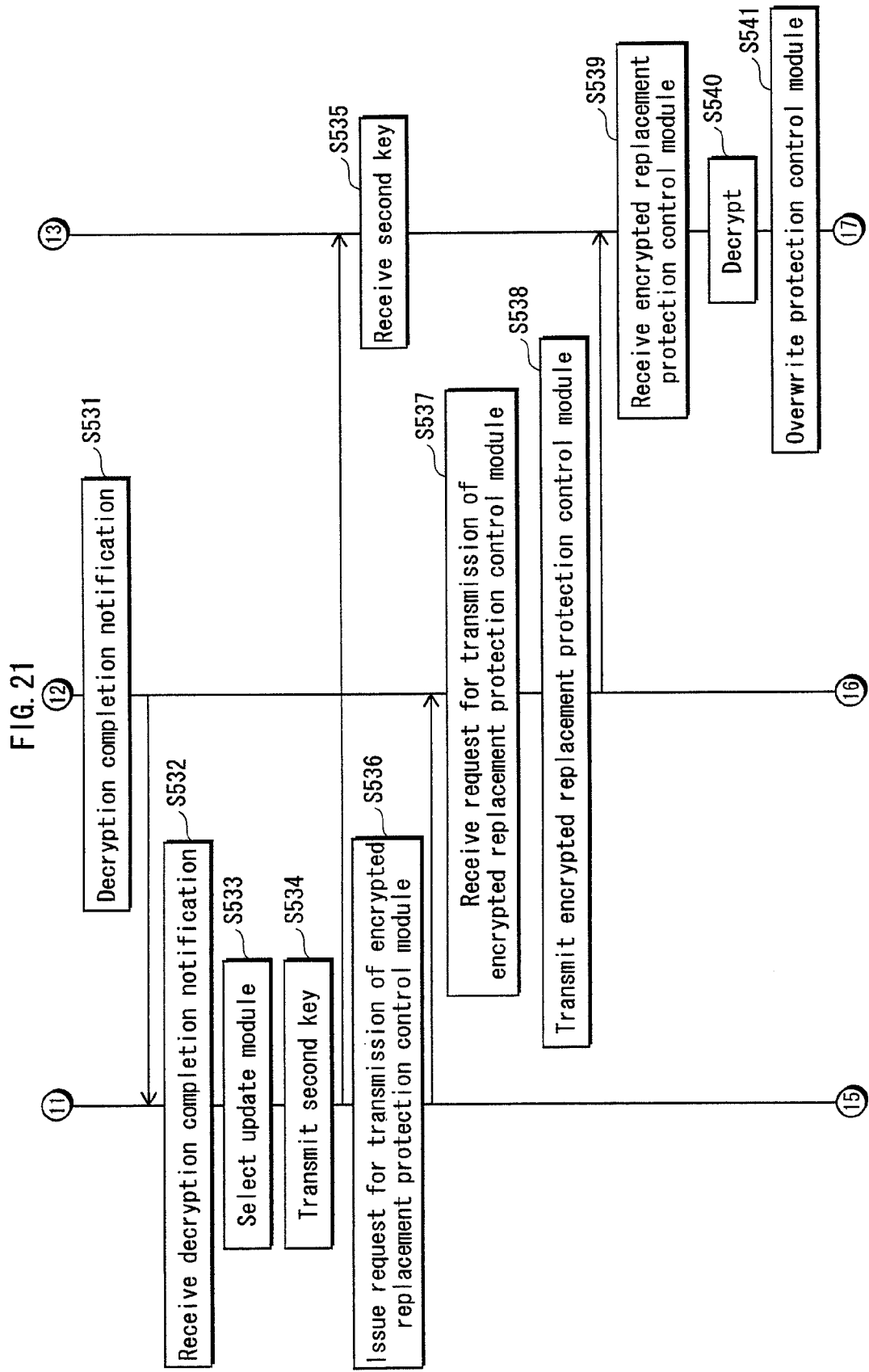
FIG. 21 is a flow chart showing the update processing of the protection control module.
Figure 22:
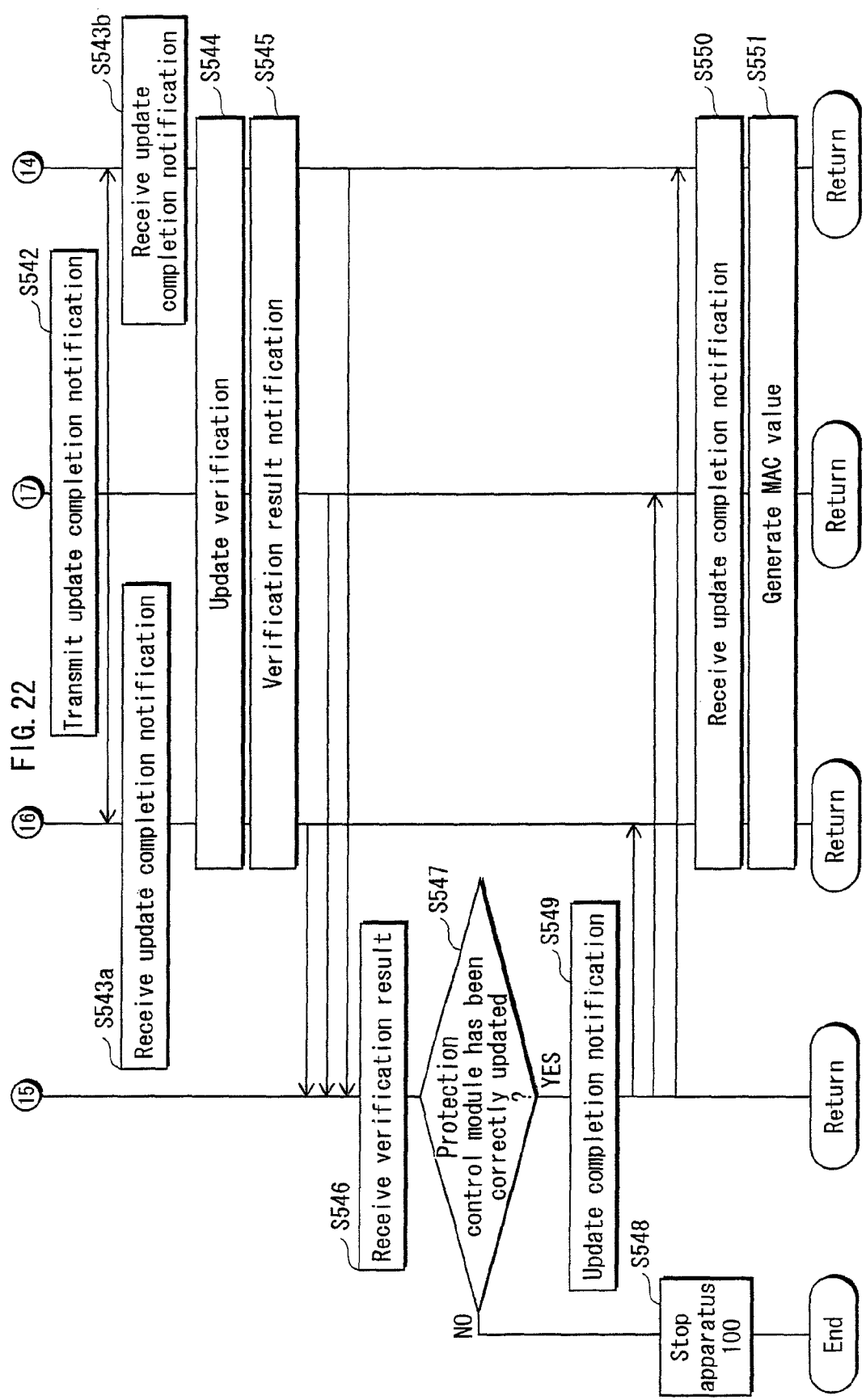
FIG. 22 is a flow chart showing the update processing of the protection control module.

The following describes an example of the update processing in detail with reference to flow charts. FIGS. 20-22 are each a flow chart showing the update processing.

Firstly, the replacement software distribution module 210 generates a certificate (update verification certificate) of the replacement protection control module 121 using the certificate generation unit 408, such that the install modules 131, 132, and 133 can each verify whether the replacement protection control module 121 has been correctly installed on the apparatus 100 (Step S521). The replacement software distribution module 210 transmits the generated update verification certificate to the install modules 131, 132, and 133 (Step S522). The update verification certificate is generated using the signature private key. The install modules 131, 132, and 133 each receive the update verification certificate (Step S523).

Next, the replacement software distribution module 210 generates a plurality of encryption keys (two keys including a first key and a second key, here) for super-encrypting the replacement protection control module 121, using the encryption key generation unit 403 (Step S524). Then, the replacement software distribution module 210 encrypts the replacement protection control module 121 by the encryption processing unit 402 using the second key, thereby to generate an encrypted replacement protection control module (Step S525). The replacement software distribution module 210 further encrypts the encrypted replacement protection control module 121 using the first key, thereby to generate a super-encrypted replacement protection control module 121 (Step S526).

The replacement software distribution module 210 selects one install module (the install module 131, here) among the plurality of install modules included in the install module group 130 (Step S527), and transmits the super-encrypted replacement protection control module 121 and the first key to the selected install module 131 (Step S528).

Upon receiving the super-encrypted replacement protection control module 121 and the first key (Step S529), the install module 131 decrypts the super-encrypted replacement protection control module 121 using the first key, thereby to acquire an encrypted replacement protection control module 121 (Step S530). After the decryption completes, the install module 131 transmits a decryption completion notification to the replacement software distribution module 210 (Step S531).

Upon receiving the decryption completion notification (Step S532), the replacement software distribution module 210 selects one install module (the install module 132, here) that is other than the selected install module 131 among the plurality of install modules included in the install module group 130 (Step S533), and transmits the second key to the selected install module 132 (Step S534), and requests the install module 131 to transmit the encrypted replacement protection control module 121 to the install module 132 (Step S536).

Upon receiving the request from the replacement software distribution module 210 (Step S537), the install module 131 transmits the encrypted replacement protection control module 131 to the install module 132 (Step S538).

Upon receiving the second key from the replacement software distribution module 210 (Step S535) and receiving the encrypted replacement protection control module 121 from the install module 131 (Step S539), the install module 132 decrypts the encrypted replacement protection control module 121 using the second key, thereby to acquire the replacement protection control module 121 (Step S540).

The install module 132 overwrites the protection control module 120 with the acquired replacement protection control module 121, thereby to update to a new protection control module 121 (Step S541). After the update completes, the install module 132 transmits an update completion notification to the other install modules 131 and 133 (Step S542). The install modules 131 and 133 each receive the update completion notification (Steps S543a and 543b).

The install modules 131, 132, and 133 each verify whether the protection control module 121 has been correctly updated using the update verification certificate received beforehand (Step S544), and transmit a result of the verification to the replacement software distribution module 210 (Step S545).

Upon receiving the results of the verifications transmitted from the install modules (Step S546), the replacement software distribution module 210 judges whether the protection control module 121 has been correctly updated based on the received results of the verifications (Step S547). If judging that the protection control module 121 has not been correctly updated (Step S547: NO), the protection control module 121 stops the apparatus 100 (Step S548).

If judging that the protection control module 121 has been correctly updated (Step S547: YES), the protection control module 121 transmits an update processing completion notification to the install modules (Step S549).

Upon receiving the update processing completion notification (Step S550), the install modules 131, 132, and 133 each generate an MAC value of the protection control module 121, and stores a pair of an identifier of the protection control module 121 and the generated MAC value in the MAC value table (Step S551).

9.6.3. Correlation Between Monitor Processing and Update Processing

Next, the correlation between the monitor processing and the update processing is described. The above monitor processing and update processing are performed in cooperation with each other.

The monitor processing is performed regularly. Specifically, the monitor processing is performed when the replacement software distribution module 210 transmits a plurality of keys to an install module included in the install module group 130. Also, the monitor processing is performed while an install module included in the install module group 130 of the encrypted replacement protection control module performs decryption processing. The time intervals for regularly performing monitor processing are, for example, shorter than a time period until the replacement protection control module 121 is completely output outward via a communication path. If it takes one second for the replacement protection control module 121 to be completely output outward, the monitor processing is performed at shorter intervals such as 500 millisecond intervals.

Figure 23:
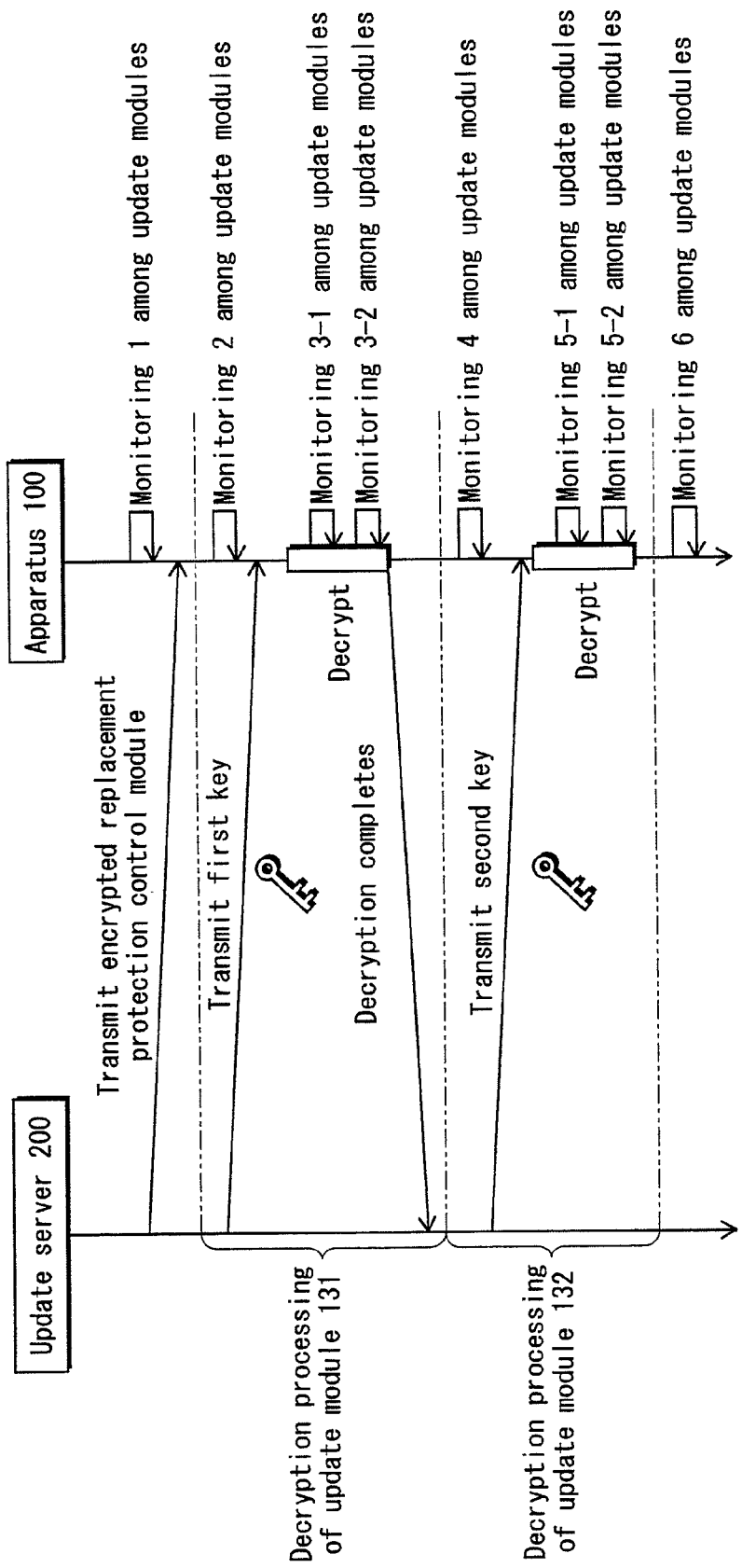
FIG. 23 is a pattern diagram showing the flow of the linked operations of the monitor processing and the update processing.

The linked operations of the monitor processing and the update processing are described with reference to FIG. 23. FIG. 23 is a pattern diagram showing the flow of the linked operations of the monitor processing and the update processing. In FIG. 23, only the important processing is described with respect to the monitor processing and the update processing.

Firstly, when the recovery processing starts, monitor processing (Monitoring 1) is performed within the apparatus 100 before the super-encrypted replacement protection control module 121 is transmitted from the update server 200 to the apparatus 100. This is in order to verify whether an unauthentic install module is not included in the apparatus 100 at the start of the update processing.

Then, before the first key is transmitted from the update server 200 to the apparatus 100 and the install module 131 receives the first key, monitor processing (Monitoring 2) is performed. This is in order to verify that when the apparatus 100 receives the key, there is no unauthentic install module within the apparatus 100.

Furthermore, while the install module 131 receives the first key and decrypts the super-encrypted replacement protection control module 121 using the first key, decryption performed by the install module 131 is regularly interrupted and monitor processing (Monitoring 3-1 and 3-2) is performed. As a result, even if any one of the install modules 131, 132, and 133 is attacked during the decryption processing, it is possible to detect the attack performed by the attacker before all parts of the encrypted replacement protection control module 121 are leaked. This can prevent the leakage of the encrypted replacement protection control module 121.

In the subsequent processing, in the same way as in the above processing, before the install module 132 receives the second key that has been transmitted from the update server 200 to the apparatus 100, monitor processing (Monitoring 4) is performed. It is detected whether an unauthentic install module is included in the apparatus 100 when the apparatus 100 receives the key.

Furthermore, while the install module 132 decrypts the encrypted replacement protection control module 121 using the second key after receiving the second key, the decryption processing performed by the install module 132 is regularly interrupted and monitor processing (Monitoring 5-1 and 5-2) is performed. As a result, it is possible to detect an attack performed by an attacker before all parts of the replacement protection control module 121 are leaked. This can prevent the leakage of the replacement protection control module 121.

Also, in each of the above monitor processing, the install modules each transmit a result of the tampering detection to the replacement software distribution module 210. If judging that any one of the install modules has been tampered with based on the results of the tampering detection, the replacement software distribution module 210 stops the recovery processing. As a result, if an attack performed by an attacker is detected before the first key or the second key is transmitted, the attacker cannot acquire a key for decrypting the super-encrypted replacement protection control module 121.

9.6.4. Re-Encryption Processing

Next, the re-encryption processing is described. In the re-encryption processing, the replacement protection control module 121 acquires a piece of shared information stored in each of the install modules, and recovers the encryption/decryption key (old encryption/decryption key) stored in the protection control module 120 that has not been updated using the acquired pieces of shared information. Furthermore, the replacement protection control module 121 newly generates an encryption/decryption key (new encryption/decryption key), and decrypts the encrypted applications 110 and 111 using the recovered old encryption/decryption key, and then re-encrypts the applications 110 and ill using the new encryption/decryption key.

Figure 24:
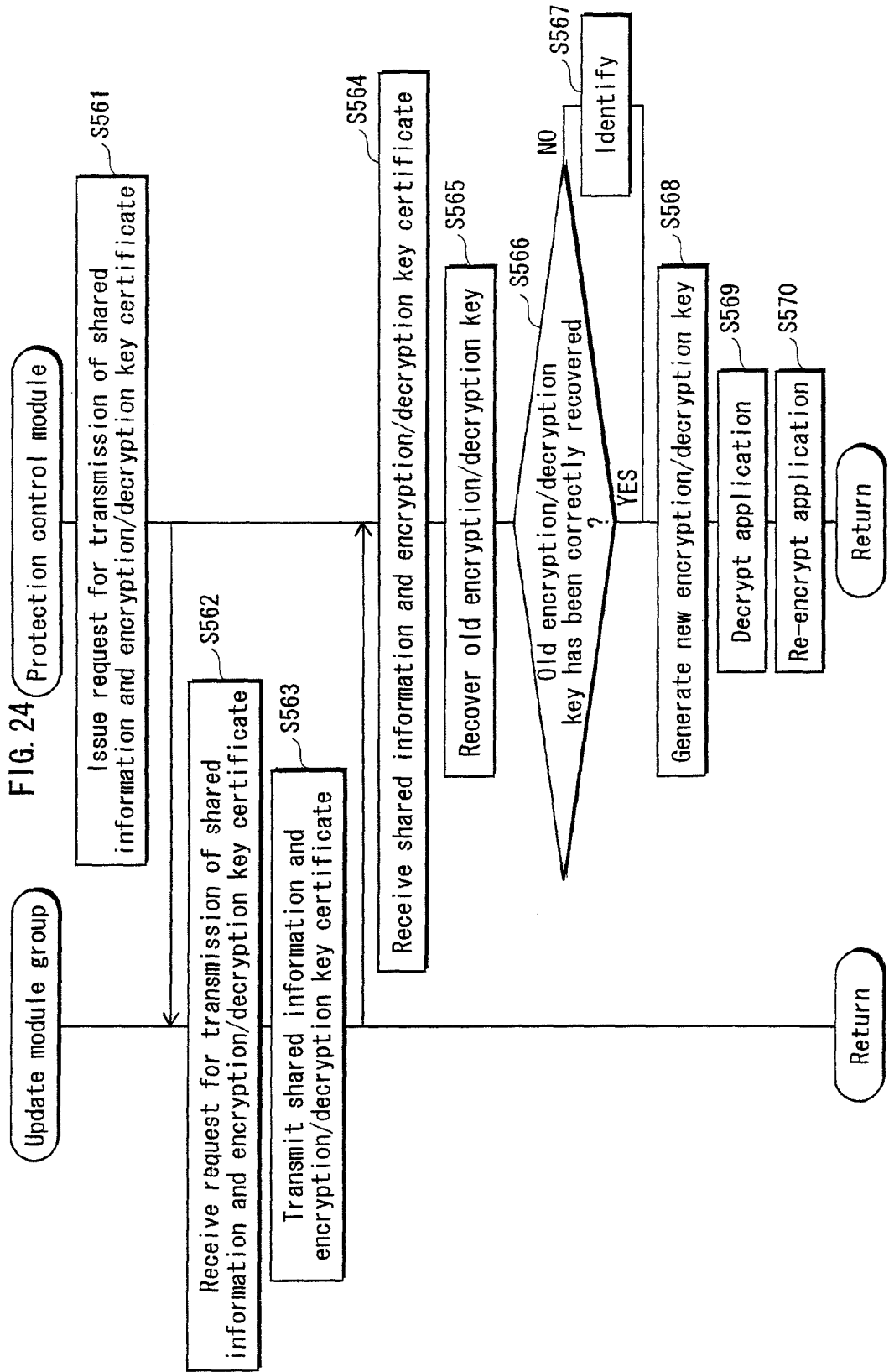
FIG. 24 is a flow chart showing re-encryption processing.

The following describes an example of the re-encryption processing in detail with reference to a flow chart. FIG. 24 is a flow chart showing the re-encryption processing. In the flow chart, the processing performed separately by the install modules 131, 132, and 133 are collectively described as processing performed by the install module group.

Firstly, the updated protection control module 121 requests each of the install modules 131, 132, and 133 to transmit the piece of shared information and the encryption/decryption key certificate stored therein to the updated protection control module 121 (Step S561).

Upon receiving the transmission request from the protection control module 121 (Step S562), the install module group transmits shared information and an encryption/decryption key certificate to the protection control module 121 (Step S563).

Upon receiving the shared information and the encryption/decryption key certificate from the install module group (Step S564), the protection control module 121 recovers the encryption/decryption key (old encryption/decryption key) that has been used by the protection control module 120 before update, from the received shared information (Step S565). Then, the protection control module 121 verifies whether the old encryption/decryption key has been correctly recovered, using the encryption/decryption key certificate (Step S566).

If the old encryption/decryption key has not been correctly recovered (Step S566: NO), the protection control module 121 identifies which install module has transmitted unauthentic shared information (Step S567). The protection control module 121 notifies the update server 200 of the identified unauthentic install module.

Here, the following methods are used for identifying an unauthentic install module. Firstly, the protection control module 121 acquires shared information pairs from the install modules respectively, and attaches, to each of the acquired shared information pairs, a piece of identification information for identifying from which install module the shared information pair has been acquired. Then, the protection control module 121 classifies, into groups, pieces of shared information having the same identifier attached thereto that should have the same value. The protection control module 121 compares values of pieces of the shared information classified into each group with one another, and further classifies, into groups, pieces of the shared information that should have the same value (classifies the pieces into a subgroup). Then, the protection control module 121 generates an old encryption/decryption key for each of all the combinations of the subgroup selected from all the groups, and verifies whether an authentic old encryption/decryption key has been generated. As a result of the verification, if an authentic old encryption/decryption key has been generated, the protection control module 121 attaches, to a subgroup selected from the combination, verification success identification information that indicates the subgroup selected among the combinations has succeeded in the verification. After performing generation of an old encryption/decryption key and verification on whether the old encryption/decryption key is authentic for each of all the combinations, the protection control module 121 removes a piece of shared information included in a subgroup to which the verification success identification information is attached. A remaining piece of shared information that has not been removed has an unauthentic value. Then, the protection control module 121 identifies an install module storing therein the remaining piece of shared information, based on identification information of the remaining piece of shared information. As a result, it is possible to identify that the install module corresponding to the identification information is an unauthentic install module storing therein an unauthentic piece of shared information.

Returning to FIG. 24, if the old encryption/decryption key has been correctly recovered (Step S566: YES), the protection control module 121 newly generates an encryption/decryption key (new encryption/decryption key) by the encryption/decryption key generation unit 506 (Step S568). The protection control module 121 decrypts the encrypted applications 110 and 111 using the old encryption/decryption key (Step S569), and then re-encrypts the decrypted applications 110 and 111 using the new encryption/decryption key (Step S570).

9.7. Operations During Next-Round Preparation Processing

The following describes the next-round preparation processing. After the recovery processing completes, the next-round preparation processing is performed for preparing for the next recovery processing. In the next-round preparation processing, shared information is generated and embedded, in the same way as in the initialization processing during the initial design processing.

Figure 25:
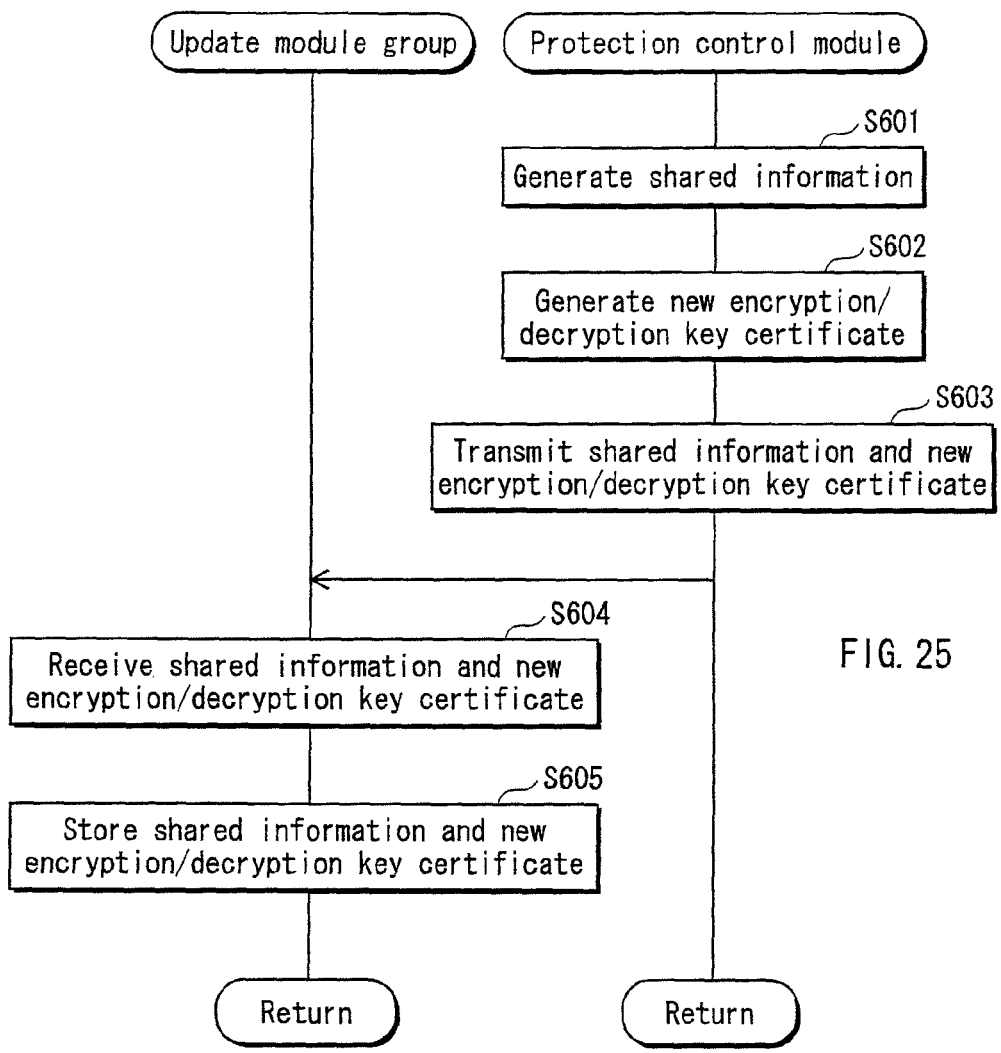
FIG. 25 is a flow chart showing the operations of the software update system 1000 during next-round preparation processing.

FIG. 25 is a flow chart showing the operations of the software update system 1000 in the next-round preparation processing. In the flow chart, the processing performed separately by the install modules 131, 132, and 133 are collectively described as processing performed by the install module group.

Firstly, the protection control module 121 generates a piece of shared information from an encryption/decryption key (new encryption/decryption key) based on the secret sharing scheme (Step S601), and further generates an encryption/decryption key certificate using a signature private key (Step S602). The protection control module 121 transmits the generated piece of shared information and encryption/decryption key certificate to the install module group (Step S603). Here, the number of pieces of shared information equivalent to the number of the install modules is generated, in the same way as in the initialization processing, and a different shared information pair is transmitted to each of the install modules 131, 132, and 133. The same encryption/decryption key certificate is transmitted to the install modules 131, 132, and 133.

Upon receiving the piece of shared information and the encryption/decryption key certificate from the protection control module 121 (Step S604), the install module group stores the received piece of shared information and encryption/decryption key certificate in the shared information storage unit 310 (Step S605).

Note that, in this case, shared information is not transmitted to an unauthentic install module that has failed in authentication in the mutual authentication processing, an unauthentic install module detected in the monitor processing during the recovery processing, and an unauthentic install module identified in the re-encryption processing during the recovery processing.

9.8. Operations During Revocation Processing

Next, the revocation processing is described. The revocation processing for revoking an unauthentic install module included in the apparatus 100 is performed when there is an install module that has failed in the authentication in the mutual authentication processing, when an install module that has been tampered with is detected in the monitor processing during the recovery processing, when an unauthentic install module is identified in the re-encryption processing during the recovery processing, and the like.

When an unauthentic install module that has been tampered with is detected as described above, it is of course necessary to stop the functions of the tampered install module in order to prevent the tampered install module from performing the malicious operations. In this case, as the structure for stopping the functions of the tampered install module, there is a method of causing a plurality of install modules to each have a function of revoking other install module beforehand. However, if the plurality of install modules each have such a function, when a certain install module included in the install module group has been tampered with, the tampered certain install module can revoke a normal install module. According to the present embodiment, since only an install module selected by the update server 200 can revoke an install module that has been tampered with, it is possible to prevent an install module that has been tampered with from revoking a normal install module.

Figure 26:
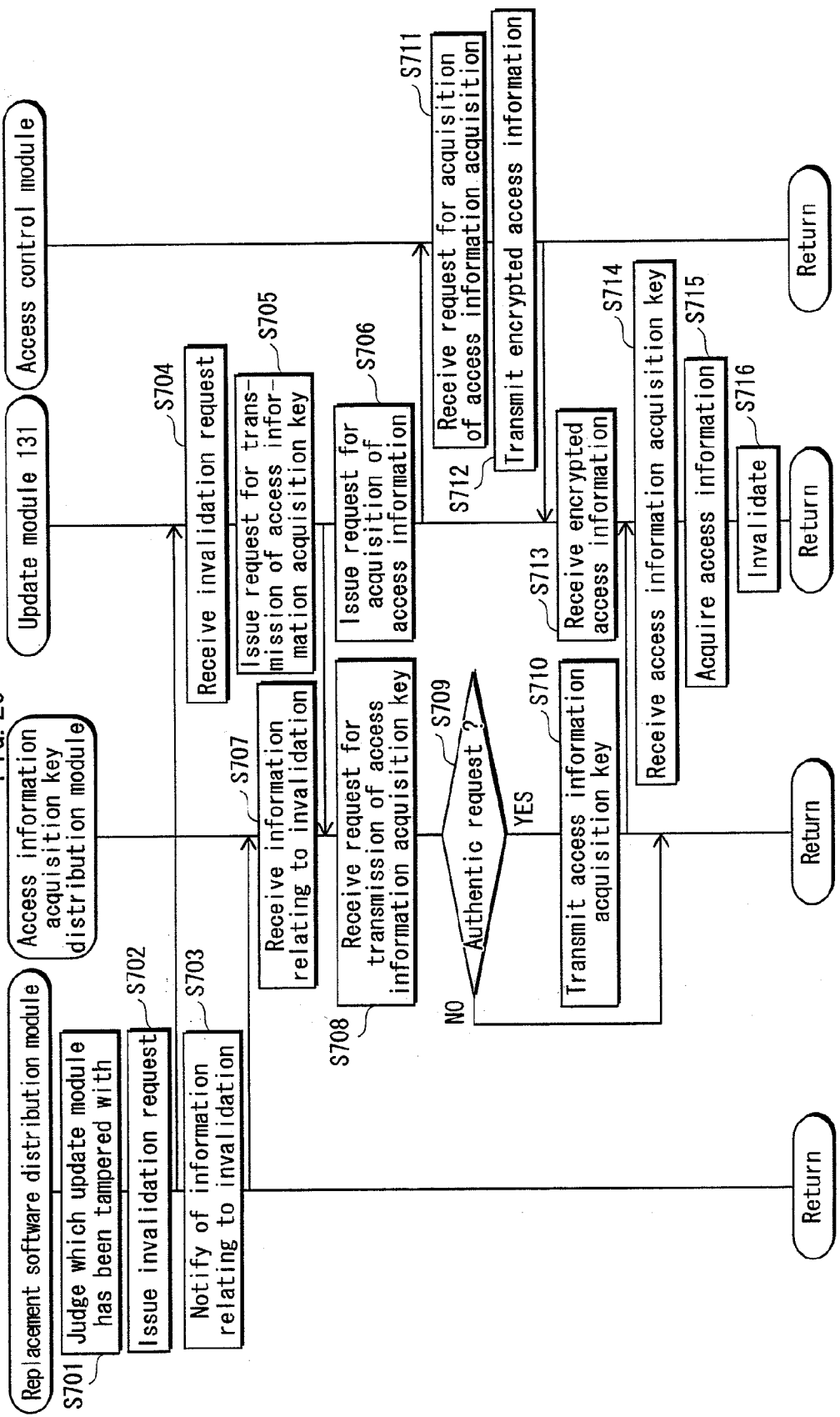
FIG. 26 is a flow chart showing the operations of the software update system 1000 during revocation processing.
Figure 27:
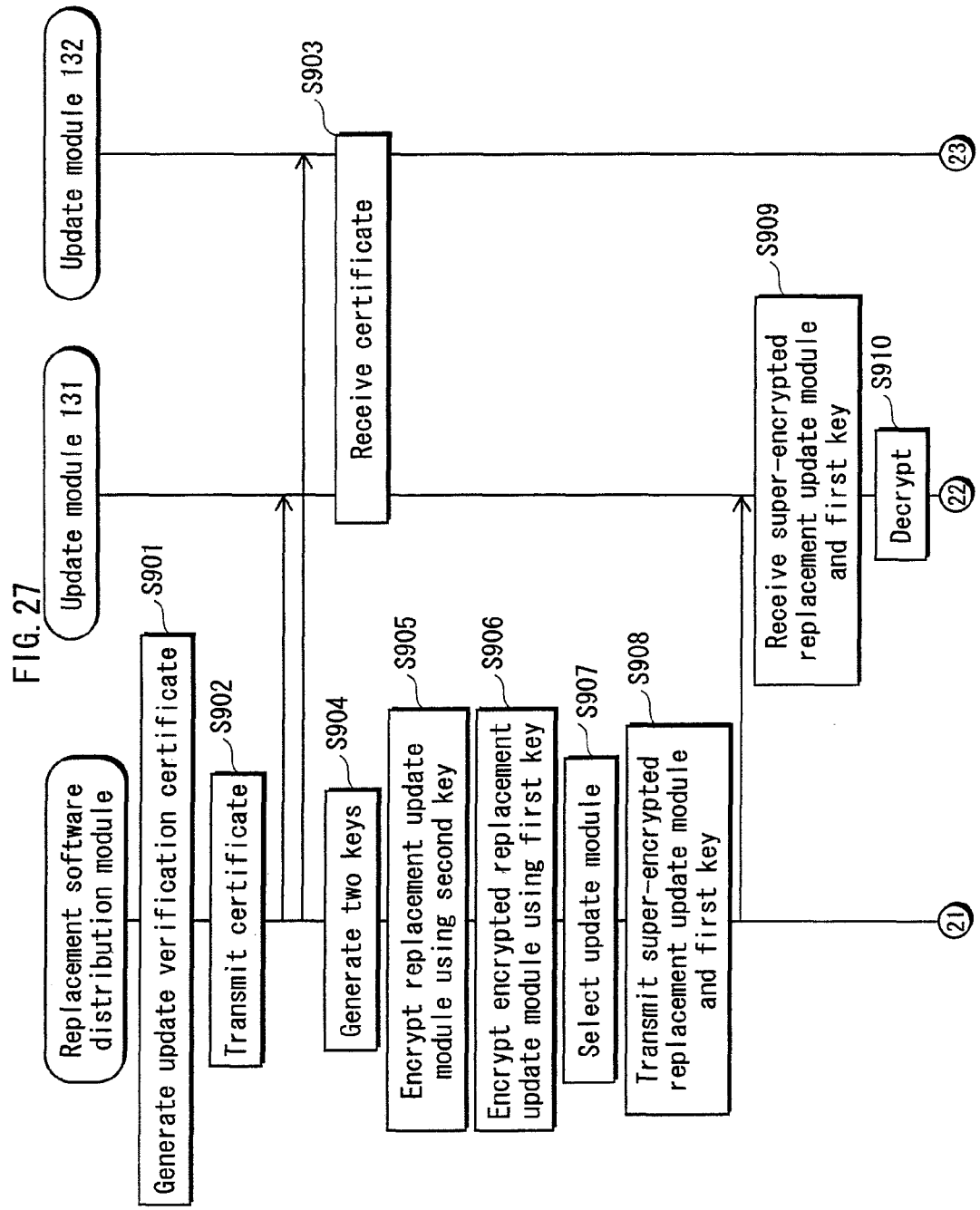
FIG. 27 is a flow chart showing update processing of the install module.

The following describes in detail the operations during the revocation processing, with use of an example where processing is performed when it is detected that only the install module 133 has been tampered with in the monitor processing during the recovery processing and it is not detected that the install modules 131 and 132 have been tampered with. FIG. 26 is a flow chart showing the operations of the software update system 1000 during the revocation processing of the install module 133.

Firstly, the replacement software distribution module 210 judges which install module has been tampered with, based on the results of the tampering detections received from the install modules 131, 132, and 133 in the monitor processing (Step S701). In this example, it is judged that the install module 133 has been tampered with and other install modules have not been tampered with.

The replacement software distribution module 210 requests any one of the install modules judged not to be tampered with (the install module 131, here) to revoke the tampered install module 133 (Step S702). Furthermore, the replacement software distribution module 210 notifies the access information acquisition key distribution module 220 of information relating to revocation (Step S703). The information relating to revocation includes information of the tampered install module 133 (install module identifier) and information of the install module 131 that has requested for revocation (install module identifier).

Upon receiving the request for revocation of the install module 133 from the replacement software distribution module 210 (Step S704), the install module 131 requests the access information acquisition key distribution module 220 to transmit an access information acquisition key for revoking the install module 133 to the install module 131 (Step S705). Furthermore, the install module 131 requests the access control module 140 to transmit access information for revoking the install module 133 to the install module 131 (Step S706).

Upon receiving the information relating to revocation from the replacement software distribution module 210 (Step S707), and receiving the transmission request of the access information acquisition key from the install module 131 (Step S708), the access information acquisition key distribution module 220 judges whether the transmission request is an authentic request, based on the information relating to revocation (Step S709). This judgment is performed by judging whether the install module 131 that has issued the transmission request is the install module to which the replacement software distribution module 210 has issued the revocation request, and whether the access information acquisition key that is requested to be transmitted is an access information acquisition key corresponding to the tampered install module 133, based on the information relating to the revocation notified from the replacement software distribution module 210.

If judging that the transmission request is not an authentic request (Step S709: NO), that is, if judging that the transmission request is issued from the tampered install module 133 or the transmission request is for requesting for transmission of an access information acquisition key corresponding to either of the install modules 131 and 132 that have not been tampered with, the access information acquisition key distribution module 220 ends the revocation processing.

If judging that the transmission request is an authentic request (Step S709: YES), the access information acquisition key distribution module 220 transmits the access information acquisition key for revoking the install module 133 to the install module 131 that has issued the transmission request (Step S710).

Upon receiving an access information acquisition request for revoking the install module 133 from the install module 131 (Step S711), the access control module 140 transmits encrypted access information corresponding to the install module 133 (Step S712).

Upon receiving the encrypted access information from the access control module 140 (Step S713), and receiving the access information acquisition key from the access information acquisition key distribution module 220 (Step S714), the install module 131 decrypts the encrypted access information using the received access information acquisition key, thereby to acquire access information (Step S715). The acquired access information is a driver exclusively for deleting the install module 133. The install module 131 revokes the unauthentic install module 133 tampered with that is expanded on the RAM 13, using the driver (Step S716).

After the revocation processing completes, the install module 131 deletes the access information acquisition key acquired from the access information acquisition key distribution module 220, the encrypted access information acquired from the access control module 140, the decrypted access information, and so on.

According to the present embodiment as described above, in the recovery processing, a plurality of install modules included in the install module group each perform monitor processing. Accordingly, it is possible to detect an install module that has been tampered with, thereby to increase the reliability of the software update system.

Also, since the install module tampered with is revoked, it is possible to prevent the tampered install module from performing malicious operations.

Second Embodiment

According to a second embodiment, by controlling the functions including the decryption loading function, the tampering detection function, and the analysis tool detection function, the protection control module 120 not only protects the applications 110 and 111 against an attack by an attacker, but also protects the install modules 131, 132, and 133 against an attack by an attacker. As a result, it is possible to realize the structure in which not only the install modules 131, 132, and 133 unilaterally perform tampering detection of the protection control module 120, but also the each of the install modules 131, 132, and 133 and the protection control module 120 monitor each other.

As the operations of the detection processing according to the second embodiment, the protection control module 120 detects whether each of the install modules 131, 132, and 133 has been tampered with, using a tampering detection certificate. If detecting that any of the install modules 131, 132, and 133 has been tampered with, the protection control module 120 notifies the replacement software distribution module 210 of that any of the install modules 131, 132, and 133 has been tampered with.

If detecting that none of the install modules 131, 132, and 133 has been tampered with, the protection control module 120 does not notify the replacement software distribution module 210 of that none of the install modules 131, 132, and 133 has been tampered with.

If receiving a notification of that it is detected that the install modules 131, 132, and 133 have been tampered with from the protection control module 120, the replacement software distribution module 210 requests each of the install modules 131, 132, and 133 to perform tampering detection of the protection control module 120 so as to check whether the protection control module 120 has been tampered with.

Upon receiving the request from the replacement software distribution module 210, the install modules 131, 132, and 133 each perform tampering detection of the protection control module 120, and notify the replacement software distribution module 210 of a result of the tampering detection. In this case, if detecting that the protection control module 120 has been tampered with, the install modules 131, 132, and 133 each do not notify one another of that the protection control module 120 has been tampered with.

The following processing is the same as the processing that is peformed in the detection processing according to the first embodiment of the present invention when the install modules 131, 132, and 133 each notify the replacement software distribution module 210 of that it is detected that the protection control module 120 has been tampered with. Accordingly, the description of the following processing is omitted here.

As described above, according to the present embodiment, in the detection processing, each of the install modules 131, 132, and 133 and the protection control module 120 monitor each other. If any of the install modules has been tampered with, the protection control module 120 can detect that the any of the install modules has been tampered with. This can increase the reliability of the software update system.

Third Embodiment

In a third embodiment, each of the install modules does not have in advance the function of updating the protection control module 120. Instead, by detecting whether the protection control module 120 has been tampered with, and acquiring access information for updating the protection control module 120 when the protection control module 120 needs to be updated, the function of updating the protection control module 120 is added to each of the install modules.

In view of this, the access information acquisition key distribution module 220 according to the present embodiment stores therein an access information acquisition key for updating the protection control module 120, in addition to an access information acquisition key of each of the install modules.

Also, the access information module 140 according to the present embodiment stores therein encrypted access information for updating the protection control module 120, in addition to access information of each of the install modules.

The following describes processing of adding, to each of the install modules, a function of updating the protection control module 120, with reference to FIGS. 20-22. In the following descriptions, the processing that is the same as the processing according to the first embodiment has the same sign attached thereto.

In the update processing (Step S502), the replacement software distribution module 210 super-encrypts the replacement protection control module 121 using a plurality of keys, and transmits the super-encrypted replacement protection control module 121 and the first key to the install module 131 included in the install module group (Steps S521 to S528).

Any one of the install modules included in the install module group receives the second key from the replacement software distribution module 210, and decrypts the super-encrypted replacement protection control module, thereby to acquire a replacement protection control module (Steps S529 to S540).

After acquiring the replacement protection control module, in order to update the protection control module 120 to the replacement protection control module 121, the install module 132 requests the access information acquisition key distribution module 220 to transmit an access information acquisition key for updating the protection control module 120 to the install module 132. Furthermore, the install module 132 requests the access control module 140 to transmit access information for updating the protection control module 120 to the install module 132.

Upon receiving the transmission request of the access information acquisition key, the access information acquisition key distribution module 220 inquires of the replacement software distribution module 210 about whether the install module that has issued the transmission request is an install module for updating the protection control module 120. If the install module that has issued the transmission request is an install module for updating the protection control module 120, the access information acquisition key distribution module 220 transmits an access information acquisition key for updating the protection control module 120 to the install module 132 that has issued the transmission request.

Upon receiving the transmission request of the access information from the install module 132, the access information module 140 transmits encrypted access information corresponding to the protection control module 120 to the install module 132.

Upon receiving the access information acquisition key from the access information acquisition key distribution module 220 and receiving the encrypted access information from the access control module 140, the install module 132 decrypts the encrypted access information using the received access information acquisition key, thereby to acquire access information. The acquired access information is a driver exclusively for updating the protection control module 120. The install module 132 updates the protection control module 120 to the replacement protection control module 121, using the driver (Step S541). Then, the install module 132 notifies other install modules of completion of the updating (Step S542).

The install modules included in the install module group 130 each verify whether the protection control module 120 has been correctly updated to the replacement protection control module 121. If judging that the protection control module 120 has been correctly updated, the install modules each generate an MAC value of the protection control module 121 (Steps S543 to S551).

Modification Examples

Although the present invention has been described based on the above embodiments, the present invention is of course not limited to the above embodiments. The following cases are also included in the present invention.

(1) In the above embodiments, the protection control module 120 is updated. Alternatively, a module other than the protection control module 120 may be updated, such as an install module and an application. The following describes update processing of an install module, with use of an example where the install module 133 is updated. In update processing of the install module, in the same way as in the update processing of the protection control module, the replacement software distribution module 210 super-encrypts the replacement install module 133 using a plurality of keys, and transmits the super-encrypted install module 133 to an install modules (other than the install module 133) included in the install module group 130. The install modules included in the install module group 130 update the install module 133 to the replacement install module 133. Here, the replacement software distribution module 210 controls a timing of transmitting a plurality of keys for decrypting the super-encrypted replacement install module 133 to the install modules included in the install module group 130. This makes it impossible for an attacker to obtain the replacement install module 133 that has not been encrypted.

Figure 28:
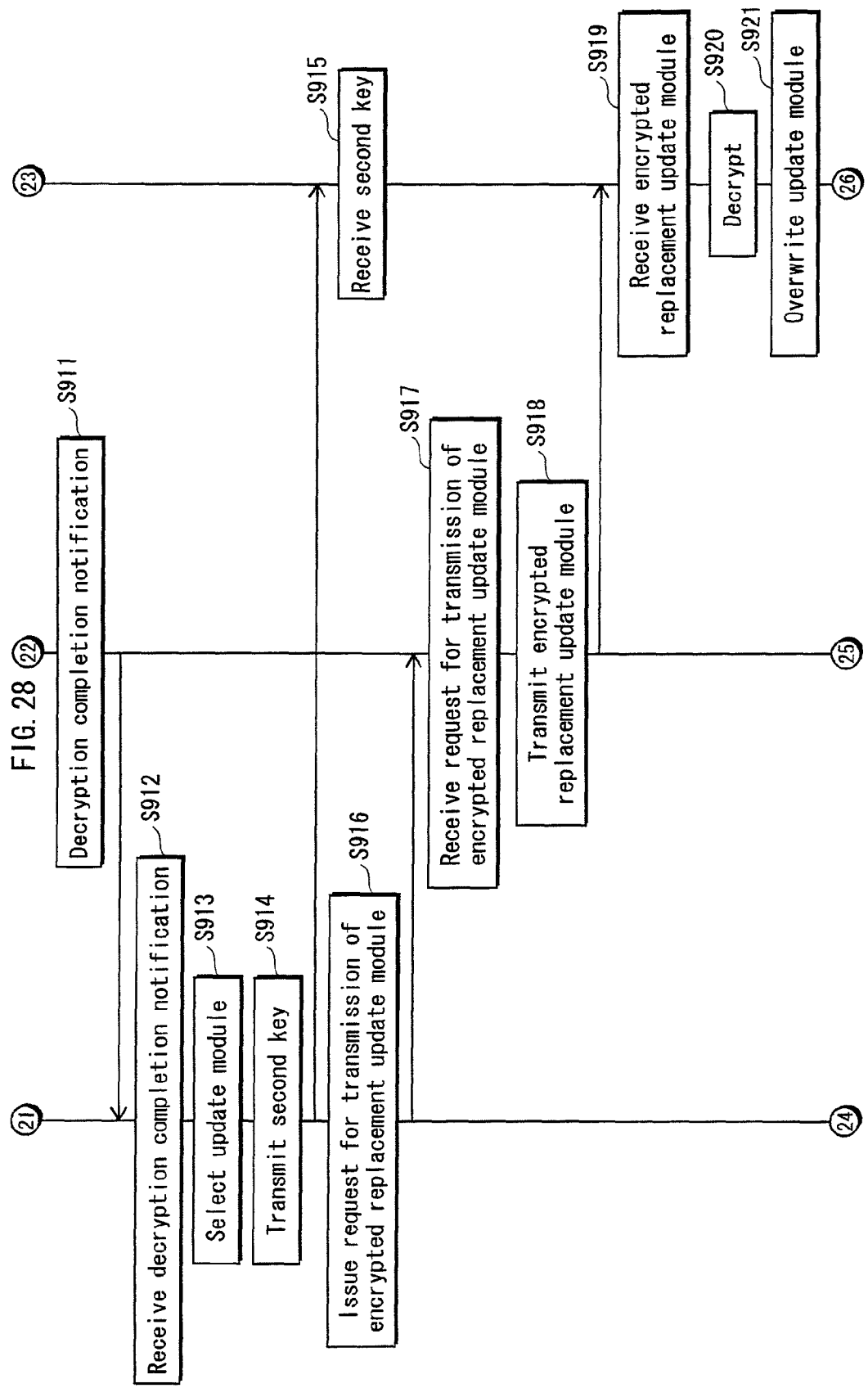
FIG. 28 is a flow chart showing the update processing of the install module.
Figure 29:
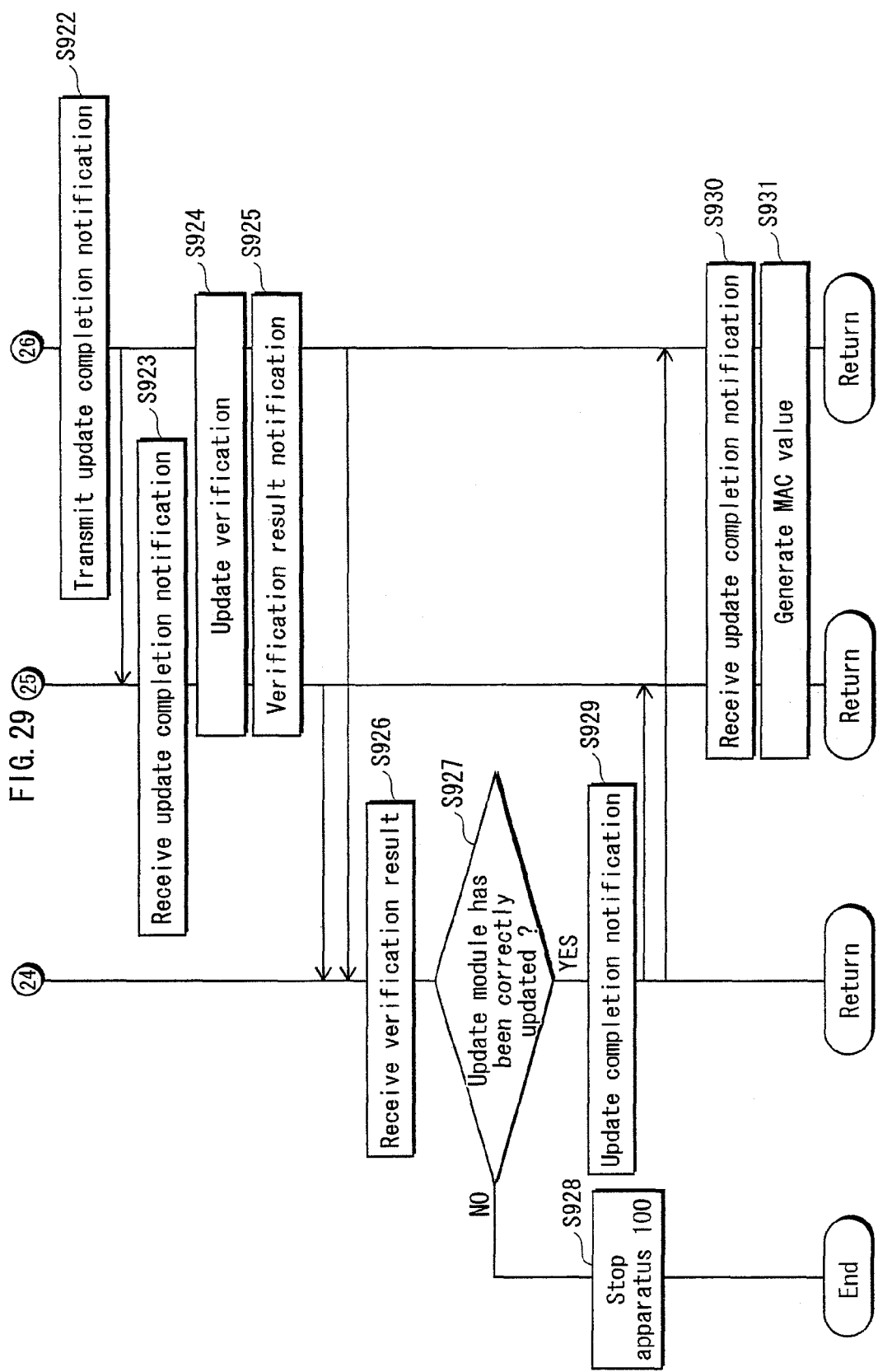
FIG. 29 is a flow chart showing the update processing of the install module.
Figure 30:
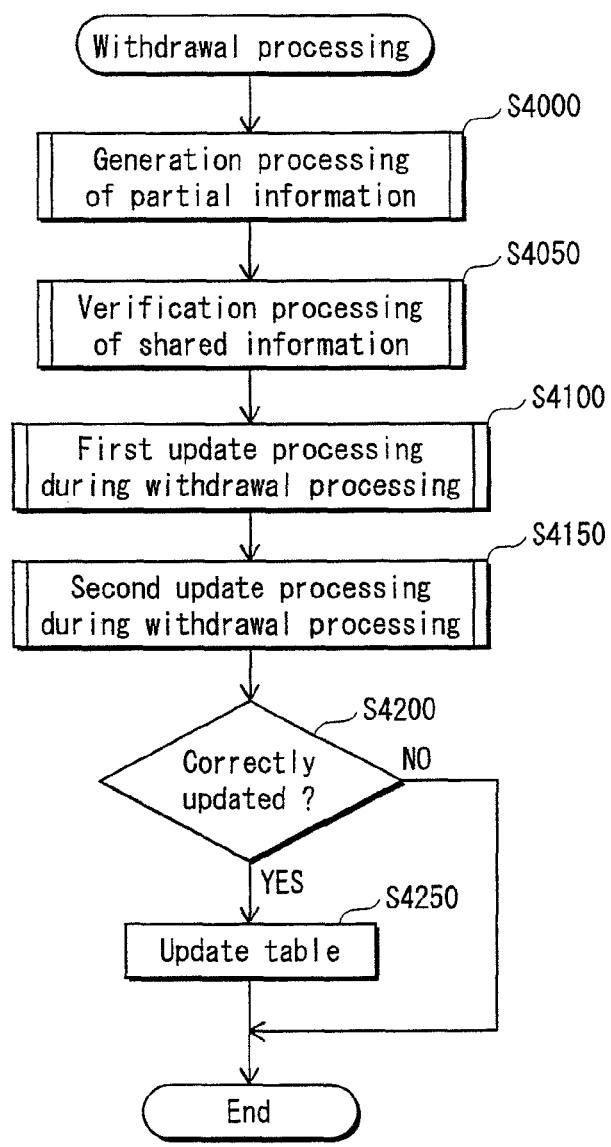
FIG. 30 is a flow chart showing the operations of withdrawal processing.

FIGS. 28-30 are each a flow chart showing an example of update processing of an install module. Here, the install module 133 is updated as described above.

FIGS. 28-30 are basically the same with FIGS. 20-22. The difference from FIGS. 20-22 is that an update verification certificate, a decryption completion notification, and an update completion notification are not transmitted to the install module 133 that is an update target.

Also, the install module is revoked in the above embodiments. Alternatively, a module other than the install module may be revoked, such as the protection control module 120 and an application. The applications 100 and 110 each may be software supplying a function other than the above-described functions.

Furthermore, if at least one install module has been tampered with, an install module that has not been tampered with may update or revoke all install modules and the protection control module.

(2) In the above embodiments, the install modules 131, 132, and 133 each include the monitor control unit 301, the tampering check execution unit 302, the update control unit 303, the decryption unit 304, the authentication unit 305, the signature public key storage unit 306, the verification key storage unit 307, the authentication key pair storage unit 308, the MAC value storage unit 309, the shared information storage unit 310, the access information acquisition unit 311, and the revocation processing unit 312. Alternatively, the install modules 131, 132, and 133 each may include only compositional elements necessary for performing monitor processing (the monitor control unit 301, the tampering check execution unit 302, and the signature public key storage unit 306) or only compositional elements necessary for performing update processing (the update control unit 303, the decryption unit 304, the authentication unit 305, the signature public key storage unit 306, and the authentication key pair storage unit 308). Further alternatively, the install modules 131, 132, and 133 each may include only compositional elements necessary for performing revocation processing (the access information acquisition unit 311 and the revocation processing unit 312). Further alternatively, the install modules 131, 132, and 133 each may include a combination of the compositional elements described above. Here, the install modules included in the install module group 130 as a whole may include the compositional elements necessary for performing the monitor processing and the update processing.

(3) In the above embodiments, the monitor control unit 303 included in each of the install modules 131, 132, and 133 controls the tampering detection timing of other install module and the selection processing of an install module that is a tampering detection target. That is, the monitor control units 303 respectively included in the install modules separately perform control relating to monitoring. Alternatively, the monitor control unit 303 included in one of the install modules may control the whole monitor processing. Further alternatively, the monitor control unit 303 may control the tampering detection timing and selection of an install module that is a tampering detection target, in accordance with an instruction issued by the update server 200.

(4) In the above embodiments, the tampering check execution unit 302 included in each of the install modules 131, 132, and 133 performs tampering check of other install module and the protection control module 120. The tampering check target is not limited to all the modules. The tampering check target may be part of a module, such as a particular capability, a function, and data such as a key. Further alternatively, tampering check may be performed on not a tampering check target all at once, but a part of the tampering check target. In this case, the tampering check may be performed on each of pieces having a predetermined size obtained as a result of division of the tampering check target, or each of pieces obtained as a result of division of the tampering check target in units of a capability or a function. Further alternatively, tampering check may be performed on part of the tampering check target for each time in order. Further alternatively, on which part of the tampering check target the tampering check is to be performed may be determined at random each time. Further alternatively, on which part of the tampering check target the tampering check is to be performed may be determined by other module, outside the apparatus 100, or the like.

(5) In the above embodiments, the install modules 131, 132, and 133 and the protection control module 120 each may operate in a region protected against an attacker's attack, such as a tamper-resistant region. In the case where an install module composed of only the compositional elements necessary for performing the monitor processing operates in a region protected against an attacker's attack, when other install module, the replacement software distribution module 210, and the access information acquisition key distribution module 220 each receive a notification of that attack of other install module or the protection control module 120 is detected from the install module operating in the protected region, the other install module, the replacement software distribution module 210, and the access information acquisition key distribution module 220 each may unconditionally receive the notification and perform update processing or revocation processing, or each may treat the notification more important than a notification transmitted from other module and judge to perform update processing or revocation processing.

Furthermore, the protection control module and the install module respectively may operate in a protection mode (in a tamper-resistant region or the like) and in a normal mode (in a region that is not tamper-resistant or the like). As a result, when the protection control module operating in the protection mode becomes unreliable, it is possible to detect that the protection control module becomes unreliable and update the unreliable protection control module.

(6) In the above embodiments, the access information acquisition key distribution module 220 is included in the update server 200, and the access control module 140 is included in the apparatus 100. Alternatively, the access information acquisition key distribution module 220 and the access control module 140 may be included in the apparatus 100, or may be included in the update server 200, or may be separately included in install modules. Also, the access information acquisition key distribution module 220 and the access control module 140 may be structured as not separate modules but a single module. In the case where the access information acquisition key distribution module 220 and the access control module 140 are structured as a single module, access information may be directly transmitted to the install module, instead of transmitting an access information acquisition key and encrypted access information. Furthermore, in the case where the access information acquisition key distribution module 220 and the access control module 140 are included in the apparatus 100, access information may be stored in a region protected against an attack, such as a tamper-resistant region.

(7) In the above embodiments, the update server 200 is composed of the replacement software distribution module 210 and the access information acquisition key distribution module 220. Alternatively, the replacement software distribution module 210 and the access information acquisition key distribution module 220 may be structured as a single module, or as only either one of the modules.

(8) In the above embodiments, according to the software update system 1000, the initial design processing is performed during manufacture of the apparatus 100 in the factory. Alternatively, the initialization processing may be performed at any time after the shipping from the factory, such as a time after the sale of the apparatus 100. Also, the initialization processing may be performed not once but twice or more times.

(9) In the above embodiments, in the operations during the initial design processing, the tampering detection certificate and the authentication key certificate are generated using the signature private key stored in the replacement software distribution module 210. Alternatively, each of the certificates may be generated using a different key. Further alternatively, the certificates each may be a certificate issued by a certificate issuing apparatus other than the replacement software distribution module 210.

(10) In the above embodiments, in the operations during the initial design processing or the next-round preparation processing, shared information generated from an encryption/decryption key is transmitted to the install modules 131, 132, and 133, and the install modules 131, 132, and 133 each store therein the shared information. Alternatively, an application may store therein the shared information. Further alternatively, the install modules 131, 132, and 133 and an application each may store therein the shared information.

(11) In the above embodiments, in the operations during the detection processing, the install modules 131, 132, and 133 each perform tampering detection processing of the protection control module 120 using an MAC value calculated using a verification key. Alternatively, the verification may be performed using a tampering detection certificate of the protection control module 120. Further alternatively, the verification may be performed by checking log, instead of using a hash value like the case of the MAC value or the certificate.

(12) In the above embodiments, in the operations during the detection processing, when the install modules 131, 132, and 133 each detect that the protection control module 120 has been tampered with, the install modules 131, 132, and 133 each notify the replacement software distribution module 210 and other install modules of detection that the protection control module 120 has been tampered with. Alternatively, at least any one of the replacement software distribution module 210 and other install modules may be notified. Further alternatively, when it is detected that the protection control module 120 has been tampered with, the install module, the apparatus 100, or the protection control module 120 may be stopped. Furthermore, the protection control module that has been tampered with may be deleted. Furthermore, when the install modules 131, 132, and 133 each do not detect that the protection control module 120 has been tampered, the install modules 131, 132, and 133 each do not notify the replacement software distribution module 210 of detection that the protection control module 120 has not been tampered. Alternatively, as a result of the tampering detection processing, it may be notified of that tampering has not been detected.

(13) In the above embodiments, in the operations during the detection processing, the install modules 131, 132, and 133 each do not transmit a result of tampering detection of the protection control module to other install module. Alternatively, the install modules may share the results of the tampering detection. Further alternatively, when one of the install modules does not share the results of the tampering detection, it may be possible to judge the install module as an unauthentic install module and revoke the install module.

(14) In the above embodiments, in the operations during the analysis/judgment processing, whether to update the protection control module 120 is judged based on tampering information. Alternatively, the judgment may be performed based on the number of install modules that has notified of that the protection control module has been tampered with. Furthermore, in the operations of the analysis/judgment processing, it is judged whether to update the protection control module 120 and whether to revoke the protection control module 120. Alternatively, whether to stop the apparatus 100 may be judged.

(15) In the above embodiments, in the operations during the mutual authentication processing, the install modules 131, 132, and 133 each perform authentication processing of the replacement software distribution module 210, and then the replacement software distribution module 210 performs authentication processing of each of the install modules 131, 132, and 133. Alternatively, the replacement software distribution module 210 may perform authentication processing of each of the install modules 131, 132, and 133, and then the install modules 131, 132, and 133 each may perform authentication processing of the replacement software distribution module 210. Further alternatively, each of the install modules 131, 132, and 133 and the replacement software distribution module 210 may separately perform authentication processing of each other.

(16) In the above embodiments, in the operations during the mutual authentication processing, when the replacement software distribution module 210 performs authentication processing of each of the install modules 131, 132, and 133, challenge data has a different value for each of the install modules. Alternatively, challenge data has the same value among all the install modules. Further alternatively, the install modules 131, 132, and 133 may be divided into a plurality of groups, and challenge data has a different value for each of the groups.

(17) In the above embodiments, in the operations during the mutual authentication processing, the install modules 131, 132, and 133 separately perform authentication processing of the replacement software distribution module 210. Alternatively, the install modules 131, 132, and 133 each may notify other install module of a result of signature verification, share the results of the verification among the install modules, and judge whether the replacement software distribution module 210 is an authentic module based on an authentication result of the install module itself and an authentication result received from the other install modules. The judgment may be performed using the following method, for example: when a constant number of install modules (for example, a majority of install modules) succeed in authentication, the replacement software distribution module 210 is judged to be authentic. When the constant number of install modules fail in authentication, the replacement software distribution module 210 is judged to be unauthentic.

(18) In the above embodiments, in the operations during the mutual authentication processing, the update server 200 performs mutual authentication processing using the signature private key and the signature public key. Alternatively, it may be possible to use the authentication key pair used for performing mutual authentication, separately from the signature private key and the signature public key. In this case, the authentication public key included in the authentication key pair of the update server 200 may be stored beforehand in the install modules 131, 132, and 133. Alternatively, the authentication public key may be transmitted from the update server 200 to the install modules 131, 132, and 133 during the mutual authentication processing.

(19) In the above embodiments, in the operations during the mutual authentication processing, whether to perform the subsequent recovery processing is judged depending on whether the number of install modules verified as authentic is equal to or greater than the number of install modules necessary for performing the recovery processing. Alternatively, the judgment may be performed depending on whether the number of unauthentic install modules is less than the predetermined allowable number of unauthentic install modules. Further alternatively, in the mutual authentication processing, if it is judged that the number of the install modules is less than the number of install modules necessary for performing the recovery processing, the apparatus 100 is stopped. Alternatively, the install module may be revoked.

(20) In the above first embodiment, in the operations during the mutual authentication processing, when the replacement software distribution module 210 performs authentication processing of the install modules 131, 132, and 133, the install modules 131, 132, and 133 each transmit an authentication public key and an authentication key certificate to the replacement software distribution module 210 together with response data. Alternatively, the authentication public key, the authentication key certificate, and the response data may be transmitted in accordance with a different timing. Further alternatively, the authentication public key and the authentication key certificate each may be transmitted only when requested by the replacement software distribution module 210. In this case, the replacement software distribution module 210 may receive authentication public keys and authentication key certificates of all the install modules. Alternatively, the replacement software distribution module 210 may receive the number of authentication public keys and authentication key certificates of equal to or greater than a predetermined number of install modules necessary for performing recovery processing or equal to or less than a predetermined allowable number of unauthentic install modules.

(21) In the above first embodiment, in the operations during the recovery processing, monitor processing is performed twice during one-time decryption (Monitoring 3-1, 3-2, 5-1, and 5-2). Alternatively, it may be possible to perform the monitor processing any number of times in accordance with the time period of decryption processing. Monitor processing may be performed during reception processing of a key and a replacement protection control module and mutual authentication processing. Also, the monitor processing is regularly performed at constant intervals. Alternatively, the update processing may be divided into a plurality of blocks, and monitor processing may be performed each time the divided block is performed. Further alternatively, the monitor processing may be performed at random time intervals or time intervals specified by the update server 200.

Also, the install modules each may acquire synchronization information indicating a timing of performing monitor processing from an external server, and perform the monitor processing in accordance with the timing indicated by the synchronization information. As a result, the install modules each can perform the monitor processing in accordance with the same timing when the other install module performs the monitor processing. This can improve the accuracy of detecting an unauthentic install module.

Furthermore, it may be possible to change the frequency of detection during normal processing and recovery processing. For example, by setting the frequency of detection during the recovery processing higher than the frequency of detection during the normal processing, it is possible to ensure complete protection of the protection control module during the recovery processing. The frequency of detection may be changed during the recovery processing.

(22) In the above first embodiment, in the operations during the recovery processing, a pattern of monitor processing is employed in which the install module 131 performs tampering detection of the install module 132, the install module 132 performs tampering detection of the install module 133, and the install module 133 performs tampering detection of the install module 131. Alternatively, tampering detection may be performed in accordance with a predetermined pattern. For example, the install module 131 may perform tampering detection of the install module 133, the install module 132 may perform tampering detection of the install module 131, and the install module 133 may perform tampering detection of the install module 132. Further alternatively, it may be possible to determine at random which install module is a target of tampering detection. Alternatively, other module or outside the apparatus 100 may determine which install module is a target of tampering detection. Alternatively, the install modules each may verify whether the install module itself has been tampered with. Alternatively, when the install modules each detect that the install module itself has been tampered with, the install module may revoke itself. Further alternatively, all the install modules do not need to be monitored by other install module, and some of the install modules may be not monitored by the other install module, or some of the install modules may be monitored by a plurality of install modules. Furthermore, when the pattern of the monitor processing may be changed at regular intervals, such as for each time tampering detection is performed, or in accordance with a random timing. The pattern may be changed in accordance with a timing given from other module or outside the apparatus 100. Further alternatively, a plurality of install modules each may transmit a result of tapering detection to the update server in the order specified by the update server.

(23) In the above first embodiment, in the operations during the recovery processing, during the monitor processing, the install module 131 performs tampering detection of the install module 132, the install module 132 performs tampering detection of the install module 133, and the install module 133 performs tampering detection of the install module 131. In this way, all the install modules each perform monitor processing. Alternatively, a single install module may perform update processing, and other install module may perform monitor processing. As a monitoring pattern in this case, a single install module may monitor an install module performing update processing, or a plurality of install modules or all the install modules may monitor the install module performing the update processing. For example, the install module 131 performs tampering detection of the install module 132, the install module 132 performs tampering detection of the install module 133, and the install module 133 performs update processing. As a result, it is possible to perform monitor processing without interrupting update processing.

Also, in the above embodiments, the install module 131 performs tampering detection of the install module 132, the install module 132 performs tampering detection of the install module 133, and the install module 133 performs tampering detection of the install module 131. In this way, the loop system is used as the monitor structure. Alternatively, the structure may be employed in which a plurality of install modules monitor one another, or the combination of these structures may be employed. By realizing the structure in which a plurality of install modules monitor one another, the accuracy of the tampering verification can be increased further.

(24) In the above first embodiment, in the operations of recovery processing, the install module 132 updates the protection control module 120, by overwriting the protection control module 120 with the acquired replacement protection control module 121. Alternatively, it may be possible to acquire the difference between the protection control module 120 and the replacement protection control module 121 from the replacement software distribution module 210, and update the protection control module 120 by only the difference. Further alternatively, it may be possible to write the replacement protection control module 121 in a region different from a region in which the protection control module 120 is written, such that the replacement protection control module 121 is executed instead of the protection control module 120.

(25) In the above first embodiment, in the operations of recovery processing, when the install modules 131, 132, and 133 are detected as being tampered with in the monitor processing, the replacement software distribution module 210 having received the tampering detection notification immediately stops the recovery processing. Alternatively, the recovery processing may be stopped when data such as a key is transmitted next from the replacement software distribution module 210 to the install module. Alternatively, instead of stopping the recovery processing, recovery processing may be performed using not a tampered install module but a normal install module, or a tampered install module may be revoked or updated. In this case, revocation processing or update processing may be performed immediately, or at a time when a key is transmitted next, or at a time when the recovery processing restarts without using the tampered install module. The update server may specify an install module that performs processing of revoking or updating the tampered install module. Also, not only with respect to an updated module detected as being tampered with in monitor processing, but also with respect to an install module detected as being tampered with by the protection control module 120 in detection processing and an install module that fails in authentication in mutual authentication processing, recovering processing may be peformed without using the install module. Alternatively, an install module that has been tampered with may be revoked or updated. Further alternatively, when there is an install module that has been tampered with, the protection control module may not be updated.

(26) In the above first embodiment, in the operations of recovery processing, the replacement software distribution module 210 selects one install module to be used for decryption in update processing among the install modules included in the install module group 130. In this case, a predetermined install module may be selected, or an install module may be selected at random. Alternatively, an install module may be determined based on information provided from the apparatus 100, or an install module may be selected in accordance with the order of the install modules on which mutual authentication is performed.

(27) In the above first embodiment, in the operations of recovery processing, the replacement software distribution module 210 super-encrypts the replacement protection control module 121 using a plurality of keys in the update processing. Alternatively, it may be possible to divide the replacement protection control module 121 into a plurality of pieces thereby to generate a plurality of divided modules, encrypt the divided modules separately, and transmit the encrypted divided modules respectively to the install modules, in one-to-one correspondence with the install modules. In this case, as update processing, an encrypted divided module and a key used for the encryption are not transmitted all at once. Instead, transmission to the install module is controlled such that until decryption processing of one encrypted divided module completes, other encrypted divided module and a key used for the encryption are not transmitted. Alternatively, encrypted divided modules may be transmitted to the install module all at once, and only transmission timing of keys for decrypting the encrypted divided modules are controlled. Further alternatively, the keys may be transmitted to the install module all at once, and only transmission timing of the encrypted divided modules may be controlled. Further alternatively, all the keys and all the encrypted divided modules may be transmitted to the install module all at once. Also, the divided modules each may be super-encrypted using a plurality of keys instead of using a single key. In this case, transmission control of the keys and the super-encrypted divided modules is performed in the same way as where the replacement protection control module 121 is super-encrypted using a plurality of keys. Furthermore, the encrypted divided modules and the keys for the decryption may be transmitted to a single install module. Alternatively, the encrypted divided modules and the keys may be transmitted to different install modules, and the install modules may perform cooperative operations within the apparatus 100. In this case, monitor processing may be performed before or after reception of divided modules. Furthermore, when an unauthentic install module tampered with is detected in monitor processing, update processing may be stopped in accordance with a next transmission timing of a divided module. Furthermore, when there is an install module tampered with, a plurality of install modules may notify the update server of the tampered install module, and the update server may not transmit a decryption key to the tampered install module. The divided modules may be encrypted using different encryption keys.

(28) In the above first embodiment, in the operations of recovery processing, the applications 110 and 111 encrypted using an encryption/decryption key (old encryption/decryption key) are re-encrypted using a new encryption/decryption key. Alternatively, re-encryption processing may not be performed. In this case, the old encryption/decryption key may be continuously used without generating a new encryption/decryption key. Alternatively, the structure may be employed in which the old encryption/decryption key and the new encryption/decryption key are stored, and a key to be used is switched depending on an application. Alternatively, when the old encryption/decryption key is necessary, the old encryption/decryption key may be generated again from shared information. When the old encryption/decryption key is continuously used, the number of old encryption/decryption keys increases each time the protection control module 120 is updated. Also, each install module needs to store therein shared information of the new encryption/decryption key and the old encryption/decryption key.

(29) In the above first embodiment, when the protection control module 121 is not correctly updated, the apparatus 100 is stopped. Alternatively, mutual authentication processing and recovery processing may be performed again.

(30) In the above first embodiment, in the operations of revocation processing, the access information is a driver exclusively for deleting an install module. Alternatively, the access information may be a program exclusively for deleting an install module, a procedure manual in which a procedure for deleting an install module is written, an address of an install module to be deleted, an address of a program for deleting an install module, an address of a register or a memory for operating a function of deleting an install module, or a value to be set for the register or the memory. Alternatively, the access information may be information in which a code part is to be deleted is described. In this case, positions of code parts may be stored in a header, and a code part to be deleted may be judged with reference to the header. Furthermore, the access control module itself may be encrypted using an encryption key. In this case, an install module that has not been tampered with may acquire, from the update server, a decryption key corresponding to an encryption key used for encrypting the access control module. An install module that has not been tampered with may decrypt the access control module using the acquired decryption key, and acquire access information corresponding to the tampered install module from the access control module. Then, the tampered install module may be revoked based on the acquired access information.

(31) In the above first embodiment, in the operations of revocation processing, all parts of an install module that has been tampered with are deleted. Alternatively, part of an unauthentic install module that has been tampered with may be deleted. For example, the part of the unauthentic tampered install module includes a particular capability such as a loading capability of loading other module, a function, data such as information (ticket, token, and socket) for accessing a key or other module. Alternatively, access to the part of the unauthentic tampered install module may be forbidden, or the part of the unauthentic tampered install module may be inactivated or updated. Also, after revoking the unauthentic tampered install module, an install module having performed revocation processing may delete access information stored in the access control module, which corresponds to the revoked install module.

(32) In the above first embodiment, an unauthentic install module that has been tampered with is revoked. Alternatively, the unauthentic tampered install module may not be revoked. In this case, whether to revoke the unauthentic tampered install module may be judged depending on how much part of the unauthentic install module has been tampered with, which part of the unauthentic install module has been tampered with, and the like. Alternatively, the number of install modules to be revoked may be determined based on the number of unauthentic install modules that have been tampered with.

(33) In the above second embodiment, the protection control module 120 performs tampering detection of the install modules 131, 132, and 133 using tampering detection certificates of the install modules. Alternatively, tampering detection may be performed using an MAC value calculated using a verification key, in the same way as the cases of the install modules 131, 132, and 133. In this case, the verification key is embedded in the protection control module 120, and verification of each of the tampering detection verification certificates is performed during initial design processing. If there is no error, the protection control module 120 needs to additionally perform processing of generating an MAC value for each install module using the verification key and storing therein the generated MAC value as an MAC value table.

(34) In the above second embodiment, when the protection control module 120 does not detect that the install modules 131, 132, and 133 have been tampered with, the protection control module 120 does not notify the replacement software distribution module 210 of it. Alternatively, the protection control module 120 may notify the replacement software distribution module 210 of it.

(35) In the above second embodiment, when the protection control module 120 notifies the replacement software distribution module 210 of that the protection control module 120 detected that the install modules 131, 132, and 133 have been tampered with, the replacement software distribution module 210 requests the install modules 131, 132, and 133 to perform tampering detection of the protection control module 120 in order to check whether the protection control module 120 has been tampered with. Alternatively, when the protection control module 120 notifies the replacement software distribution module 210 of that it is detected that the install modules 131, 132, and 133 have been tampered with, it may be judged that the detected install module has been tampered with, and the install module may not be used for performing mutual authentication processing and recovery processing. Alternatively, the protection control module 120 may perform revocation processing. In this case, it is desirable that the protection control module 120 is protected against an attack. For example, the protection control module 120 desirably operates in a tamper-resistant region.

(36) In the above third embodiment, the access information acquisition key distribution module 220 inquires of the replacement software distribution module 210 about whether an install module that has issued a transmission request of an access information acquisition key is an install module that will update the protection control module 120. Alternatively, the update server 200 may check whether the install module is an install module that will update the protection control module 120.

(37) Each of the above modules may be specifically a separate computer program, a module incorporated in an OS, a driver called from an OS, or an application program.

(38) Part or all of the compositional elements of each of the above devices may be composed of one system LSI (Large Scale-Integration). The system LSI is a super-multifunctional LSI on which a plurality of compositional units are integrated on one chip, and is specifically a computer system composed of a microprocessor, a ROM, a RAM, and so on. The RAM has stored therein a computer program. The LSI achieves its functions by the microprocessor operating in accordance with the computer program.

Also, the compositional elements of each of the above devices may be separately integrated into one chip, or integrated into one chip including part or all of the compositional elements.

Also, although the system LSI is used here, the system LSI may be called an IC, an LSI, a super LSI, and an ultra LSI, depending on the integration degree. Also, a method of forming integrated circuits is not limited to LSIs, and may be realized using a dedicated circuit or a general-purpose processor. Furthermore, it may be possible to use an FPGA (Field Programmable Gate Array) programmable after manufacturing LSIs or a reconfigurable processor in which connection and setting of a circuit cell inside an LSI can be reconfigured.

(39) Part or all of the compositional elements of each of the above devices may be composed of a removable IC card or a single module. The IC card or the single module is a computer system composed of a microprocessor, a ROM, a RAM, and the like. The IC card or the module may include the above-described super-multifunctional LSI. Functions of the IC card or the module are achieved by the microprocessor operating in accordance with the computer program. The IC card or the module may be tamper-resistant.

(40) The present invention may be the above method. Also, the present invention may be a computer program that realizes the method by a computer or a digital signal composed of the computer program.

Furthermore, the present invention may be a computer-readable recording medium such as a flexible disk, a hard disk, a CD-ROM, an MO, a DVD, a DVD-ROM, a DVD-RAM, a BD (Blu-ray Disc), and a semiconductor memory, which stores the computer program or the digital signal.

Furthermore, the present invention may be the computer program or the digital signal stored in the storage medium.

Furthermore, the present invention may be the computer program or the digital signal transmitted via an electric communication network, a wireless or wired communication network, a network such as the Internet, data broadcasting, and the like.

Furthermore, the present invention may be implemented by another independent computer system, by transmitting the computer program or digital signal stored in the storage medium to the other computer system, or by transmitting the computer program or digital signal to the other computer system via the network.

(41) In the above embodiments, the description is given based on the assumption that the number of install modules is three. Alternatively, the number of install modules may be any plural number.

(42) In the above embodiments, the access control module 140 and the install module group 130 are incorporated in the OS 150. Alternatively, in the case where each install module has a function of updating the OS, for example, the install module may be stored as a program beyond the management of the OS. Further alternatively, the protection control module may be incorporated in the OS.

(43) In the above embodiments, a target of tampering detection and revocation is a module operating on the RAM. Alternatively, the target of tampering detection and revocation may be a module stored in the EEPROM, and if the stored module has been tampered with, the tampered module may be revoked. Also, if at least one of install modules has been tampered with, all of the install modules may be revoked or updated. Both the module operating on the RAM and the module stored in the EEPROM may be revoked. Further alternatively, a target of updating may be a module stored in the EEPROM or a module operating on the RAM.

(44) The apparatus 100 may be specifically any apparatus capable of performing interactive data communication. For example, a mobile terminal such as a mobile telephone and a digital television may be employed.

(45) In the above embodiments, access information is encrypted using a different access information acquisition key for each install module. Alternatively, the access information may be encrypted using the same access information acquisition key. In this case, the following may be employed. A normal install module accesses an update server to acquire a decryption key corresponding to the access information acquisition key, and decrypts an access control module using the acquired decryption key, and acquires access information corresponding to an install module that has been tampered with from the access control module, and revokes the tampered install module based on the acquired access information.

(46) In the above embodiments, if the protection control module has been tampered with, the protection control module is updated and each of a plurality of install modules included in the install module group performs tampering verification of other install module. Alternatively, tampering verification may be performed regardless of whether other install module has been tampered with. For example, tampering verification may be performed when the version of the protection control module is upgrade.

(47) In the above embodiments, the replacement protection control module is encrypted using a plurality of encryption keys. Alternatively, the replacement protection control module may be encrypted using a single encryption key. In such a case, a decryption key corresponding to the encryption key is divided into a plurality of pieces. All the divided pieces may be transmitted to an install module that has not been tampered with, and the install module that has not been tampered with may decrypt the replacement protection control module using all the divided pieces.

(48) When an install module that stores therein shared information is revoked, processing of updating shared information stored in other install module may be performed (withdrawal processing). Alternatively, when an install module is newly added, processing of updating shared information may be performed (addition processing).

The following describes the details of the withdrawal processing and the addition processing. The description here is based on the assumption that the apparatus 100A includes six install modules 121A to 126A.

The install module 121A to 126A each include a control unit 250_j, a shared information storage unit 251_j, another module shared information storage unit 252_j, an identifier storage unit 253_j, a list storage unit 254_j, an ID storage unit 255_j, a transmission unit 256_j, and a reception unit 257_j. The control unit 250_j includes a shared information update unit 260_j, a shared information division unit 261_j, a shared information verification unit 262_j, an other module shared information verification unit 263_j, a partial information verification unit 264_j, a modification generation unit 265_j, a list update unit 266_j, and an acquisition unit 267_j. Note that the subscript "j" attached to the sign 25x (x=1, 2, . . . , 7) is a numeral in a range from 1 to 6 and corresponds to the j-th install module.

Also, other module shared information XXX_Y is shared information that is identified as the same as shared information XXX, and represents that this shared information is stored in an install module 12Y. In this way, by causing a plurality of install modules to have the common shared information, the structure is realized in which the redundancy is maintained with respect to the shared information. Also, in the following description, when it is unnecessary to particularly distinguish between first other module shared information and second other module shared information, the first and second other module shared information are referred to as just "other module shared information". Also, when it is unnecessary to particularly distinguish between other module shared information and shared information, the other module shared information and the shared information are referred to as just "shared information".

Operations in Withdrawal Processing

The withdrawal processing is described with reference to a flow chart shown in FIG. 30.

In the withdrawal processing, taking into consideration the possibility that the install module might perform malicious operations, verification is always performed on whether data transmitted among the install modules is authentic data. This makes it possible to detect an install module that performs malicious operations. Furthermore, in each of the processing, in order to update a value of shared information, the value of the shared information before the update is saved. If an install module that performs malicious operations is detected during the withdrawal processing, the withdrawal processing is stopped, and the value of the shared information is returned to the value of the shared information before the withdrawal processing. This prevents the shared information from having an unauthentic value.

Also, in the withdrawal processing, an install module, which has shared information that is the same as the shared information stored in an install module that is to withdraw, generates and distributes shared information. By performing such processing, it is possible to update shared information even if an install module that is to withdraw does not perform withdrawal processing. Furthermore, this is applicable to processing of revoking an install module that performs malicious operations.

The following description is based on the assumption that a withdrawal target module is the install module 121A and partial information is generated by the install module 126A.

The install module 126A receives a generation instruction of partial information from an external apparatus (not shown) during withdrawal processing. The generation instruction instructs to generate partial information from other module shared information that is the same as shared information "d_1" stored in the withdrawal-target install module 121A.

The install module 126A performs processing of generating five pieces of partial information from first other module shared information "d1_1" and distributing the generated five pieces of shared information (Step S4000). That is, the install module 126A divides the first other module shared information "d1_1" into five pieces of partial information.

The install module 122A, which is a module that should have information the same as the first other module shared information "d1_1" stored in the install module 126A, verifies the first other module shared information "d1_1" used for generating the pieces of partial information (Step S4050).

The install modules 122A to 126A each perform the first and second update processing during the withdrawal processing to update the shared information, first and second other module shared information stored therein (Steps S4100 and S4150).

The install modules 122A to 126A each judge whether the update has been normally performed (Step S4200). The install modules 122A to 125A each transmit a result of the judgment to the install module 126A that has transmitted the partial information. Specifically, the install modules that have the same piece of shared information in common each verify whether the piece of shared information stored in any of the install modules has been updated to the same value using the shared information verification unit 262_j and the other device shared information verification unit 263_j. The verification is performed by transmitting the piece of shared information stored therein to any of the install modules via a secured transmission path, and verifying whether the received piece of shared information is the same with the piece of shared information stored therein. The install modules 122A to 125A each transmit a result of the verification to the install module 126A, and the install module 126A temporarily stores therein the results of the verification.

If the update has been normally performed in all the install modules (Step S4200: YES), the install module 126A updates a distribution destination list T100. The install module 126A stores the updated distribution destination list in the list storage unit 254_6, and transmits the updated distribution destination list to the install modules 122A to 125A and the protection control module. The install modules 122A to 125A and the protection control module each update the distribution destination list currently stored therein with the updated distribution destination list (Step S4250).

If the update has not been normally performed in all the install modules (Step S4200: NO), the install module 126A notifies the install modules 122A to 125A of that the update has not been normally performed in all the install modules. The install module 126A and the install modules 122A to 125A having received the notification each stop the withdrawal processing, return a value of shared information stored therein to a value before the withdrawal processing, and end the processing.

It has been described above that the install modules transmit the shared information to one another via a secured transmission path, and verify whether the received shared information has the same with the shared information stored therein. Alternatively, the verification may be performed using an encryption protocol such as the zero-knowledge proof. The details of the zero-knowledge proof and the encryption protocol are respectively described in pages 132 to 150 and pages 224 to 225 of the Non-Patent Literature 1.

The following describes processing performed in Steps S400 to S415.

(Partial Information Generation Processing)

Figure 31:
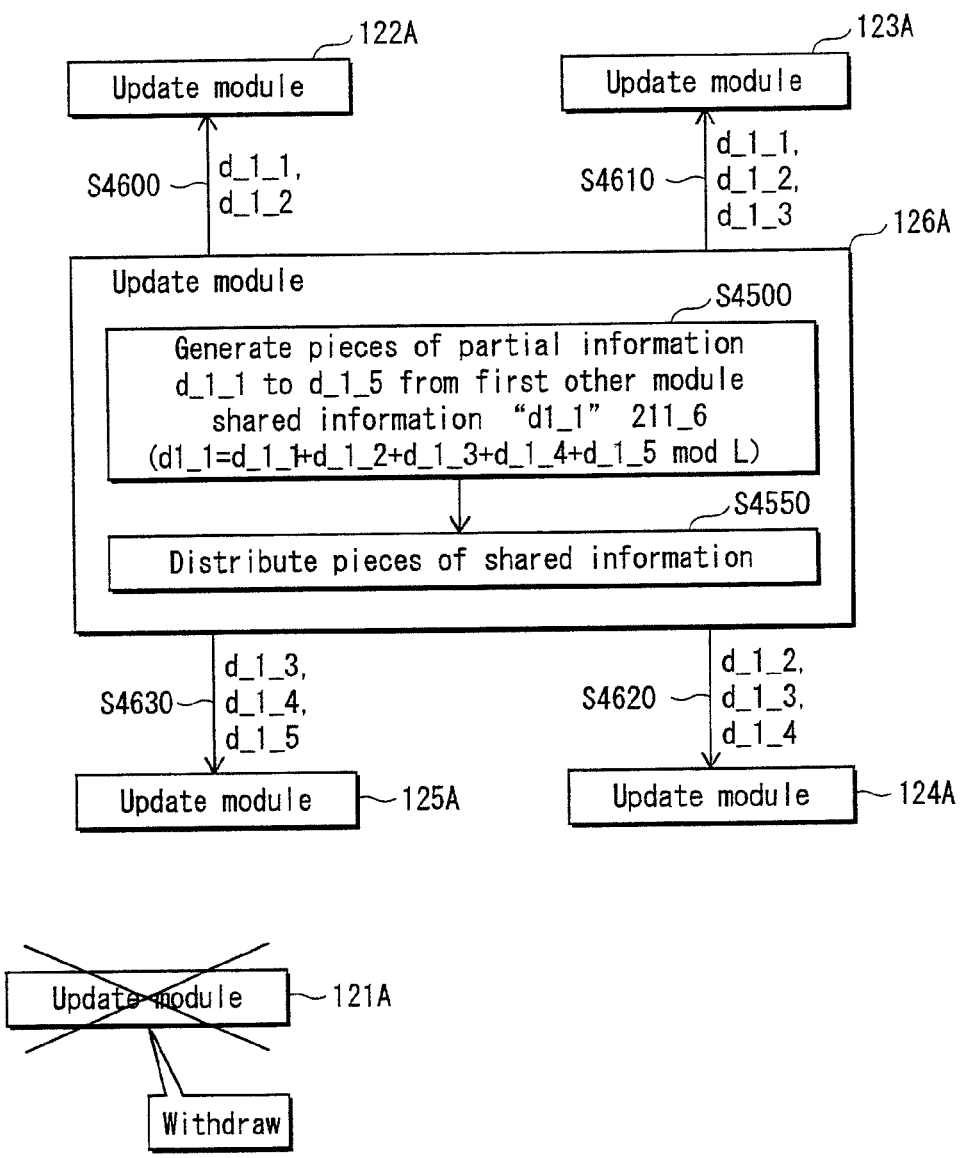
FIG. 31 is a flow chart showing the operations of partial information generation processing.

The following describes the partial information generation processing shown in Step S4000 in FIG. 30, with reference to a flow chart shown in FIG. 31.

A shared information division unit 261_6 of the install module 126A generates five pieces of partial information (d1_1 to d_1_5) from first other module shared information "d1_1" 211_6 (Step S4500). Here, each of the generated pieces of partial information satisfies the following equation.

$$d1\_1 = d\_1\_1 + d\_1\_2 + d\_1\_3 + d\_1\_4 + d\_1\_5 \mod L \quad \text{(Equation)}$$

Specifically, a shared information division unit 261_6 generates (k−2)(=4) random numbers using a random number generator, thereby to generate pieces of partial information (d_1_1 to d_1_4). Next, the shared information division unit 261_6 calculates d_1_5=d1_1−(d_1_1+d_1_2+d_1_3+d_1_4). Note that, although a negative value may be obtained as a result of such a subtraction, the obtained negative value is treated as a piece of partial information as it is.

The shared information division unit 261_6 assigns pieces of partial information different for each of pieces of shared information other than (i) the shared information "d_1" stored in the withdrawal-target install module (the install module 121A, here) and (ii) the shared information "d1_1" and "d2_1" that should have the same value with the shared information "d_1". Specifically, the partial information d_1_i is assigned to shared information d_(i+1).

The shared information division unit 261_6 distributes two or three pieces of partial information for each install module that is a distribution transmission, based on the distribution destination list T100 (Step S4550). Note that two pieces of partial information are transmitted to a shared information division unit 261_6. In this case, the shared information division unit 261_j outputs the partial information to the shared information update unit 260_j.

Specifically, the shared information division unit 261_6 distributes the pieces of the partial information in the following manner.

The shared information division unit 261_6 transmits the pieces of partial information d_1_1 and d_1_2 to the install module 122A (Step S4600). The shared information division unit 261_6 transmits the pieces of partial information d_1_1, d_1_2, and d_1_3 to the install module 123A (Step S4610). The shared information division unit 261_6 transmits the pieces of partial information d_1_2, d_1_3, and d_1_4 to the install module 124A (Step S4620). The shared information division unit 261_6 transmits the pieces of partial information d_1_3, d_1_4, and d_1_5 to the install module 125A (Step S4630). The shared information division unit 261_6 outputs the pieces of partial information d_1_4 and d_1_5 to the shared information update unit 260_6, and the shared information update unit 260_6 temporarily stores therein the pieces of partial information d_1_4 and d_1_5. The i-th install module temporarily stores the received pieces of partial information in the shared information update unit 260_j.

(Shared Information Verification Processing)

Figure 32:
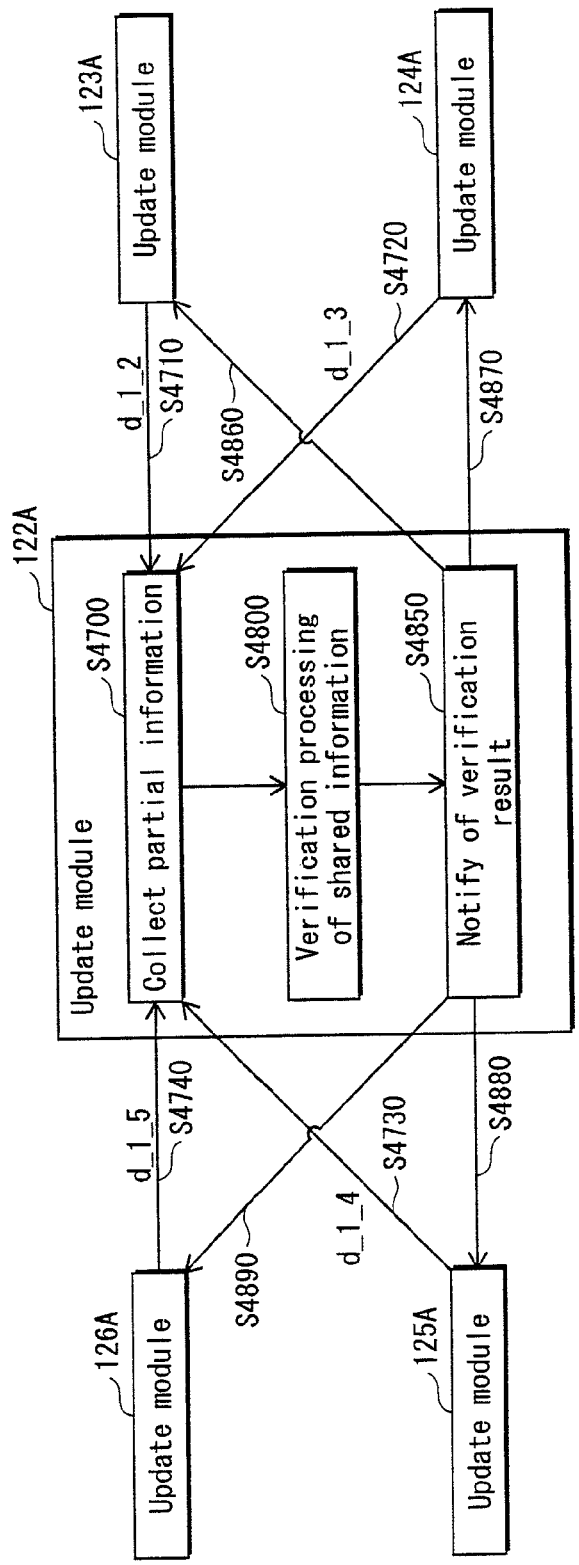
FIG. 32 is a flow chart showing the operations of partial information verification processing.

The following describes the shared information verification processing shown in Step S4050 in FIG. 30, with reference to the flow chart shown in FIG. 32.

In order to verify that the shared information 211_6 has an authentic value, the second other module shared information 211_2 stored in the install module 122A is used.

Upon receiving a partial information verification instruction from the install module 126A via the reception unit 257_j, the partial information verification unit 264_2 collects pieces of partial information d_1_2, d_1_3, d_1_4, and d_1_5 from the modules 123A, 124A, 125A, and 126A other than the install module 121A (Step S4700).

Specifically, the i-th install module (i=3 to 6) outputs the partial information d_1_(i−1) to the install module 122A (Steps S4710 to S4740).

The partial information verification unit 264_2 adds the partial information d_1_1 stored in the shared information update unit 260_j and the received pieces of partial information d_1_2, d_1_3, d_1_4, and d_1_5 thereby to calculate a value s', and verifies whether the calculated value s' is authentic (Step S4800). Specifically, the partial information verification unit 264_2 judges whether the calculated value s' matches the second other module shared information "d2_1" stored in the other module shared information storage unit 252_j.

The partial information verification unit 264_2 notifies the install modules 123A to 126A of a result of the verification (Step S4850). Specifically, if judging that the value s' matches the second other module shared information "d2_1" as a result of the verification, the partial information verification unit 264_2 outputs an affirmative result of the verification to the install modules 123A to 126A. If judging that the value s' does not match "d2_1" as a result of the verification, the partial information verification unit 264_2 outputs a negative result of the verification to the install modules 123A to 126A. Note that the partial information verification unit 264_2 outputs a result of the verification of itself to the shared information update unit 260_j.

(First Update Processing during Withdrawal Processing)

Figure 33:
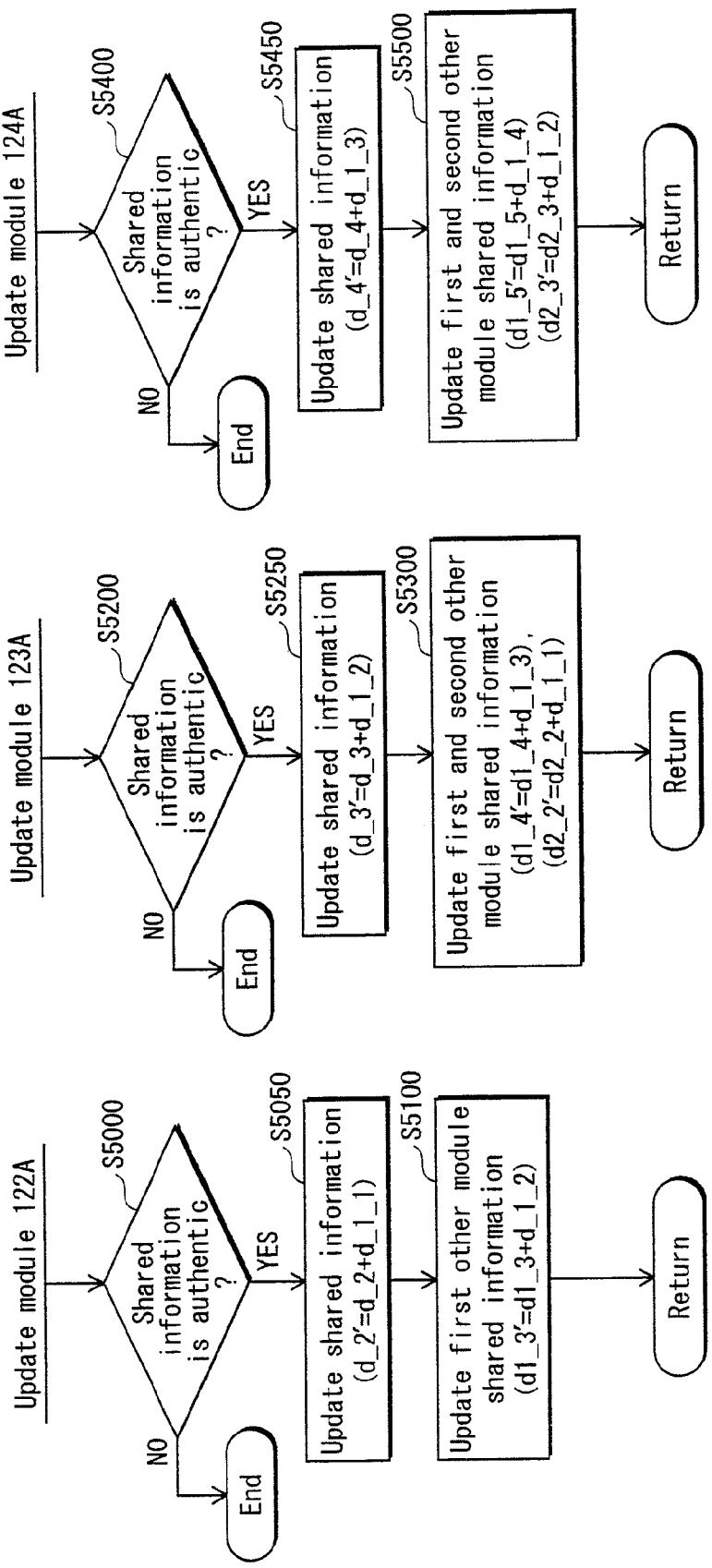
FIG. 33 is a flow chart showing the operations of install modules 122A, 123A, and 124A in first update processing during the withdrawal processing.
Figure 34:
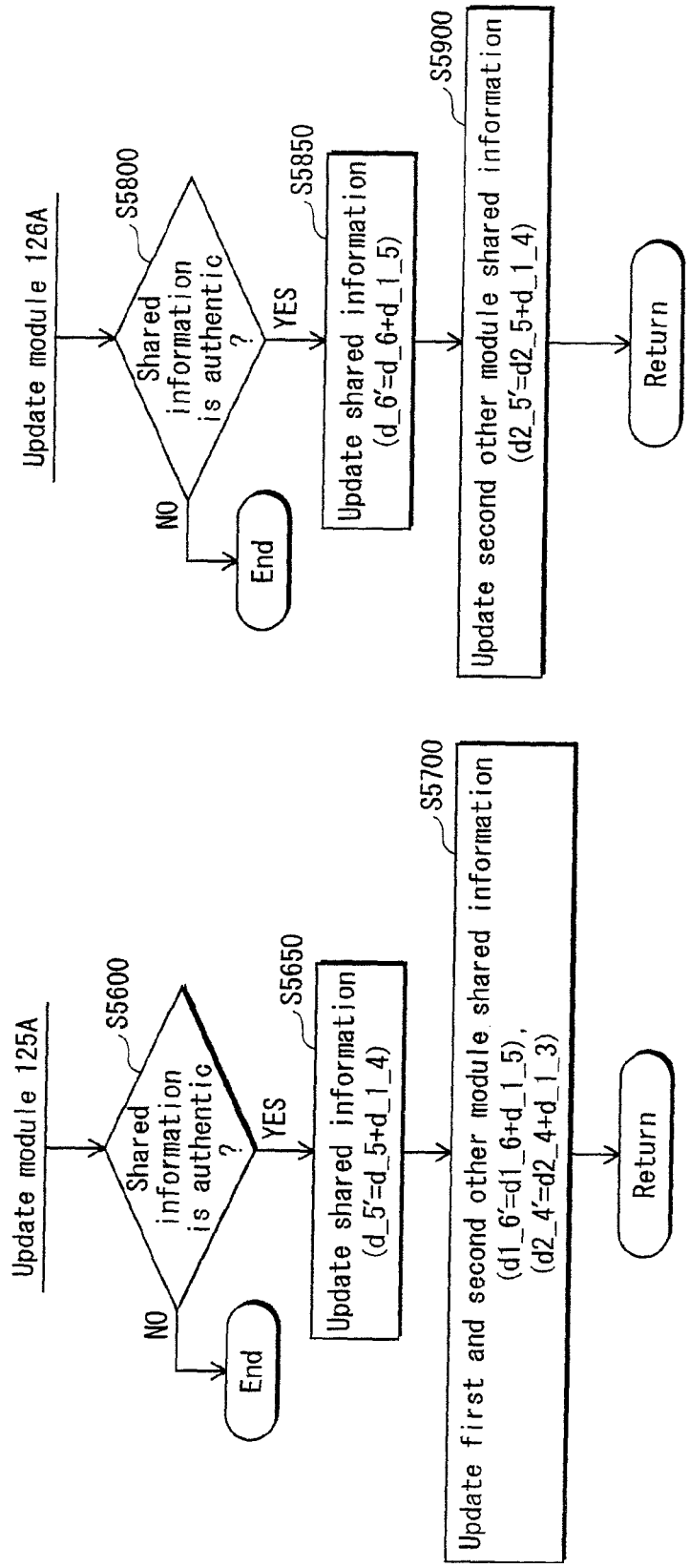
FIG. 34 is a flow chart showing the operations of install modules 125A and 126A in the first update processing during the withdrawal processing.

The following describes first update processing during withdrawal processing shown in Step S410 in FIG. 30, with reference to flow charts shown in FIGS. 33 and 34.

The shared information update unit 260_2 of the install module 122A judges whether the first other module shared information "d1_1" stored in the install module 126A is authentic, based on a result of the verification performed by the partial information verification unit 264_2 (Step S5000). If judging that "d1_1" is authentic (Step S5000: YES), the shared information update unit 260_2 updates the shared information "d_2" using the partial information "d_1_1" stored therein temporarily (Step S5050). Specifically, the shared information update unit 260_2 adds the partial information "d_1_1" to the shared information "d_2" thereby to calculate new shared information "d_2' (=d_2+d_1_1)". Next, the shared information update unit 260_2 updates the first other module shared information "d1_3" using the partial information "d_1_2" stored therein temporarily (Step S5100). Specifically, the shared information update unit 260_2 adds the partial information "d_1_2" to the first other module shared information "d1_3" thereby to calculate new shared information "d1_3' (=d1_3+d_1_2)".

The shared information update unit 260_3 of the install module 123A judges whether the first other module shared information "d1_1" stored in the install module 126A is authentic, based on a result of the verification received from the install module 122A (Step S5200). If judging that "d1_1"

is authentic (Step S5200: YES), the shared information update unit 260_3 updates the shared information "d_3" using the partial information "d_1_2" stored therein temporarily (Step S5250). Specifically, the shared information update unit 260_3 adds the partial information "d_1_2" to the shared 10 information "d_3" thereby to calculate new shared information "d_3' (=d_3+d_1_2)". Next, the shared information update unit 260_3 updates first and second other module shared information "d1_4" and "d2_2" using the partial information "d_1_3" and "d_1_1" stored therein temporarily (Step S5300). Specifically, the shared information update unit 260_3 adds the partial information "d_1_3" to the first other module shared information "d1_4" thereby to calculate new shared information "d1_4' (=d1_4+d_1_3)". The shared information update unit 260_3 adds the partial information "d_1_1" to the second other module shared information "d2_2" thereby to calculate new shared information "d2_3' (=d2_2+d_1_1)".

The shared information update unit 260_4 of the install module 124A judges whether the first other module shared information "d1_1" stored in the install module 126A is authentic, based on a result of the verification received from the install module 122A (Step S5400). If judging that "d1_1" is authentic (Step S5400: YES), the shared information update unit 260_4 updates the shared information "d_4" using the partial information "d_1_3" stored therein temporarily (Step S5450). Specifically, the shared information update unit 260_4 adds the partial information "d_1_3" to the shared information "d_4" thereby to calculate new shared information "d_4' (=d_4+d_1_3)". Next, the shared information update unit 260_4 updates the first and second other module shared information "d1_5" and "d2_3" using the partial information "d_1_4" and "d_1_2" stored therein temporarily (Step S5500). Specifically, the shared information update unit 260_4 adds the partial information "d_1_4" to the first other module shared information "d1_5" thereby to calculate new shared information "d1_5' (=d1_5+d_1_4)". The shared information update unit 260_4 adds the partial information "d_1_2" to the second other module shared information "d2_3" thereby to calculate new shared information "d2_3' (=d2_3+d_1_2)".

The shared information update unit 260_5 of the install module 125A judges whether the first other module shared information "d1_1" stored in the install module 126A is authentic, based on a result of the verification received from the install module 122A (Step S5600). If judging that "d1_1" is authentic (Step S5600: YES), the shared information update unit 260_5 updates the shared information "d_5" using the partial information "d_1_4" stored therein temporarily (Step S5650). Specifically, the shared information update unit 260_5 adds the partial information "d_1_4" to the shared information "d_5" thereby to calculate new shared information "d_5' (=d_5+d_1_4)". Next, the shared information update unit 260_5 updates the first and second other module shared information "d1_6" and "d2_4" using the partial information "d_1_5" and "d_1_3" stored therein temporarily (Step S5700). Specifically, the shared information update unit 260_5 adds the partial information "d_1_5" to the first other module shared information "d1_6" thereby to calculate new shared information "d1_6' (=d1_6+d_1_5)". The shared information update unit 260_5 adds the partial information "d_1_3" to the second other module shared information "d2_4" thereby to calculate new shared information "d2_4' (=d2_4+d_1_3)".

The shared information update unit 260_6 of the install module 126A judges whether the first other module shared information "d1_1" stored in the install module 126 is authentic, based on a result of the verification received from the install module 122A (Step S5800). If judging that "d1_1" is authentic (Step S5800: YES), the shared information update unit 260_6 updates the shared information "d_6" using the partial information "d_1_5" stored therein temporarily (Step S5850). Specifically, the shared information update unit 260_6 adds the partial information "d_1_5" to the shared information "d_6" thereby to calculate new shared information "d_6' (=d_6+d_1_5)". Next, the shared information update unit 260_6 updates the second other module shared information "d2_5" using the partial information "d_1_4" stored therein temporarily (Step S5900). Specifically, the shared information update unit 260_6 adds the partial information "d_1_4" to the second other module shared information "d2_5" thereby to calculate new shared information "d2_5' (=d2_5+d_1_4)".

If the install modules 122A to 126A each judge that the first other module shared information "d1_1" is unauthentic (Steps S5000, S5200, S5400, S5600, and S5800: NO), that is, if the install modules 122A to 126A each receive a notification of verification failure, the install module 122A to 126A each perform unauthentic operations and accordingly stop the withdrawal processing.

(Second Update Processing during Withdrawal Processing)

Figure 35:
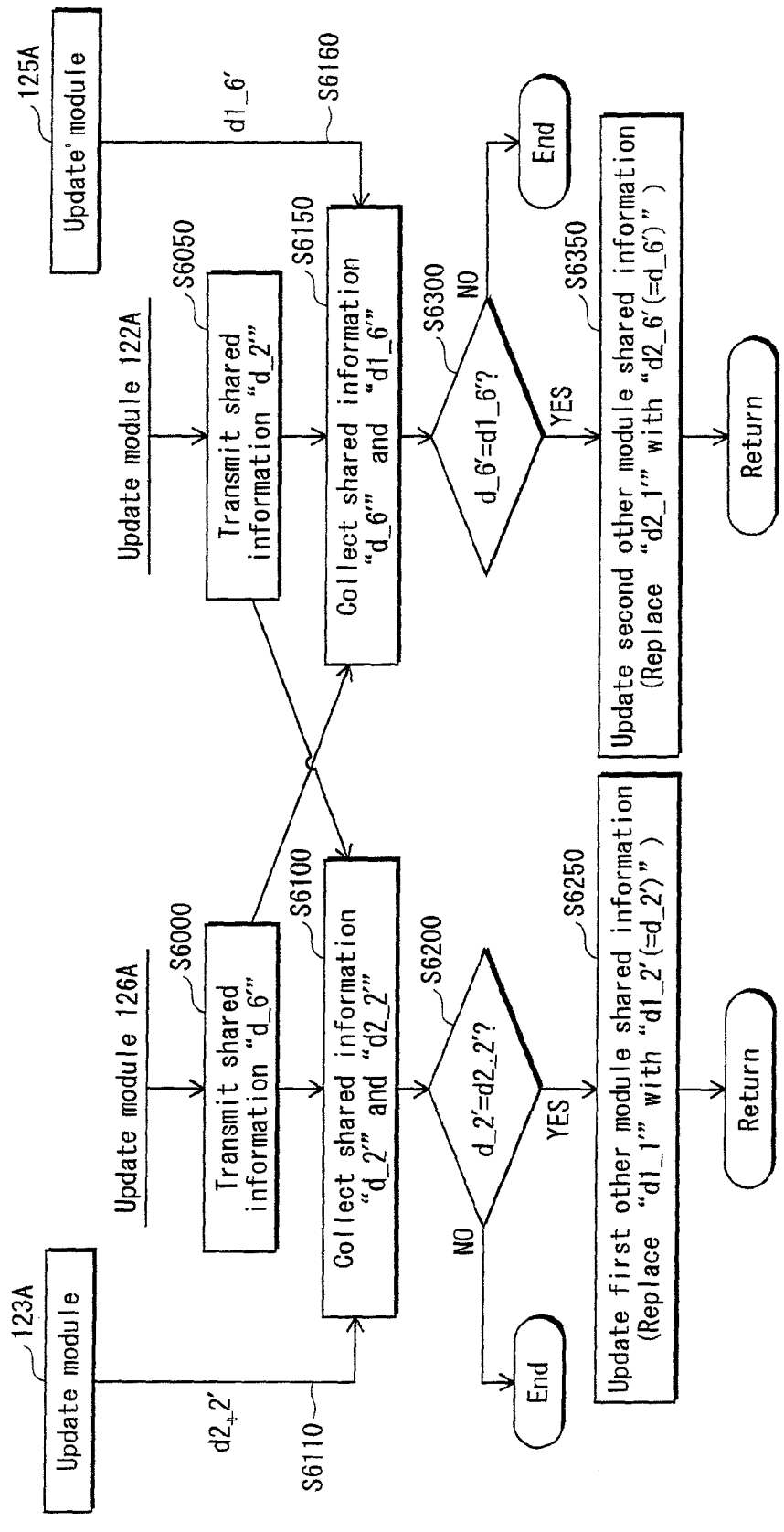
FIG. 35 is a flow chart showing the operations of the install modules 122A and 126A in second update processing during the withdrawal processing.

The following describes the second update processing during the withdrawal processing shown in Step S415 in FIG. 30, with reference to a flow chart shown in FIG. 35.

The shared information update unit 260_6 of the install module 126A outputs the shared information "d_6'" to the install module 122A (Step S6000).

The shared information update unit 260_2 of the install module 122A outputs the shared information "d_2'" to the install module 126A (Step S6050).

The shared information update unit 260_6 collects the shared information "d_2'" and "d2_2'" (Step S6100). Here, the shared information update unit 260_3 of the install module 123A transmits the shared information "d2_2'" (Step S6110).

The shared information update unit 260_2 collects the shared information "d_6'" and "d2_6'" (Step S6150). Here, the shared information update unit 260_3 of the install module 123A transmits the shared information "d2_2'" (Step S6160).

The shared information update unit 260_6 judges whether the collected shared information "d_2'" and "d2_2'" match each other (Step S6200). If judging that "d_2'" and "d2_2'" match each other (Step S6200: YES), the shared information update unit 260_6 determines the first other module shared information as "d_2'" (Step S6250).

The shared information update unit 260_2 judges whether the collected shared information "d_6'" and "d2_6'" match each other (Step S6300). If judging that "d_6'" and "d2_6'" match each (Step S6300: YES), the shared information update unit 260_2 determines the second other module shared information as "d_6'" (Step S6350).

If the shared information update unit 260_6 judges that the collected shared information "d_2'" and "d2_2'" do not match each other (Step S6200: NO), the install module 126A transmits a result of the judgment to the install modules 122A to 125A. The install module 126A and the install modules 122A to 125A having received the result each stop the withdrawal processing, return a value of the shared information stored therein to a value before the withdrawal processing, and end the processing.

If the shared information update unit 260_2 judges that the collected shared information "d_6'" and "d2_6'" do not match each other (Step S6300: NO), the install module 122A transmits a result of the judgment to the install modules 123A to 126A. The install module 122A and the install modules 123A to 126A having received the result each stop the withdrawal processing, return a value of the shared information stored therein to a value before the withdrawal processing, and end the processing.

Specific Examples

Figure 36:
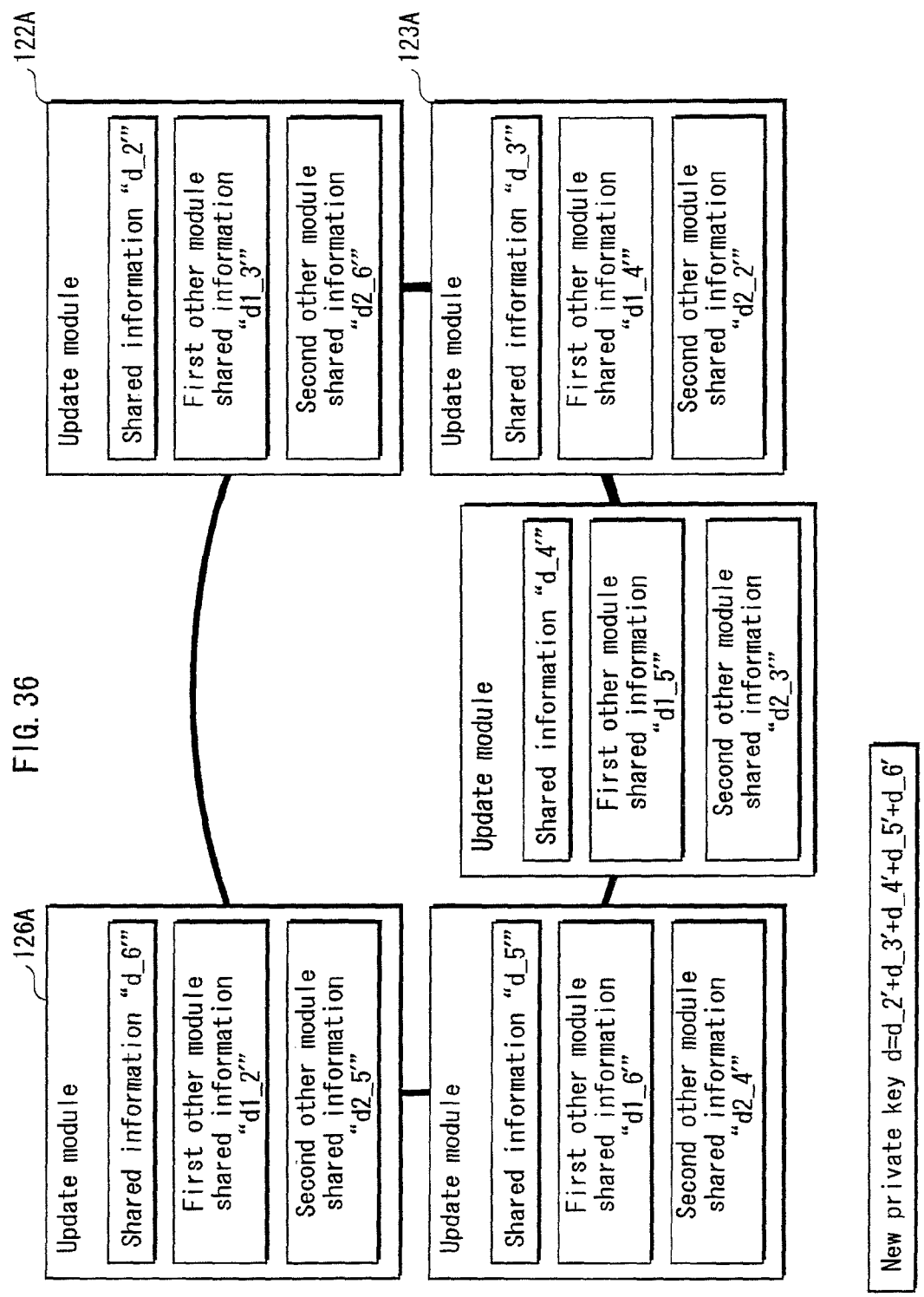
FIG. 36 shows three pieces of shared information stored in each of the install modules 122A to 126A after the withdrawal processing.

FIG. 36 shows shared information and first and second other module shared information that are stored in each of the install modules 122A to 126A after the withdrawal processing.

For example, the install module 122A stores therein shared information "d_2'" 212b, first other module shared information "d1_3'" 213_2b, and second other module shared information "d2_6'" 211_2b that all have been updated in the withdrawal processing.

The following shows that the private key "d" is recovered from the shared information "d_2'" to "d_6'" after the update.

$$\begin{aligned} d\_2' + d\_3' + d\_4' + d\_5' + d\_6' &= (d\_2 + d\_1\_1) + (d\_3 + d\_1\_2) + \\ &\quad (d\_4 + d\_1\_3) + (d\_5 + d\_1\_4) + \\ &\quad (d\_6 + d\_1\_5) \\ &= (d\_1\_1 + d\_1\_2 + \\ &\quad d\_1\_3 + d\_1\_4 + d\_1\_5) + \\ &\quad (d\_2 + d\_3 + d\_4 + d\_1\_5) \\ &= d\_1 + d\_2 + d\_3 + d\_4 + \\ &\quad d\_5 + d\_6 \\ &= d \end{aligned}$$

In this way, it is possible to maintain constant the total sum of the pieces of shared information stored in the install modules even after the install module 121A has withdrawn. Accordingly, in the withdrawal processing, the software update system can cause the install module to withdraw without recovering the new private key "d" and regenerating the shared information.

Operations of Addition Processing

Figure 37:
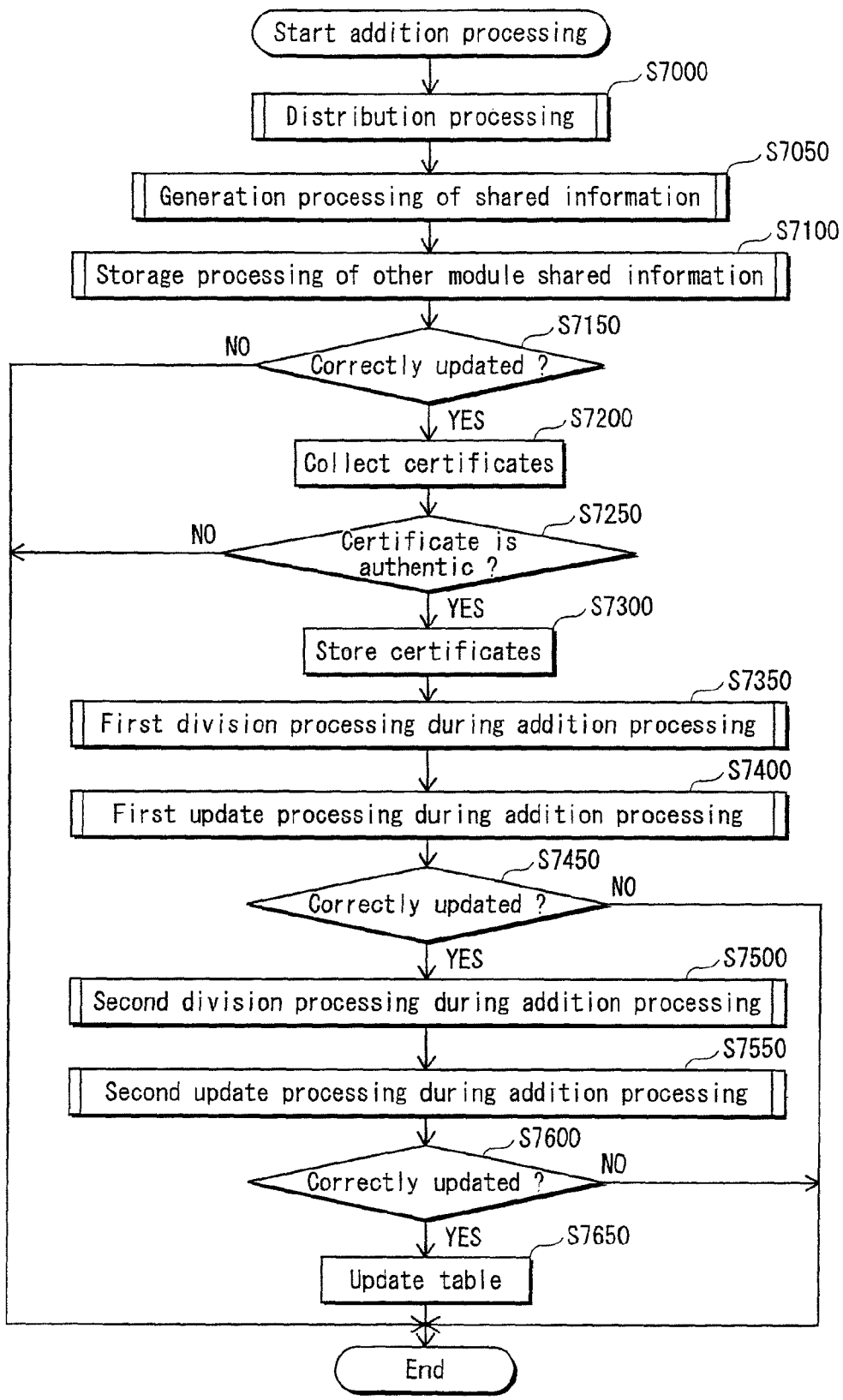
FIG. 37 is a flow chart showing the operations of addition processing.

The addition processing is described here, with reference to a flow chart shown in FIG. 37.

In the addition processing, in view of the possibility that an install module may perform unauthentic operations, it is always verified whether data transferred among the install modules is authentic such that an install module performing malicious operations can be detected. Furthermore, in the addition processing, when a value of shared information needs to be updated, the value of the shared information before update is saved. Then, when an install module performing malicious operations is detected during the addition processing, the addition processing is stopped. The value of the shared information is returned to a value before the update, thereby preventing the shared information from having an unauthentic value.

In the addition processing, by transmitting modification information from a plurality of install modules to an addition target install module and generating shared information of the addition target install module, unauthentic modification information is prevented from being transmitted, such that an install module that transmits the modification information to the addition target install module does not perform malicious operations and generate a "new private key" in an unauthorized manner. Also, install modules having the same piece of shared information in common each check whether the piece of shared information stored in other one of the install modules has been normally updated. This prevents the shared information from being updated in an unauthorized manner.

In the case where an install module that has transmitted modification information to an addition target install module also has the same shared information in common with the addition target install module, the install module that has transmitted the modification information can calculate shared information that has not been originally stored therein, from the shared information originally stored therein, the shared information stored in the addition target install module, and the modification information transmitted to the addition target install module. In view of this, at the last stage of the addition processing of the install module, modification information, which has a value different from a value of the transmitted modification information, is extracted from the shared information stored in the install module having transmitted the modification information, the extracted modification information is divided into pieces, and the divided pieces are respectively transmitted to the install modules. As a result, processing of updating the value of the shared information needs to be performed. The processing is described later in detail.

Note that the following description is based on the assumption that an addition target install module is the install module 127A, and modification information is generated by the install modules 121A and 126A.

Distribution processing is performed in which the install modules 121A and 126A each generate modification information and distribute the generated modification information to the install module (Step S7000).

Shared information generation processing is performed in which the addition target install module 127A, and the install modules 121A and 126A, which each stores therein the same shared information stored in the install module 127A, each generate shared information (Step S7050).

Other module shared information storage processing is performed in which the install module 127A stores therein first and second other module shared information (Step S7100).

The install modules 121A, 122A, and 125A to 127A each judge whether update has been normally performed (Step S7150). The install modules 121A, 122A, 125A, and 126A each notify the install module 127A of a result of the verification, and the install module 127A temporarily stores therein the results of the verification.

If all the update target install modules judge that the update has been performed correctly (Step S7150: YES), the shared information update unit 260_7 of the install module 127A collects certificates from the install modules 121A and 126A (Step S7200).

The shared information update unit 260_7 judges whether each of the certificates collected from the install modules 121A and 126A is authentic (Step S7250). Specifically, the shared information update unit 260_7 judges whether the collected two certificates are the same.

If judging that the two certificates are the same (Step S7250: YES), the shared information update unit 260_7 stores the certificates in the identifier storage unit 253_7 (Step S7300). Then, the shared information update unit 260_7 transmits, to the install module 121A, an instruction to start first division processing during addition processing.

Next, the install module 121A performs the first division processing during addition processing of generating seven pieces of partial information from the shared information stored therein and distributing the generated pieces of partial information to the install modules (Step S7350).

The install modules 121A to 127A each perform the first update processing during the addition processing of updating the shared information using the distributed partial information (Step S7400).

The install modules 121A to 127A each judge whether the update has been normally performed (Step S7450). Here, the install modules 122A to 127A each notify the install module 121A, which has transmitted the partial information, of a result of the judgment. Specifically, install modules having the same piece of shared information transmit the piece of shared information stored therein to one another via a secured transmission path using the shared information verification unit 262_*j* and the other device shared information verification unit 263_*j*, and verify whether the received piece of shared information has the same value with the piece of shared information stored therein, thereby checking whether the piece of shared information stored in the install module has been updated to the same value. The install modules 122A to 127A each notify the install module 121A of a result of the verification. The install module 121A temporarily stores therein the received results of the verification.

If the update has been normally performed in all the install modules (Step S7450: YES), the install module 121A transmits, to the install module 126A, an instruction to start second division processing during the addition processing. Upon receiving the instruction, the install module 126A performs the second division processing during addition processing of generating seven pieces of partial information from the shared information stored therein, and distributing the generated pieces of partial information to the install modules (Step S7500).

The install modules 121A to 127A each perform the second update processing during the addition processing of updating the shared information using the distributed partial information (Step S7550).

The install modules 121A to 127A each judge whether the update has been correctly performed (Step S7600). The install modules 121A to 125A and 127A each notify the install module 126A of a result of the verification. The install module 126A temporarily stores therein the results of the verification.

If the update has been normally performed in all of the install modules (Step S7600: YES), the install module 126A updates the distribution destination list T100. The install module 126A stores the updated distribution destination list in the list storage unit 254_6, and transmits the updated distribution destination list to the install modules 121A to 125A and 127A and the protection control module. The install modules 121A to 125A and 127A and the protection control module each update the distribution destination list currently stored therein with the updated distribution destination list (Step S7650).

If the update has not been normally performed in the update target install module (Step S7150: NO), or if the certificate is unauthentic (Step S7250: NO), the install module 127A notifies the install module 121A, 122A, 125A, and 126A that are the update targets of that the update has not been normally performed in the update target install module or the certificate is unauthentic. The install modules that are the update targets each stop the addition processing, and return a value of shared information stored therein to a value before the addition processing, and end the processing.

If the update has not been normally performed in all of the modules (Step S7450: NO), the install module 121A notifies the install modules 122A to 127A of that the update has not been normally performed in all of the modules. The install modules 121A to 127A each stop the addition processing, return the value of the shared information stored therein to the value before the addition processing, and end the processing.

Furthermore, if a result of the judgment in Step S7600 is "NO", the install modules 121A to 127A each stop the withdrawal processing, return the value of the shared information stored therein to the value before the withdrawal processing, and end the processing, in the same way.

Shared information is transmitted over a secured communication path among modules, and the modules each verify whether a value of the received shared information matches a value of shared information stored therein. Alternatively, the verification may be performed using an encryption protocol such as the zero-knowledge proof. The details of the zero-knowledge proof and the encryption protocol are respectively described in pages 132 to 150 and pages 224 to 225 of the Non-Patent Literature 1.

The following describes the details of the addition processing.

(Distribution Processing)

Figure 38:
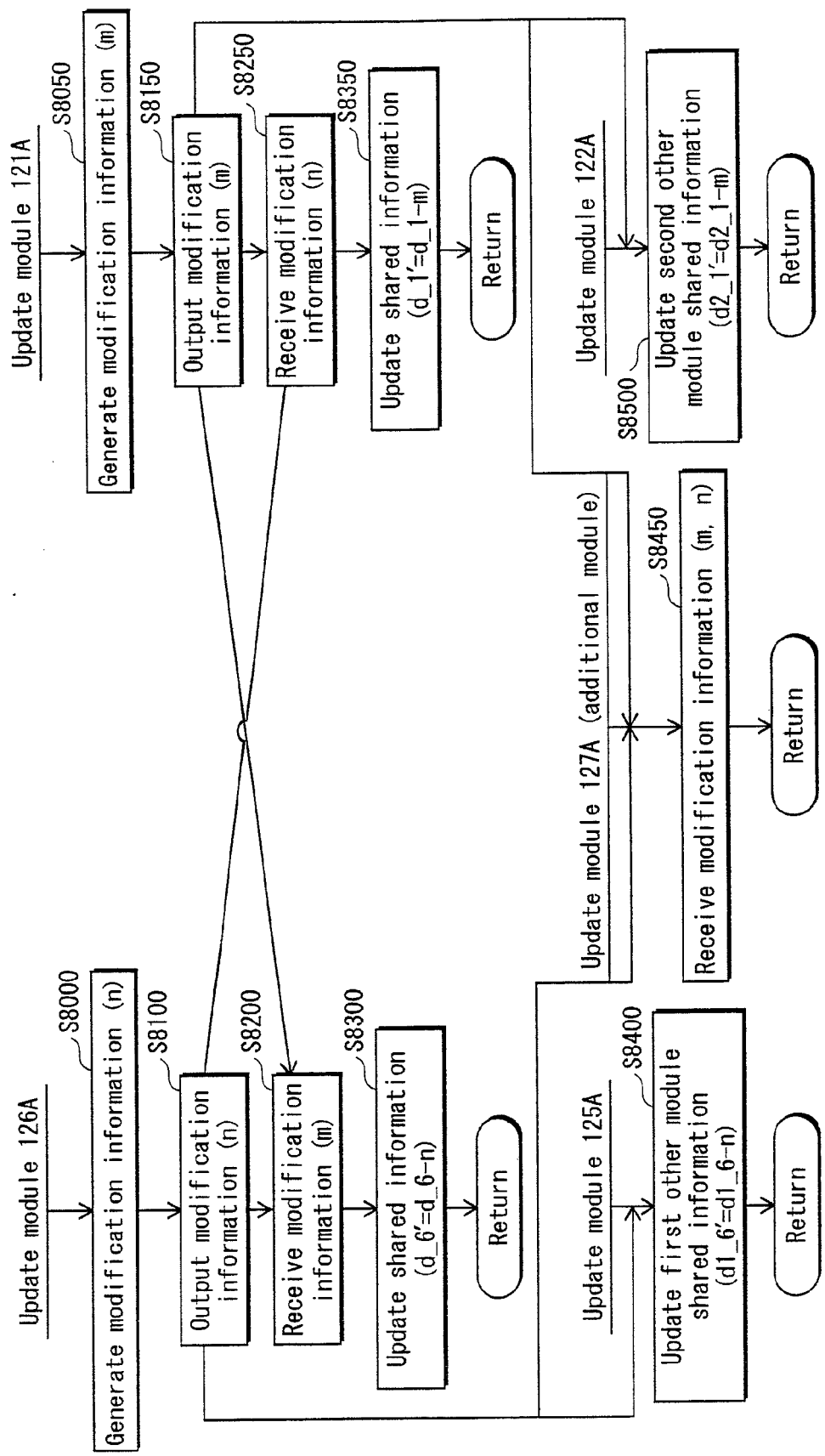
FIG. 38 is a flow chart showing the operations of distribution processing.

The following describes the partial information generation processing shown in Step S7000 in FIG. 37, with reference to the flow chart shown in FIG. 38.

Upon receiving a shared information generation instruction during the addition processing from the external apparatus, a modification information generation unit 265_6 of the install module 126A generates modification information n (Step S8000).

Upon receiving a shared information generation instruction during the addition processing from the external apparatus, a modification information generation unit 265_1 of the install module 121A generates modification information m (Step S8050).

The modification information generation unit 265_6 outputs the generated modification information n to the install modules 121A, 125, and 127A (Step S8100).

The modification information generation unit 265_1 outputs the generated modification information m to the install modules 122A, 126A, and 127A (Step S8150).

Upon receiving the modification information m, the shared information update unit 260_6 of the install module 126A temporarily stores therein the received modification information m (Step S8200).

Upon receiving the modification information n, the shared information update unit 260_1 of the install module 121A temporarily stores therein the received modification information n (Step S8250).

The shared information update unit 260_6 generates new shared information "d_6′ (=d_6−n)" using the generated modification information n, and updates shared information "d_6" stored in the shared information storage unit 251_6 with "d_6′" (Step S8300).

The shared information update unit 260_1 generates new shared information "d_1′ (=d_1−m)" using the generated modification information m, and updates shared information "d_1" stored in the shared information storage unit 251_1 with "d_1′" (Step S8350).

Upon receiving the modification information n, the shared information update unit 260_5 of the install module 125A generates new first other module shared information "d1_6′ (=d1_6−n)" using the received modification information n, and updates first other module shared information "d1_6" stored in the other module shared information storage unit 252_5 with "d1_6′" (Step S8400).

Upon receiving the modification information n and m, the shared information update unit 260_7 of the install module 127A temporarily stores therein the received modification information n and m (Step S8450).

Upon receiving the modification information m, the shared information update unit 260_2 of the install module 122A generates new second other module shared information "d2_1' (=d2_1−m)" using the received modification information m, and updates the second other module shared information "d2_1" stored in the other module shared information storage unit 252_2 with "d2_1'" (Step S8500).

(Shared Information Generation Processing)

Figure 39:
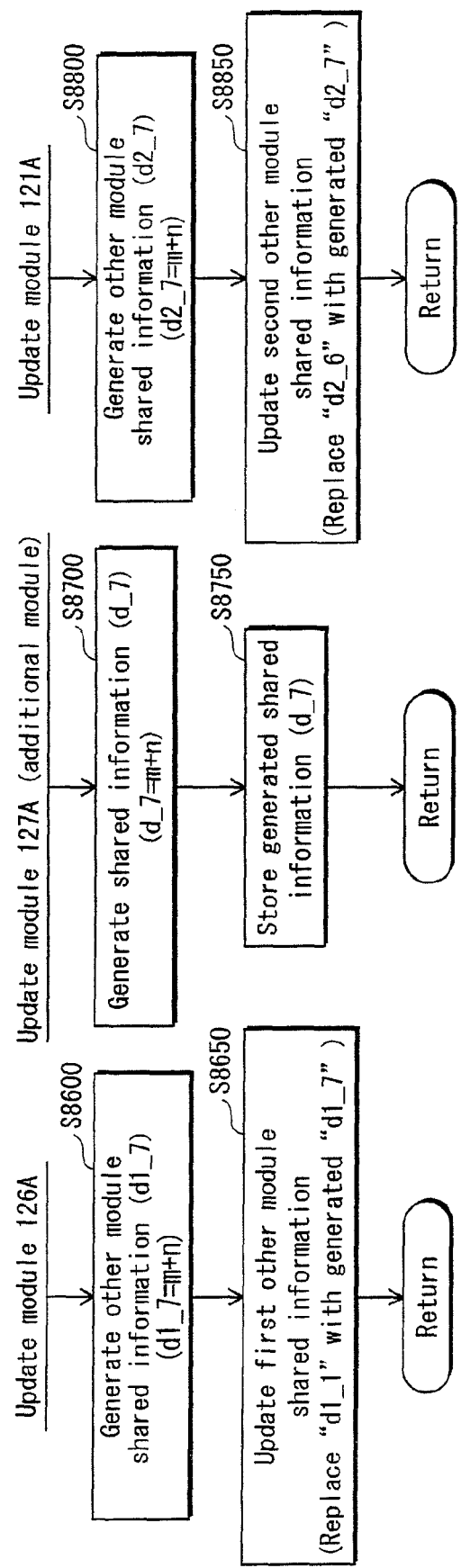
FIG. 39 is a flowchart showing the operations of shared information generation processing.

The following describes the shared information generation processing shown in Step S705 in FIG. 37, with reference to the flow chart shown in FIG. 39.

The shared information update unit 260_6 generates other module shared information "d1_7=(m+n)" using the modification information n and m (Step S8600). The shared information update unit 260_6 updates (replaces) the first other module shared information "d1_1" stored in the other module shared information storage unit 252_6 with "d1_7" (Step S8650).

The shared information update unit 260_7 generates shared information "d_7=(m+n)" using the modification information n and m (Step S8700). The shared information update unit 260_7 stores the generated shared information "d_7" in the shared information storage unit 251_7 (Step S8750).

The shared information update unit 260_1 generates other module shared information "d2_7=(m+n)" using the modification information n and m (Step S8800). The shared information update unit 260_1 updates (replaces) second other module shared information "d2_1" stored in the other module shared information storage unit 252_1 with "d2_7" (Step S8850).

(Other Module Shared Information Storage Processing)

Figure 40:
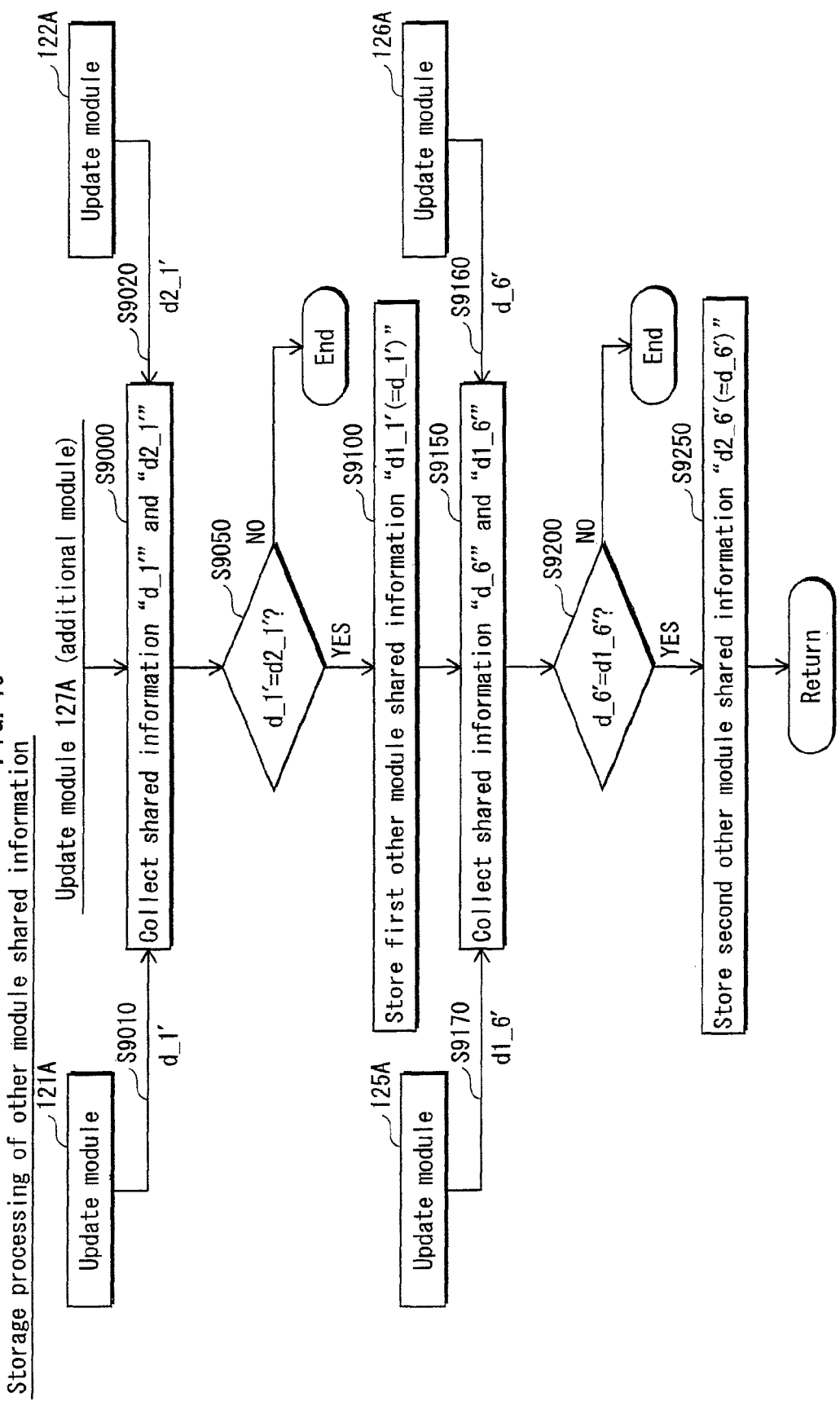
FIG. 40 is a flow chart showing the operations of other module shared information storage processing.

The following describes the other module shared information storage processing shown in Step S7100 in FIG. 37, with reference to the flow chart shown in FIG. 40.

The shared information update unit 260_7 of the install module 127A outputs a shared information acquisition instruction to the install module 121A, and outputs a second other module shared information acquisition instruction to the install module 122A. Then, the shared information update unit 260_7 collects the shared information "d_1'" and "d2_1'" (Step S9000). Here, the acquisition unit 267_1 of the install module 121A, which has received the shared information acquisition instruction, acquires the shared information "d_1'" and outputs the shared information "d_1'" to the install module 127A (Step S9010). Also, the acquisition unit 267_2 of the install module 122A, which has received the second other module shared information acquisition instruction, acquires the shared information "d2_1'" and outputs the acquired shared information "d2_1'" to the install module 127A (Step S9020).

The shared information update unit 260_7 judges whether the collected shared information "d_1'" and "d2_1'" have the same value (Step S9050).

If judging that "d_1'" and "d2_1'" have the same value (Step S9050: YES), the shared information update unit 260_7 stores the collected shared information "d_1'" in the other module shared information storage unit 252_7, as first other module shared information (Step S9100).

The shared information update unit 260_7 outputs a shared information acquisition instruction to the install module 126A, and outputs a first other module shared information acquisition instruction to the install module 125A. Then, the shared information update unit 260_7 collects shared information "d_6'" and "d1_6'" (Step S9150). Here, the acquisition unit 267_6 of the install module 126A, which has received the shared information acquisition instruction, acquires the shared information "d_6'" and outputs the acquired shared information "d_6'" to the install module 127A (Step S9160). Also, the acquisition unit 267_5 of the install module 125A, which has received the first other module shared information acquisition instruction, acquires the shared information "d1_6'" and outputs the acquired shared information "d1_6'" to the install module 127A (Step S9170).

The shared information update unit 260_7 judges whether the collected shared information "d_6'" and "d1_6'" have the same value (Step S9200).

If judging that "d_6'" and "d1_6'" have the same value (Step S9200: YES), the shared information update unit 260_7 stores the collected shared information "d_6'" in the other module shared information storage unit 252_7, as second other module shared information (Step S9250).

If judging that "d_6'" and "d1_6'" do not have the same value (Step S9050 or Step S9200: NO), the install module 127A notifies the install modules 121A to 126A of that "d_6'" and "d1_6'" do not have the same value. The install modules 121A to 127A each stop performing the addition processing, and return a value of shared information stored therein to a value before the addition processing, and end the processing.

(First Division Processing During Addition Processing)

Figure 41:
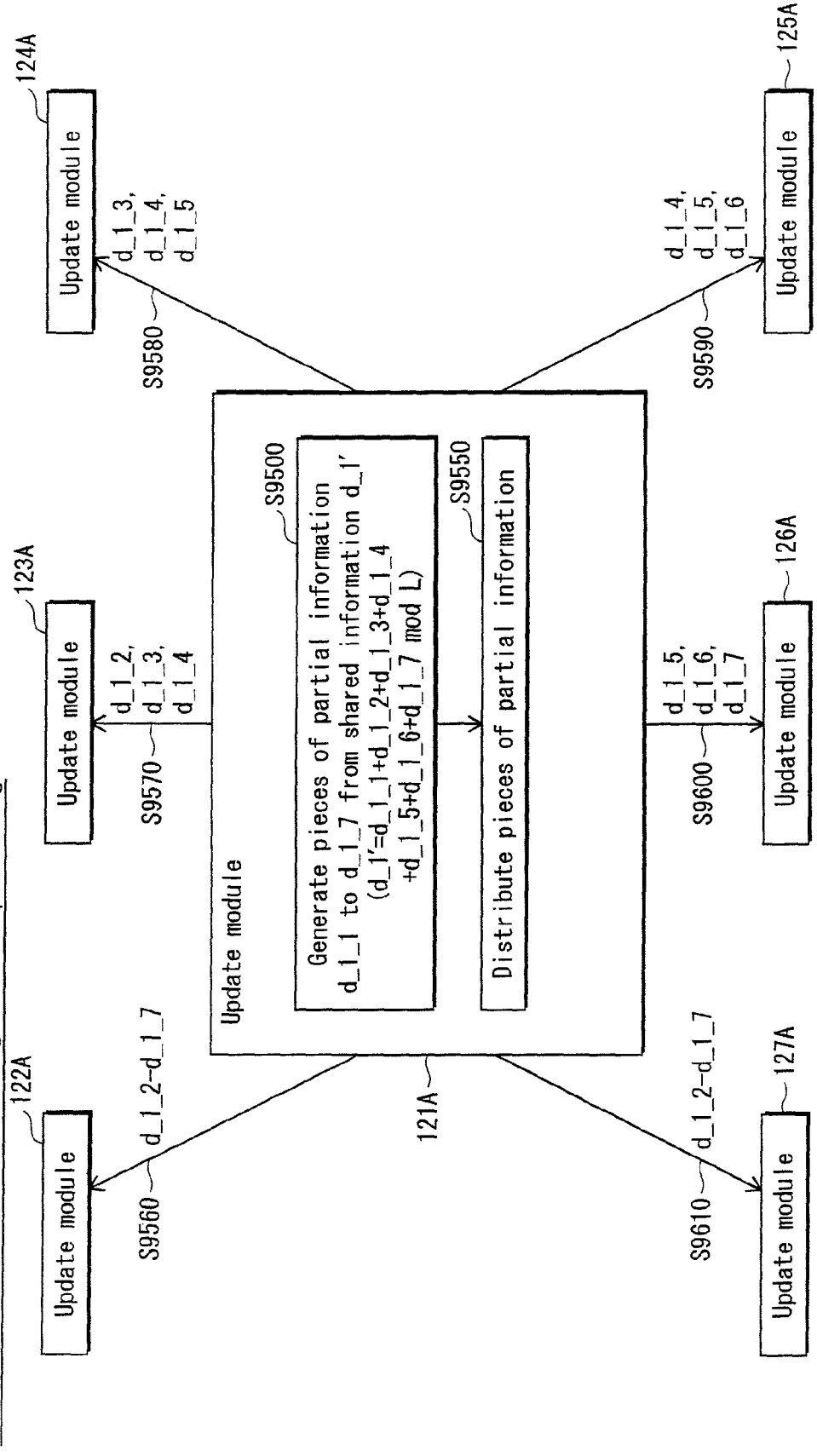
FIG. 41 is a flow chart showing the operations of first division processing during the addition processing.

The following describes the first division processing during addition processing shown in Step S7350 in FIG. 37, with reference to the flow chart shown in FIG. 41.

The shared information division unit 261_1 of the install module 121A generates seven pieces of partial information (d_1_1 to d_1_7) from the shared information "d_1'" (Step S9500). That is, the shared information division unit 261_1 divides the shared information "d_1'" into seven pieces of partial information (d_1_1 to d_1_7). Here, the pieces of partial information each satisfy the following equation.

$$d\_1'=d\_1\_1+d\_1\_2+d\_1\_3+d\_1\_4+d\_1\_5+d\_1\_6+d\_1\_7 \bmod L \qquad \text{(Equation)}$$

Specifically, the shared information division unit 261_1 generates six random number using a random number generator thereby to generate pieces of partial information (d_1_1 to d_1_6). Then, the shared information division unit 261_1 calculates d_1_7=d_1'−(d_1_1+d_1_2+ ... +d_1_6). Note that, although a negative value may be obtained as a result of such a subtraction, the obtained negative value is treated as partial information as it is.

The shared information division unit 261_1 distributes the generated (divided) three or six pieces of partial information to the modules 122A to 127A (Step S9550).

Specifically, the shared information division unit 261_1 distributes the generated pieces of partial information d_1_2 to d_1_7 to the install modules 122A and 127A (Steps S9560 and S9610). The shared information division unit 261_1 distributes the pieces of partial information d_1_(i−1), d_1_i, and d_1_(i+1) to the i-th module of each of the other modules 123A to 126A (Steps S9570, S9580, S9590, and S9600).

The install modules 122A to 127A each temporarily store the received partial information in the shared information update unit 260_j.

(First Update Processing During Addition Processing)

Figure 42:
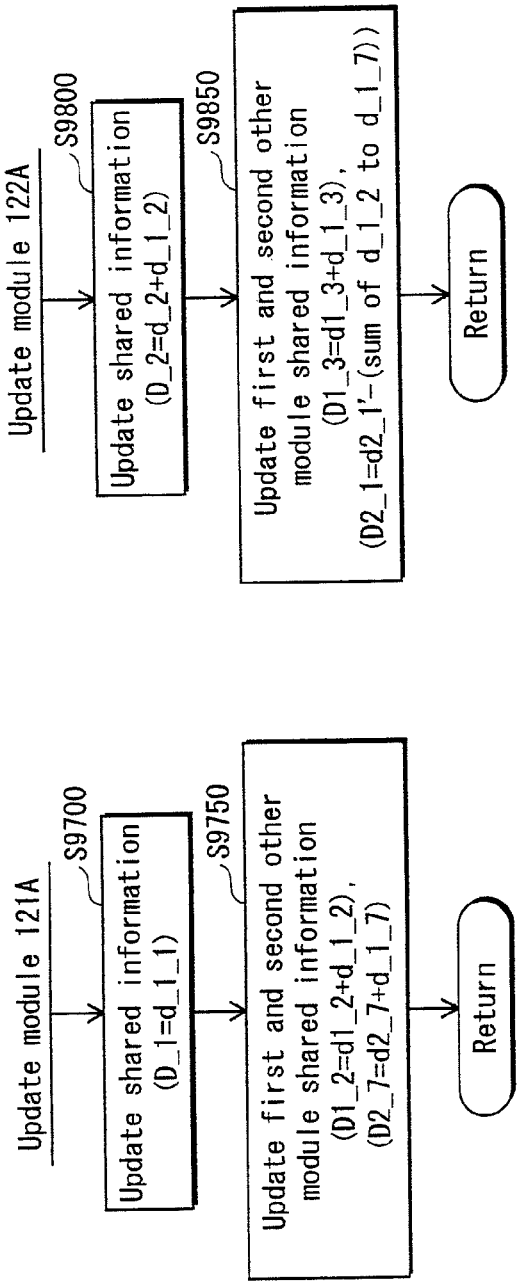
FIG. 42 is a flow chart showing the operations of the install modules 121A and 122A in first update processing during the addition processing.
Figure 43:
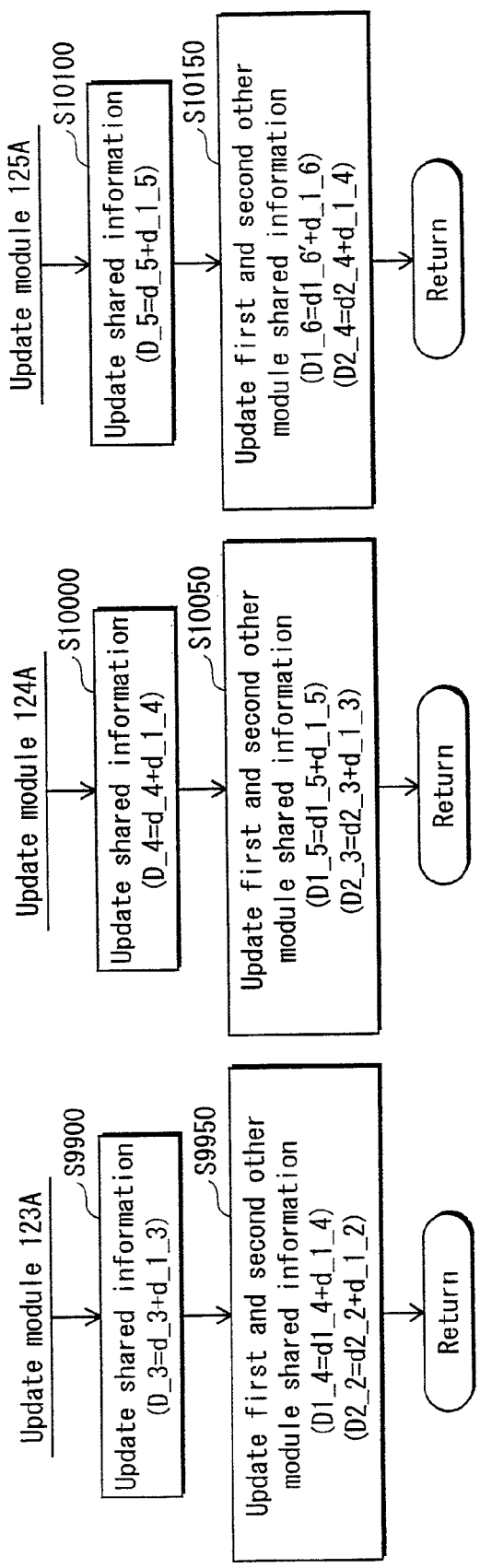
FIG. 43 is a flow chart showing the operations of the install modules 123A, 124A, and 125A in the first update processing during the addition processing.
Figure 44:
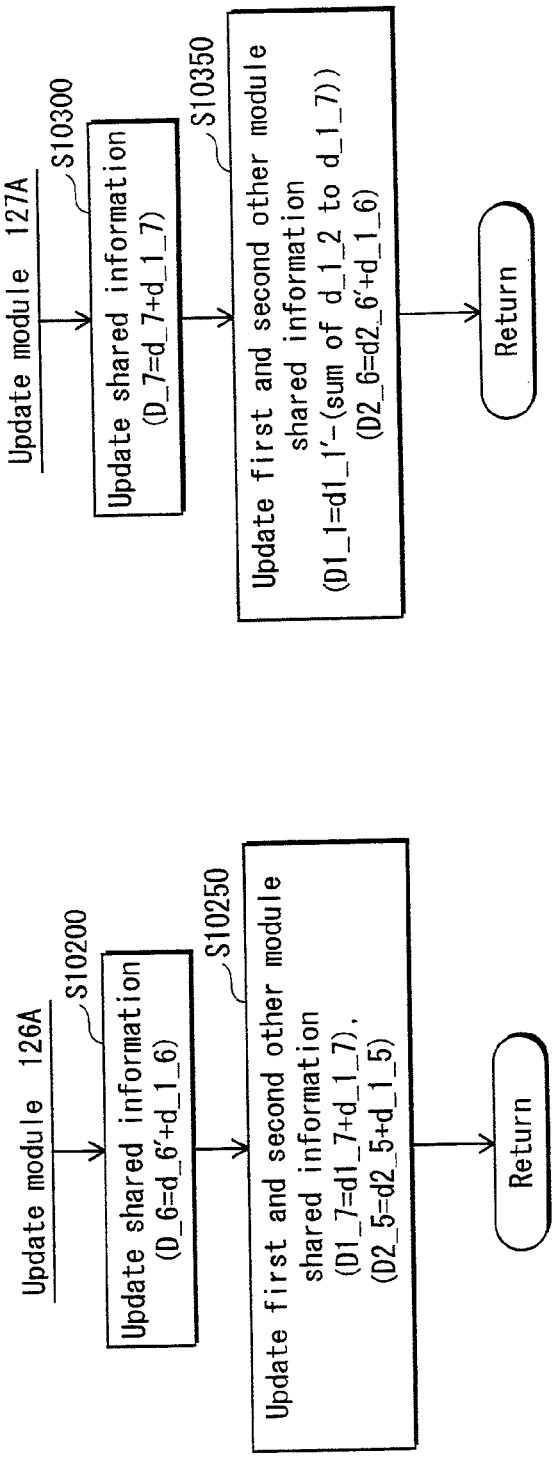
FIG. 44 is a flow chart showing the operations of the install modules 126A and 127A in the first update processing during the addition processing.

The following describes the first update processing during the addition processing shown in Step S7400 in FIG. 37, with reference to the flow charts shown in FIGS. 42 to 44.

The shared information update unit 260_1 of the install module 121A updates the shared information "d_1'" stored in the shared information storage unit 251_1 with the generated partial information "d_1_1" as new shared information "D_1 (=d_1_1)" (Step S9700). The shared information update unit 260_1 generates new first and second other module shared information "D1_2(=d1_2+d_1_2)" and "D2_7(=d2_7+d_1_7)" using the generated partial information "d_1_2" and "d_1_7", and updates the first and second other module shared information "d1_2" and "d2_7" stored in the shared information storage unit 251_1 with the new first and second other module shared information "D1_2" and "D2_7" (Step S9750).

The shared information update unit 260_2 of the install module 122A generates new shared information "D_2(=d_2+d_1_2)" using the partial information "d_1_2" received from the install module 121A, and updates the shared information "d_2" stored in the shared information storage unit 251_2 with the new shared information "D_2" (Step S9800). The shared information update unit 260_2 generates new first and second other module shared information "D1_3(=d1_3+d_1_3)" and "D2_1(=d2_1'−(d_1_2+d_1_3+ ... +d_1_7))" using the partial information "d_1_2" to "d_1_7" received from the install module 121A, and updates the first and second other module shared information "d1_3" and "d2_1'" stored in the shared information storage unit 251_2 with the new first and second other module shared information "D1_3" and "D2_1" (Step S9850). Note that, although a negative value may be obtained as a result of such a subtraction, the obtained negative value is treated as partial information as it is.

The shared information update unit 260_3 of the install module 123A generates new shared information "D_3(=d_3+d_1_3)" using the partial information "d_1_3" received from the install module 121A, and updates the shared information "d_3" stored in the shared information storage unit 251_3 with the new shared information "D_3" (Step S9900). The shared information update unit 260_3 generates new first and second other module shared information "D1_4(=d1_4+d_1_4)" and "D2_2(=d2_2+d_1_2)" using the partial information "d_1_4" and "d_1_2" received from the install module 121A, and updates the first and second other module shared information "d1_4" and "d2_2" stored in the shared information storage unit 251_3 with the new first and second other module shared information "D1_4" and "D2_2" (Step S9950).

The shared information update unit 260_4 of the install module 124A generates new shared information "D_4(=d_4+d_1_4)" using the partial information "d_1_4" received from the install module 121A, and updates the shared information "d_4" stored in the shared information storage unit 251_4 with the new shared information "D_4" (Step S10000). The shared information update unit 260_4 generates new first and second other module shared information "D1_5(=d1_5+d_1_5)" and "D2_3(=d2_3+d_1_3)" using the partial information "d_1_5" and "d_1_3" received from the install module 121A, and updates the first and second other module shared information "d1_5" and "d2_3" stored in the shared information storage unit 251_4 with the new first and second other module shared information "D1_5" and "D2_3" (Step S10050).

The shared information update unit 260_5 of the install module 125A generates new shared information "D_5(=d_5+d_1_5)" using the partial information "d_1_5" received from the install module 121A, and updates the shared information "d_5" stored in the shared information storage unit 251_5 with the new shared information "D_5" (Step S10100). The shared information update unit 260_5 generates new first and second other module shared information "D1_6(=d1_6+d_1_6)" and "D2_4(=d2_4+d_1_4)" using the partial information "d_1_6" and "d_1_4" received from the install module 121A, and updates the first and second other module shared information "d1_6" and "d2_4" stored in the shared information storage unit 251_5 with the new first and second other module shared information "D1_6" and "D2_4" (Step S10150).

The shared information update unit 260_6 of the install module 126A generates new shared information "D_6 (=d_6'+d_1_6)" using the partial information "d_1_6" received from the install module 121A, and updates the shared information "d_6'" stored in the shared information storage unit 251_6 with the new shared information "D_6" (Step S10200). The shared information update unit 260_6 generates new first and second other module shared information "D1_7(=d1_7+d_1_7)" and "D2_5(=d2_5+d_1_5)" using the partial information "d_1_7" and "d_1_5" received from the install module 121A, and updates the first and second other module shared information "d1_7" and "d2_5" stored in the shared information storage unit 251_6 with the first and second other module shared information "D1_7" and "D2_5" (Step S10250).

The shared information update unit 260_7 of the install module 127A generates new shared information "D_7(=d_7+d_1_7)" using the partial information "d_1_7" received from the install module 121A, and updates the shared information "d_7" stored in the shared information storage unit 251_7 with the new shared information "D_7" (Step S10300). The shared information update unit 260_7 generates first and second other module shared information "D1_1(=d1_1'−(d_1_2+d_1_3+ ... +d_1_7))" and "D2_6(=d2_6'+d_1_6)" using the partial information "d_1_2" to "d_1_7" received from the install module 121A, and updates the first and second other module shared information "d1_1" and "d2_6'" stored in the shared information storage unit 251_7 with the new first and second other module shared information "D1_1" and "D2_6" (Step S10350). Note that, although a negative value may be obtained as a result of such a subtraction, the obtained negative value is treated as partial information as it is.

(Second Division Processing During Addition Processing)

Figure 45:
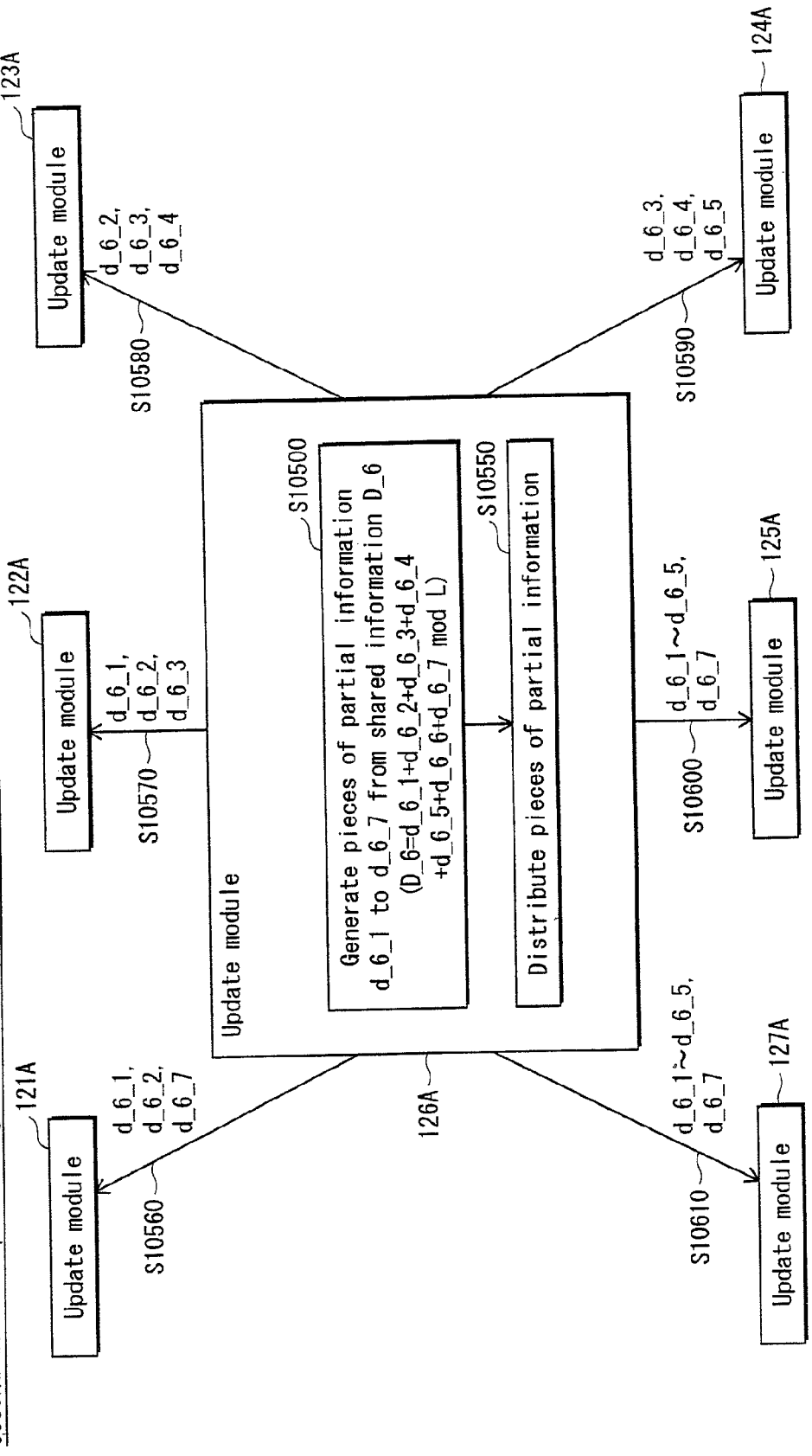
FIG. 45 is a flow chart showing the operations of second division processing during the addition processing.

The following describes the second division processing during the addition processing shown in Step S7500 in FIG. 37, with reference to the flow chart shown in FIG. 45.

The shared information division unit 261_6 of the install module 126A generates seven pieces of partial information (d_6_1 to d_6_7) from the shared information "D_6" (Step S10500). That is, the shared information division unit 261_6 divides the shared information "D_6" into seven pieces of partial information (d_6_1 to d_6_7). Here, the pieces of partial information each satisfy the following equation.

$$D\_6 = d\_6\_1 + d\_6\_2 + d\_6\_3 + d\_6\_4 + d\_6\_5 + d\_6\_6 + d\_6\_7 \bmod L \quad \text{(Equation)}$$

Specifically, the shared information division unit 261_6 generates six random numbers using a random number generator thereby to generate the pieces of partial information (d_6_1 to d_6_6). Then, the shared information division unit 261_6 calculates $d_{13}\_6\_7 = D\_6 - (d\_6\_1 + d\_6\_2 + \ldots + d\_6\_6)$. Note that, although a negative value may be obtained as a result of such a subtraction, the obtained negative value is treated as partial information as it is.

The shared information division unit 261_6 distributes the generated (divided) three or six pieces of shared information to the install modules 121A to 125A and 127A (Step S10550).

The shared information division unit 261_6 distributes the generated partial information d_6_1 to d_6_5 and d_6_7 to the install modules 125A and 127A (Steps S10600 and S10610). The shared information division unit 261_6 distributes the partial information d_6_(i−1), d_6_i, and d_6_(i+1) to the i-th module of each of the other modules 121A to 124A (Steps S10560, S10570, S10580, and S10590). Note that the partial information d_6_7 is distributed when i−1−0.

The install modules 121A to 125A and 127A each temporarily store the received partial information in the shared information update unit 260_j.

(Second Update Processing During Addition Processing)

Figure 46:
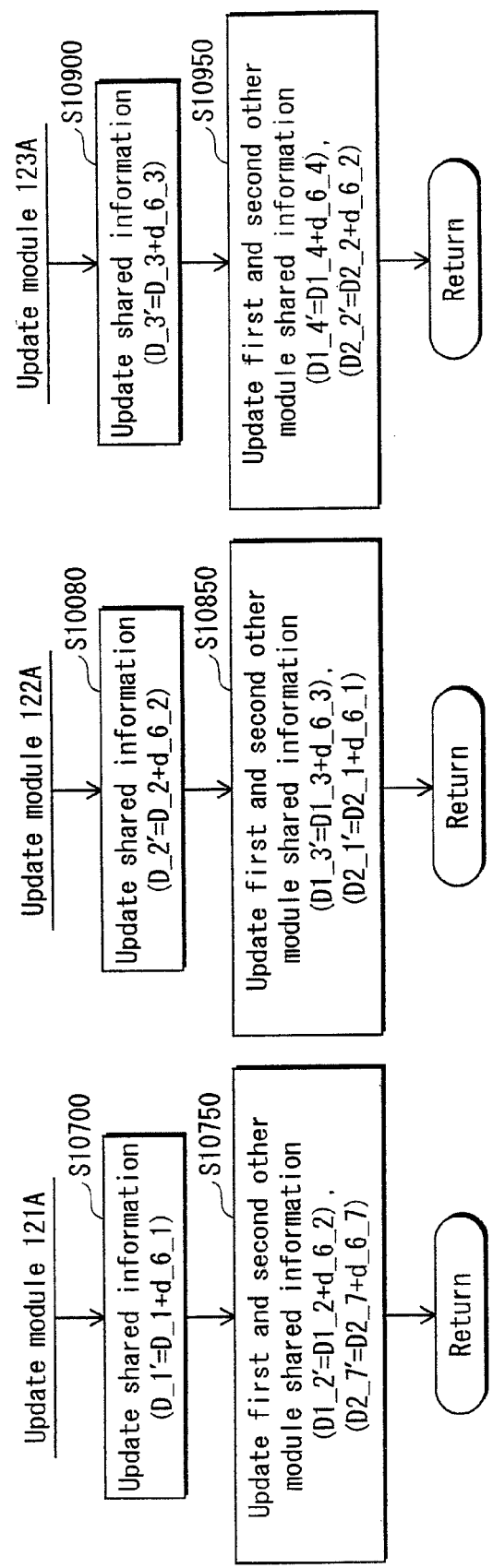
FIG. 46 is a flow chart showing the operations of the install modules 121A, 122A, and 123A in the second update processing during the addition processing.
Figure 47:
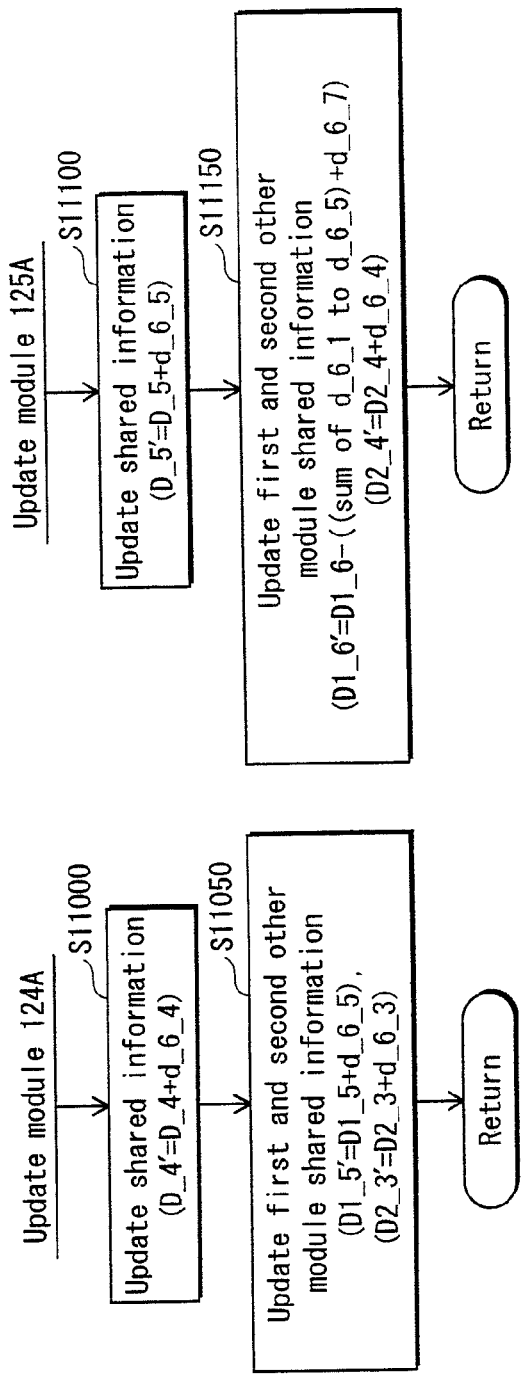
FIG. 47 is a flow chart showing the operations of the install modules 124A and 125A in the second update processing during the addition processing.
Figure 48:
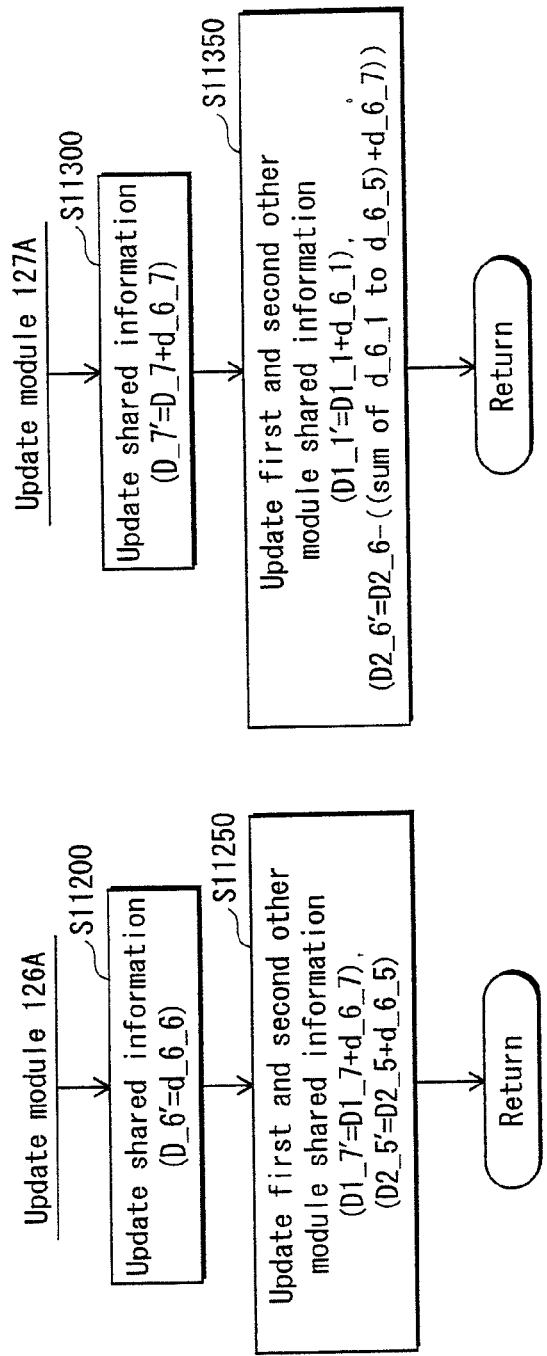
FIG. 48 is a flow chart showing the operations of the install modules 126A and 127A in the second update processing during the additional processing.

The following describes the second update processing during addition processing shown in Step S7550 in FIG. 37, with reference to the flow charts shown in FIGS. 46 to 48.

The shared information update unit 260_1 of the install module 121A generates new shared information "D_1' (=D_1+d_6_1)" using the partial information "d_6_1" received from the install module 126A, and updates the shared information "D_1" stored in the shared information storage unit 251_1 with the new shared information "D_1'" (Step S10700). The shared information update unit 260_1 generates new first and second other module shared information "D1_2' (=D1_2+d_6_2)" and "D2_7' (=D2_7+d_6_7)" using the partial information "d_6_2" and "d_6_7" received from the install module 126A, and updates the first and second other module shared information "D1_2" and "D2_7" stored in the shared information storage unit 251_1 with the new first and second other module shared information "D1_2'" and "D2_7'" (Step S10750).

The shared information update unit 260_2 of the install module 122A generates new shared information "D_2' (=D_2+d_6_2)" using the partial information "d_6_2" received from the install module 126A, and updates the shared information "D_2" stored in the shared information storage unit 251_2 with the new shared information "D_2'" (Step S10800). The shared information update unit 260_2 generates new first and second other module shared information "D1_3' (=D1_3+d_6_3)" and "D2_1' (=D2_1+d_6_1)" using the partial information "d_6_3" and "d_6_1" received from the install module 126A, and updates the first and second other module shared information "D1_3" and "D2_1" stored in the shared information storage unit 251_2 with the new first and second other module shared information "D1_3'" and "D2_2'" (Step S10850).

The shared information update unit 260_3 of the install module 123A generates new shared information "D_3' (=D_3+d_6_3)" using the partial information "d_6_3" received from the install module 126A, and updates the shared information "D_3" stored in the shared information storage unit 251_3 with the new shared information "D_3'" (Step S10900). The shared information update unit 260_3 generates new first and second other module shared information "D1_4' (=D1_4+d_6_4)" and "D2_2' (=D2_2+d_6_2)" using the partial information "d_6_4" and "d_6_2" received from the install module 126A, and updates the first and second other module shared information "D1_4" and "D2_2" stored in the shared information storage unit 251_3 with the new first and second other module shared information "D1_4'" and "D2_2'" (Step S10950).

The shared information update unit 260_4 of the install module 124A generates new shared information "D_4' (-D_4+d_6_4)" using the partial information "d_6_4" received from the install module 121A, and updates the shared information "D_4" stored in the shared information storage unit 251_4 with the new shared information "D_4'" (Step S11000). The shared information update unit 260_4 generates new first and second other module shared information "D1_5' (=D1_5+d_6_5)" and "D2_3' (=D2_3+d_6_3)" using the partial information "d_6_5" and "d_6_3" received from the install module 126A, and updates the first and second other module shared information "D1_5" and "D2_3" stored in the shared information storage unit 251_4 with the new first and second other module shared information "D1_5'" and "D2_3'" (Step S11050).

The shared information update unit 260_5 of the install module 125A generates new shared information "D_5' (=D_5+d_6_5)" using the partial information "d_6_5" received from the install module 126A, and updates the shared information "D_5" stored in the shared information storage unit 251_5 with the new shared information "D_5'" (Step S11100). The shared information update unit 260_5 generates new first and second other module shared information "D1_6' (=D1_6−(d_6_1+d_6_2+ . . . +d_6_5+d_6_7)" and "D2_4' (=D2_4+d_6_4)" using the partial information "d_6_1" to "d_6_5" and "d_6_7" received from the install module 126A, and updates the first and second other module shared information "D1_6" and "D2_4" stored in the shared information storage unit 251_5 with the new first and second other module shared information "D1_6'" and "D2_4'" (Step S11150). Note that, although a negative value may be obtained as a result of such a subtraction, the obtained negative value is treated as new partial information as it is.

The shared information update unit 260_6 of the install module 126A updates the shared information "D_6" stored in the shared information storage unit 251_6 with the generated partial information "d_1_6", as new shared information "D_6' (=d_6_6)" (Step S11200). The shared information update unit 260_6 generates new first and second other module shared information "D1_7' (=D1_7+d_6_7)" and "D2_5' (=D2_5+d_6_5)" using the generated partial information "d_6_7" and "d_6_5", and updates the first and second other module shared information "D1_7" and "D2_5" stored in the shared information storage unit 251_6 with the new first and second other module shared information "D1_7'" and "D2_5'" (Step S11250).

The shared information update unit 260_7 of the install module 127A generates new shared information "D_7' (=D_7+d_6_7)" using the partial information "d_6_7" received from the install module 126A, and updates the shared information "D_7" stored in the shared information storage unit 251_7 with the new shared information "D_7'" (Step S11300). The shared information update unit 260_7 generates new first and second other module shared information "D1_1' (=D1_1+d_6_1)" and "D2_6' (=D2_6−(d_6_1+ d_6_2+ . . . +d_6_5+d_6_7))" using the partial information "d_6_1" to "d_1_5" and "d_1_7" received from the install module 126A, and updates the first and second other module shared information "D1_1" and "D2_6" stored in the shared information storage unit 251_7 with the new first and second other module shared information "D1_1'" and "D2_6'" (Step S11350). Note that, although a negative value may be obtained as a result of such a subtraction, the obtained negative value is treated as new shared information as it is.

Specific Examples

FIG. 49 shows the shared information and first and second other module shared information stored in each of the install modules 121A to 127A after the addition processing.

For example, after performing the addition processing, the install module 121A stores therein updated shared information "D_1'" 211c, first other module shared information "D1_2'" 212_1c and second other module shared information "D2_7'" 217_1c.

The following shows that a private key "d" is recovered using updated shared information "D_1'" to "D_7'".

$$D\_1' + D\_2' + D\_3' + D\_4' + D\_5' + D\_6' + D\_7' =$$
$$(D\_1 + d\_6\_1) + (D\_2 + d\_6\_2) + (D\_3 + d\_6\_3) +$$
$$(D\_4 + d\_6\_4) + (D\_5 + d\_6\_5) + (d\_6\_6) + (D\_7 + d\_6\_7) =$$
$$D\_1 + D\_2 + D\_3 + D\_4 + D\_5 + D\_7 + d\_6\_1 + d\_6\_2 +$$
$$d\_6\_3 + d\_6\_4 + d\_6\_4 + d\_6\_5 + d\_6\_6 + d\_6\_7 =$$
$$D\_1 + D\_2 + D\_3 + D\_4 + D\_5 + D\_6 + D\_7 =$$
$$(d\_1\_1) + (d\_2 + d\_1\_2) + (d\_3 + d\_1\_3) + (d\_4 + d\_1\_4) +$$
$$(d\_5 + d\_1\_5) + (d\_6' + d\_1\_6) + (d\_7 + d\_1\_7) =$$
$$d\_2 + d\_3 + d\_4 + d\_5 + d\_6' + d\_7 + d\_1\_1 + d\_1\_2 +$$
$$d\_1\_3 + d\_1\_4 + d\_1\_5 + d\_1\_6 + d\_1\_7 =$$
$$d\_1' + d\_2 + d\_3 + d\_4 + d\_5 + d\_6' + d\_7 =$$
$$(d\_1 - m) + d\_2 + d\_3 + d\_4 + d\_5 + (d\_6 - n) + m + n =$$
$$d\_1 + d\_2 + d\_3 + d\_4 + d\_5 + d\_6 + d\_7 = d$$

As described above, it is possible to always make the total sum of the pieces of shared information stored in the install modules constant even after the install module 127A has been added. Accordingly, in the addition processing, the software update system can cause an install module to add, without recovering the new private key "d" and regenerating shared information.

(Necessity of First and Second Update Processing During Addition Processing)

The first and second update processing is necessary during the addition processing because the install modules 121A and 126A each store therein excessive amount of shared information.

Specifically, after completing Step S7300 in the addition processing, the install module 121A stores therein the three pieces of shared information including the shared information "d_1'", the other module shared information "d1_2" and "d2_7". Here, the other device shared information "d2_7" is a sum of the modification information m generated by the install module 121A and the modification information n generated by the install module 126A. Accordingly, it is possible to obtain, from the other device shared information "d2_7" and the modification information m generated by the install module 121A, the modification information n transmitted by the install module 126A. Furthermore, before the addition processing, the install module 121A also stores therein the other module shared information "d2_6" before update. Accordingly, it is possible to obtain, from on the other module shared information "d2_6" before update and the modification information n generated by the install module 126A, a value of the shared information "d2_6' (=d_6')" after update. In this way, although the install module 121A should originally store therein three pieces of shared information, the install module 121A can actually store therein four pieces of shared information, which is excessive amount of shared information. The same applies to the install module 126A. Therefore, in order to solve the problem that some install modules store therein excessive amount of shared information, it is necessary to update the shared information stored in the install modules 121A and 126A at the end of the addition processing.

It has been described that two install modules each generate and transmit modification information in order to generate shared information to be stored in an addition-target install module. Alternatively, for example, all the install modules other than the addition-target install module each may transmit the modification information.

(49) The present invention may be any combination of the above embodiments and modifications.

Furthermore, it is of course possible to make various modification or correction to the software update apparatus relating to the present invention without departing from the spirit and scope of the present invention.

INDUSTRIAL APPLICABILITY

The present invention is broadly applicable to a software update apparatus that acquires update software from an external server connected with the software update apparatus via a network, and updates software included therein with the acquired update software.

The invention claimed is:

1. A software update apparatus, comprising:
a processor; and
a memory storing (i) computer executable instructions that are executable by the processor and (ii) software including a predetermined application, a protection control module, and a plurality of install modules,
wherein, when executed by the processor, the computer executable instructions cause the processor to perform a series of steps including:
executing the protection control module to verify whether the predetermined application has been tampered with;
executing any one of the plurality of install modules to receive a replacement protection control module from an external server, and updating the protection control module with the received replacement protection control module;
verifying whether each of a plurality of simultaneously running install modules, from among the plurality of install modules, has a possibility of performing malicious operations, and informing the external server of the result of the verifying; and
(i) receiving, if the result of the verifying indicates that one of the simultaneously running install modules has the possibility of performing malicious operations, a request for revocation from the external server, and (ii) revoking the one of the simultaneously running install modules that has the possibility of performing malicious operations using another one of the simultaneously running install modules that is a destination of the request for revocation received from the external server.

2. The software update apparatus of claim 1,
wherein the software further includes an access control module that has been encrypted with a predetermined encryption key and contains predetermined information whose pieces are each to be used for revoking a different one of the plurality of install modules,
wherein the series of steps performed by the processor further include:
accessing, using the other one of the simultaneously running install modules that is the destination of the request for revocation received from the external server, the external server to acquire a decryption key corresponding to the predetermined encryption key, and decrypting the access control module with the acquired decryption key; and
acquiring, from the access control module, a piece of the predetermined information to be used for revoking the one of the simultaneously running install modules that has the possibility of performing malicious operations, and wherein the other one of the simultaneously running install modules that is the destination of the request for revocation revokes the one of the simultaneously running install modules that has the possibility of performing malicious operations using the acquired piece of the predetermined information.

3. The software update apparatus of claim 1,
wherein the software further includes an access control module that contains predetermined information whose pieces are (i) each to be used for revoking a different one of the plurality of install modules and (ii) each encrypted with a different encryption key,
wherein the series of steps performed by the processor further include:
   accessing, using the other one of the simultaneously running install modules that is the destination of the request for revocation received from the external server, the external server to acquire a decryption key corresponding to the encryption key that has been used for encrypting a specific piece of predetermined information that is to be used for revoking the one of the simultaneously running install modules that has the possibility of performing malicious operations;
   acquiring, from the access control module, the specific piece of the predetermined information; and
   decrypting the specific piece of the predetermined information with the acquired decryption key using the other one of the simultaneously running install modules that is the destination of the request for revocation and the acquired piece of the predetermined information, and
wherein the other one of the simultaneously running install modules that is the destination of the request for revocation revokes the one of the simultaneously running install modules using the decrypted specific piece of the predetermined information.

4. The software update apparatus of claim 2,
wherein each of the pieces of predetermined information shows a storage position of the corresponding one of the plurality of install modules.

5. The software update apparatus of claim 2,
wherein each of the pieces of predetermined information shows a procedure for revoking the corresponding one of the plurality of install modules.

6. The software update apparatus of claim 4,
wherein the other one of the simultaneously running install modules that is the destination of the request for revocation revokes the one of the simultaneously running install modules that has the possibility of performing malicious operations by deleting all parts of the one of the simultaneously running install modules that has the possibility of performing malicious operations from the memory by determining the storage position of the one of the simultaneously running install modules that has the possibility of performing malicious operations from the predetermined information.

7. The software update apparatus of claim 4,
wherein the of the pieces of storage position of each of the plurality of install modules indicates a deletion part thereof that is to be deleted from the memory if the corresponding one of the plurality of install modules has the possibility of performing malicious operations, and
wherein the other one of the simultaneously running install modules that is the destination of the request for revocation revokes the one of the simultaneously running install modules that has the possibility of performing malicious operations by deleting the deletion part of the one of the simultaneously running install modules that has the possibility of performing malicious operations from the memory by determining the storage position of the one of the simultaneously running install modules that has the possibility of performing malicious operations from the predetermined information.

8. The software update apparatus of claim 4,
wherein the of the pieces of storage position of each of the plurality of install modules indicates a code part thereof that is to be deleted from the memory unit if the corresponding one of the plurality of install modules has the possibility of performing malicious operations, and
wherein the other one of the simultaneously running install modules that is the destination of the request for revocation revokes the one of the simultaneously running install modules that has the possibility of performing malicious operations by deleting the code part of the one of the simultaneously running install modules that has the possibility of performing malicious operations from the memory by determining the storage position of the one of the simultaneously running install modules that has the possibility of performing malicious operations from the predetermined information.

9. The software update apparatus of claim 2,
wherein the other one of the simultaneously running install modules that is the destination of the request for revocation revokes the one of the simultaneously running install modules that has the possibility of performing malicious operations by deleting the piece of the predetermined information that corresponds to the one of the simultaneously running install modules that has the possibility of performing malicious operations from the access control module.

10. The software update apparatus of claim 1,
wherein the other one of the simultaneously running install modules that is the destination of the request for revocation revokes the one of the simultaneously running install modules that has the possibility of performing malicious operations by deleting, from the memory, information necessary for the one of the simultaneously running install modules that has the possibility of performing malicious operations to access another one of the plurality of install modules.

11. The software update apparatus of claim 1,
wherein the other one of the simultaneously running install modules that is the destination of the request for revocation revokes the one of the simultaneously running install modules that has the possibility of performing malicious operations by deleting, from the memory, information to be used by the one of the simultaneously running install modules that has the possibility of performing malicious operations.

12. The software update apparatus of claim 1,
wherein the verifying whether each of the plurality of simultaneously running install modules has the possibility of performing malicious operation includes one of the plurality of simultaneously running install modules performing the verifying on itself.

13. The software update apparatus of claim 12,
wherein the series of steps performed by the processor further include revoking the one of the plurality of simultaneously running install modules using the one of the plurality of simultaneously running install modules to revoke itself, if the one of the plurality of simultaneously running install modules verifies itself as having the possibility of performing malicious operations.

14. The software update apparatus of claim 1,
wherein the verifying whether each of the plurality of simultaneously running install modules has the possibility of performing malicious operation includes using at least one of the plurality of simultaneously running install modules to calculate a hash value or a message authentication code (MAC) value of each of the plurality of simultaneously running install modules and judge whether the calculated hash value or MAC value matches a hash value or a MAC value attached beforehand to the at least one of the plurality of simultaneously running install modules.

15. A non-transitory computer readable recording medium having stored thereon a revocation program composed of a set of computer executable instructions that are executable by a processor, wherein, when executed by the processor, the computer executable instructions cause the processor to perform a series of steps comprising:
  executing a protection control module to verify whether a predetermined application has been tampered with, the protection control module and the predetermined application being included in software stored in a memory;
  executing any one of a plurality of install modules to receive a replacement protection control module from an external server, and updating the protection control module with the received replacement protection control module, the plurality of install modules being included in the software stored in the memory;
  verifying whether each of a plurality of simultaneously running install modules, from among the plurality of install modules, has a possibility of performing malicious operations, and informing the external server of the result of the verifying; and
  (i) receiving, if the result of the verifying indicates that one of the simultaneously running install modules has the possibility of performing malicious operation, a request for revocation from the external server, and (ii) revoking the one of the simultaneously running install modules that has the possibility of performing malicious operation using another one of the simultaneously running install modules that is a destination of the request for revocation received from the external server.

16. The software update apparatus of claim 3,
wherein each of the pieces of predetermined information shows a storage position of the corresponding one of the plurality of install modules.

17. The software update apparatus of claim 3,
wherein each of the pieces of predetermined information shows a procedure for revoking the corresponding one of the plurality of install modules.

18. The software update apparatus of claim 3,
wherein the other one of the simultaneously running install modules that is the destination of the request for revocation revokes the one of the simultaneously running install modules that has the possibility of performing malicious operations by deleting the piece of the redetermined information that corresponds to the one of the simultaneously running install modules that has the possibility of performing malicious operations from the access control module.

19. The software update apparatus of claim 16,
wherein the other one of the simultaneously running install modules that is the destination of the request for revocation revokes the one of the simultaneously running install modules that has the possibility of performing malicious operations by deleting all parts of the one of the simultaneously running install modules that has the possibility of performing malicious operations from the memory by determining the storage position of the one of the simultaneously running install modules that has the possibility of performing malicious operations from the predetermined information.

20. The software update apparatus of claim 16,
wherein the storage position of each of the plurality of install modules indicates a deletion part thereof that is to be deleted from the memory if the corresponding one of the plurality of install modules has the possibility of performing malicious operations, and
wherein the other one of the simultaneously running install modules that is the destination of the request for revocation revokes the one of the simultaneously running install modules that has the possibility of performing malicious operations by deleting the deletion part of the one of the simultaneously running install modules that has the possibility of performing malicious operations from the memory by determining the storage position of the one of the simultaneously running install modules that has the possibility of performing malicious operations from the predetermined information.

21. The software update apparatus of claim 16,
wherein the storage position of each of the plurality of install modules indicates a code part thereof that is to be deleted from the memory unit if the corresponding one of the plurality of install modules has the possibility of performing malicious operations, and
wherein the other one of the simultaneously running install modules that is the destination of the request for revocation revokes the one of the simultaneously running install modules that has the possibility of performing malicious operations by deleting the code part of the one of the simultaneously running install modules that has the possibility of performing malicious operations from the memory by determining the storage position of the one of the simultaneously running install modules that has the possibility of performing malicious operations from the predetermined information.

22. The non-transitory computer-readable recording medium of claim 15,
wherein a hash value or a message authentication code (MAC) value is attached to each of the plurality of install modules, and
wherein the verifying whether each of the plurality of simultaneously running install modules has the possibility of performing malicious operation includes using at least one of the plurality of simultaneously running install modules to calculate a hash value or a message authentication code (MAC) value of each of the plurality of simultaneously running install modules and judge whether the calculated hash value or MAC value matches the hash value or the MAC value attached to the at least one of the plurality of simultaneously running install modules.

* * * * *